(12) United States Patent
Kang et al.

(10) Patent No.: US 9,380,459 B2
(45) Date of Patent: Jun. 28, 2016

(54) METHOD AND APPARATUS FOR MANAGING SECURITY KEYS FOR COMMUNICATION AUTHENTICATION WITH MOBILE STATION IN WIRELESS COMMUNICATION SYSTEM

(71) Applicant: Samsung Electronics Co., Ltd, Gyeonggi-do (KR)

(72) Inventors: Hyun-Jeong Kang, Seoul (KR); Young-Kyo Baek, Seoul (KR); Rakesh Taori, Gyeonggi-do (KR); Jung-Soo Jung, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/679,760

(22) Filed: Nov. 16, 2012

(65) Prior Publication Data

US 2013/0129091 A1 May 23, 2013

(30) Foreign Application Priority Data

Nov. 17, 2011 (KR) .................. 10-2011-0120533
Oct. 18, 2012 (KR) .................. 10-2012-0115895

(51) Int. Cl.
*H04L 29/06* (2006.01)
*H04W 12/04* (2009.01)
*H04W 12/06* (2009.01)

(52) U.S. Cl.
CPC .............. *H04W 12/04* (2013.01); *H04W 12/06* (2013.01)

(58) Field of Classification Search
CPC ..... H04W 12/02; H04W 12/04; H04W 12/06; H04W 12/08; H04W 12/10; H04L 63/0435
USPC ............ 380/270, 262, 278; 726/2–4, 5, 6, 17, 726/18, 21, 27–29, 26
See application file for complete search history.

(56) References Cited

U.S. PATENT DOCUMENTS

| 6,370,380 B1 * | 4/2002 | Norefors et al. .............. 455/436 |
| 6,879,830 B1 * | 4/2005 | Vollmer et al. .............. 455/442 |
| 7,028,186 B1 * | 4/2006 | Stenman .................. H04L 12/24 713/173 |

(Continued)

FOREIGN PATENT DOCUMENTS

| KR | 10-2010-0047099 | 5/2010 |
| KR | 10-2011-0055866 | 5/2011 |

(Continued)

OTHER PUBLICATIONS

International Search Report dated Mar. 28, 2013 in connection with International Application No. PCT/KR2012/009679, 3 pages.

(Continued)

*Primary Examiner* — Izunna Okeke
*Assistant Examiner* — Sher A Khan

(57) ABSTRACT

Provided is a method for managing a security key for communication authentication with a Mobile Station (MS) in a communication system. The method includes acquiring a first authentication key by performing an authentication procedure for the communication authentication in a cloud cell having member Base Stations (BSs) that include a master BS and at least one slave BS for providing a service to the MS; and communicating with at least one member BS using a first encryption key that is generated using the first authentication key.

30 Claims, 36 Drawing Sheets

(56) References Cited

U.S. PATENT DOCUMENTS

| | | | |
|---|---|---|---|
| 7,558,388 B2 | 7/2009 | Ptasinski | |
| 7,596,368 B2 | 9/2009 | Yamada et al. | |
| 8,046,583 B2* | 10/2011 | Taniguchi | 713/171 |
| 8,179,860 B2* | 5/2012 | Brusilovsky | H04L 63/062 370/331 |
| 8,245,028 B2 | 8/2012 | Calcev et al. | |
| 8,630,415 B2 | 1/2014 | Pourzandi et al. | |
| 8,792,464 B2 | 7/2014 | Voglewede et al. | |
| 2004/0077335 A1* | 4/2004 | Lee | H04L 63/08 455/410 |
| 2004/0228491 A1* | 11/2004 | Wu | H04L 63/0457 380/272 |
| 2006/0083377 A1 | 4/2006 | Ptasinski | |
| 2006/0172738 A1* | 8/2006 | Kwon | H04W 36/12 455/439 |
| 2006/0194609 A1* | 8/2006 | Matsuo | H04M 1/6066 455/552.1 |
| 2006/0200678 A1 | 9/2006 | Yamada et al. | |
| 2007/0238464 A1* | 10/2007 | Lim | H04W 36/0055 455/436 |
| 2007/0297611 A1* | 12/2007 | Yun et al. | 380/270 |
| 2008/0070577 A1* | 3/2008 | Narayanan | H04L 63/062 455/436 |
| 2008/0130902 A1 | 6/2008 | Foo Kune et al. | |
| 2008/0267407 A1* | 10/2008 | Vanderveen | H04L 9/083 380/277 |
| 2008/0279158 A1* | 11/2008 | Schmidt et al. | 370/338 |
| 2009/0024848 A1* | 1/2009 | Takasugi et al. | 713/169 |
| 2009/0068986 A1* | 3/2009 | Wang | H04W 12/06 455/411 |
| 2009/0164788 A1* | 6/2009 | Cho | H04L 63/061 713/175 |
| 2009/0274302 A1* | 11/2009 | Wu et al. | 380/272 |
| 2010/0002883 A1* | 1/2010 | Sammour et al. | 380/272 |
| 2010/0173610 A1* | 7/2010 | Kitazoe et al. | 455/411 |
| 2010/0205442 A1* | 8/2010 | Han | H04L 9/0844 713/171 |
| 2010/0211786 A1* | 8/2010 | Lim | H04L 63/062 713/169 |
| 2010/0257364 A1* | 10/2010 | Baek | H04L 9/0877 713/170 |
| 2010/0316221 A1* | 12/2010 | Tie et al. | 380/270 |
| 2011/0004760 A1* | 1/2011 | Sharaga | H04L 9/0844 713/171 |
| 2011/0028150 A1* | 2/2011 | Kone | H04W 36/0061 455/436 |
| 2011/0249651 A1* | 10/2011 | Kang et al. | 370/331 |
| 2011/0268274 A1* | 11/2011 | Qiu et al. | 380/270 |
| 2011/0305341 A1* | 12/2011 | Hahn | H04L 63/205 380/272 |

FOREIGN PATENT DOCUMENTS

| | | |
|---|---|---|
| WO | WO 2008/155764 A2 | 12/2008 |
| WO | WO 2008/155764 A3 | 2/2010 |

OTHER PUBLICATIONS

Written Opinion dated Mar. 28, 2013 in connection with International Application No. PCT/KR2012/009679, 4 pages.

Extended European Search Report, dated Jul. 3, 2015, in connection with European Patent Application No. 12849235.2, 6 pages.

XP055198183; "C-RAN The Road Towards Green RAN"; Oct. 2011, Version 2.5; China Mobile Research Institute, China; 48 pages.

* cited by examiner

METHOD AND APPARATUS FOR MANAGING SECURITY KEYS FOR COMMUNICATION AUTHENTICATION WITH MOBILE STATION IN WIRELESS COMMUNICATION SYSTEM

CROSS-REFERENCE TO RELATED APPLICATION(S) AND CLAIM OF PRIORITY

The present application is related to and claims the benefit under 35 U.S.C. §119(a) of a Korean Patent Application filed in the Korean Intellectual Property Office on Nov. 17, 2011 and assigned Serial No. 10-2011-0120533 and a Korean Patent Application filed in the Korean Intellectual Property Office on Oct. 18, 2012 and assigned Serial No. 10-2012-0115895, the entire disclosure of which is incorporated herein by reference.

TECHNICAL FIELD OF THE INVENTION

The present disclosure relates to a method and apparatus for managing security keys for communication authentication with a mobile station in a wireless communication system.

BACKGROUND OF THE INVENTION

In order to support high-capacity data services, a wireless communication system that uses a high-frequency band such as, for example, a millimeter wave (mmW) is considered as the next-generation wireless communication system. In the case of the system that uses a high-frequency band, the available communication distance between a Mobile Station (MS) and a Base Station (BS) is short, so a cell radius of the BS is small, causing an increase in the number of BSs installed to secure the service area (or service coverage) for the MS. When the mobility of the MS is taken in consideration, if the cell radius of the BS is reduced and the number of BSs increases, the number of inter-cell handovers of the MS increases, and the system overhead may increase due to the frequent handovers of the MS.

In this wireless communication system using a high-frequency band, the number of BSs per unit area may increase. In this case, while an MS moves from place to place, the serving BS in communication with the MS may be changed or replaced frequently, and an authentication procedure for generating and allocating an authentication key or a security key for data exchange or data transmission/reception between the changed BS (to which the MS is handed over) and the MS is required whenever the serving BS is changed. Therefore, there is a need for a method for efficiently performing the authentication procedure in the wireless communication system that uses a high-frequency band.

SUMMARY OF THE INVENTION

To address the above-discussed deficiencies, it is a primary object to provide a method and apparatus for managing security keys for authentication of an MS and data encryption in a cloud cell-based communication system.

In accordance with one aspect of the present disclosure, there is provided a method for managing a security key for communication authentication with a Mobile Station (MS) in a communication system. The method includes acquiring a first authentication key by performing an authentication procedure for the communication authentication in a cloud cell having member Base Stations (BSs) that include a master BS and at least one slave BS for providing a service to the MS; and communicating with at least one member BS using a first encryption key that is generated using the first authentication key.

In accordance with another aspect of the present disclosure, there is provided a method for managing a security key for communication authentication with a Mobile Station (MS) in a communication system. The method includes acquiring an authentication context for the MS by performing an authentication procedure for the communication authentication with the MS in a cloud cell having member Base Stations (BSs) that include a master BS and at least one slave BS for providing a service to the MS; and communicating with the MS using a first encryption key that is acquired from the authentication context.

In accordance with further another aspect of the present disclosure there is provided a method for managing a security key for communication authentication with a Mobile Station (MS) in a communication system. The method includes performing a member Base Station (BS) subscription procedure for a cloud cell with a master BS in the cloud cell having member BSs that include the master BS and at least one slave BS for providing a service to the MS, and receiving an authentication context for an MS included in the cloud cell from the master BS; and if the authentication context includes a first authentication key, generating a first encryption key using the first authentication key and communicating with the MS using the first encryption key.

In accordance with yet another aspect of the present disclosure there is provided a Mobile Station (MS) for managing a security key for communication authentication with the MS in a communication system. The MS includes a communication unit for acquiring a first authentication key by performing an authentication procedure in a cloud cell having member Base Stations (BSs) that include a master BS and at least one slave BS for providing a service to the MS, and communicating with at least one member BS using a first encryption key that is generated using the first authentication key.

In accordance with still another aspect of the present disclosure, there is provided a master Base Station (BS) for managing a security key for communication authentication with a Mobile Station (MS) in a communication system. The master BS includes a communication unit for acquiring an authentication context for the MS by performing an authentication procedure for the communication authentication with the MS in a cloud cell having member Base Stations (BSs) that include a master BS and at least one slave BS for providing a service to the MS, and communicating with the MS using a first encryption key that is acquired from the authentication context.

In accordance with still another aspect of the present disclosure, there is provided a slave Base Station (BS) for managing a security key for communication authentication with a Mobile Station (MS) in a communication system. The slave BS includes a communication unit for performing a member Base Station (BS) subscription procedure for a cloud cell with a master BS included in the cloud cell having member BSs that include the master BS and at least one slave BS for providing a service to the MS, and receiving an authentication context for the MS included in the cloud cell from the master BS; and a controller for, if the authentication context includes a first authentication key, controlling a security key generator to generate a first encryption key using the first authentication key, and controlling the communication unit to communicate with the MS using the first encryption key.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, the same drawing reference numerals will be understood to refer to the same elements, features and structures.

DETAILED DESCRIPTION OF THE INVENTION

FIGS. 1 through 26, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. In the following description, specific details such as detailed configuration and components are merely provided to assist the overall understanding of exemplary embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

An embodiment of the present disclosure provides an authentication procedure for data transmission/reception in a cloud cell-based wireless communication system in which a plurality of BSs provide communication services to an MS in cooperation with each other. For a better understanding of the present disclosure, an authentication procedure for data transmission/reception performed in the general wireless communication system will be described first, and then, an authentication procedure performed in a cloud cell according to an embodiment of the present disclosure will be described.

Figure 1:
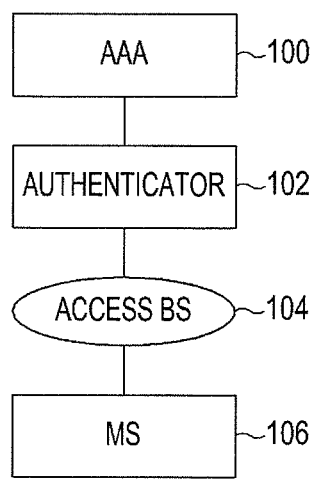
FIG. 1 illustrates a schematic configuration of a general wireless communication system for handling authentication of an MS and data encryption.

FIG. 1 illustrates a schematic configuration of a general wireless communication system for handling authentication of an MS and data encryption.

Referring to FIG. 1, the general wireless communication system includes an MS 106, an access BS 104, an Access Service Network GateWay (hereinafter referred to as an "authenticator") 102, and an Authentication, Authorization and Accounting server (AAA) 100.

The MS 106 receives a service that an access service network provides via the access BS 104, and the access BS 104 controls wireless resources for the MS 106 and provides a wireless access point needed for communication of the MS 106.

The authenticator 102 manages security keys for authentication and data encryption for the data to be exchanged with the MS 106. The authenticator 102 controls an operation of the access service network for the MS 106, and also serves as a paging control station for managing an idle mode operation of the MS 106. The AAA 100 provides an access network authentication service for the MS 106.

As shown in FIG. 1, the general wireless communication system manages security keys for authentication and data encryption in a scenario where one MS receives a data service via one access BS.

An embodiment of the present disclosure provides a method for managing security keys for authentication and data encryption in a wireless communication system in which a plurality of BSs form a cloud cell in cooperation with each other and perform data exchange or data transmission/reception with an MS in the cloud cell.

A cloud cell will be described below, which is aimed to provide more efficient services to users taking into account the characteristics of high-frequency bands to be used in the wireless communication system to which the present disclosure is applicable. The cloud cell defined in the present disclosure refers to a virtual cell consisting of a plurality of BSs that are located around an MS and provide a service to the MS, and is assumed to operate, for example, in millimeter wave (mmW) bands that can provide broadband services, or in the general cellular bands (e.g., sub 1 GHz, 1.8-2.5 GHz, 3.5-3.6 GHz, etc.).

Figure 2A:
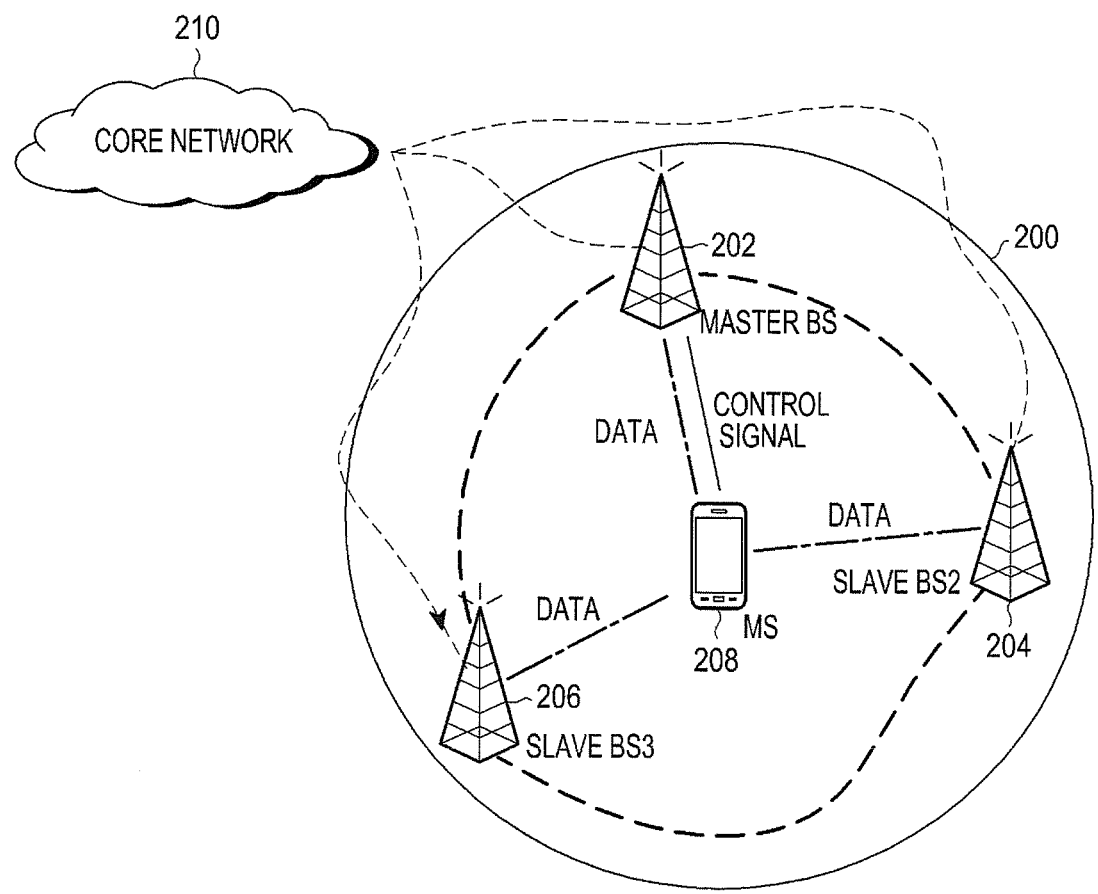
FIG. 2A illustrates a configuration of a cloud cell according to an embodiment of the present disclosure.

FIG. 2A illustrates a configuration of a cloud cell according to an embodiment of the present disclosure.

Referring to FIG. 2A, for convenience of description, a cloud cell 200 is assumed to include an MS 208 and, for example, three BSs 202, 204 and 206, which transmit data to the MS 208. It should be noted that the number of BSs constituting the cloud cell is subject to change.

The master BS 202 may transmit both a control signal and data to the MS 208, and manage the remaining BSs, i.e., a slave BS2 204 and a slave BS3 206. The slave BS2 204 and the slave BS3 206 may transmit only data to the MS 208 unless they receive special instructions from the master BS 202. The data that the master BS 202, the slave BS2 204 and the slave BS3 206 transmit to the MS 208 may be the same or different.

The master BS 202, the slave BS2 204 and the slave BS3 206 are directly connected to a core network 210, and are directly connected to each other in a wired or wireless manner.

The master BS 202, the slave BS2 204 and the slave BS3 206 may increase the reliability of low-power links in high-frequency bands as they all serve the MS 208, and may increase the throughput by providing a plurality of high-quality links to the MS 208. In addition, they may reduce the delay due to handover operations of the MS 208 located at the edge of their own cell.

In the cloud cell 200, the master BS 202, the slave BS2 204 and the slave BS3 206 may transmit data to the MS 208 at the same time or with a time difference. Similarly, the MS 208 may transmit data to the master BS 202, the slave BS2 204 and the slave BS3 206 at the same time or with a time difference. To this end, the MS 208 may have multiple Radio Frequency (RF) chains.

In the cloud cell-based wireless communication system, an MS perform data exchange with multiple BSs belonging to the cloud cell. When the MS moves between BSs belonging to the cloud cell, the handover operation in the general wireless communication system is not required. Therefore, the cloud cell-based wireless communication system may manage the boundless mobility for the MS.

In an embodiment of the present disclosure, an MS performs an operation of managing security keys including an authentication key and a data encryption key, which are for its authentication with multiple BSs and data encryption, respectively, in order to perform data exchange with multiple BSs belonging to the cloud cell.

Figure 2B:
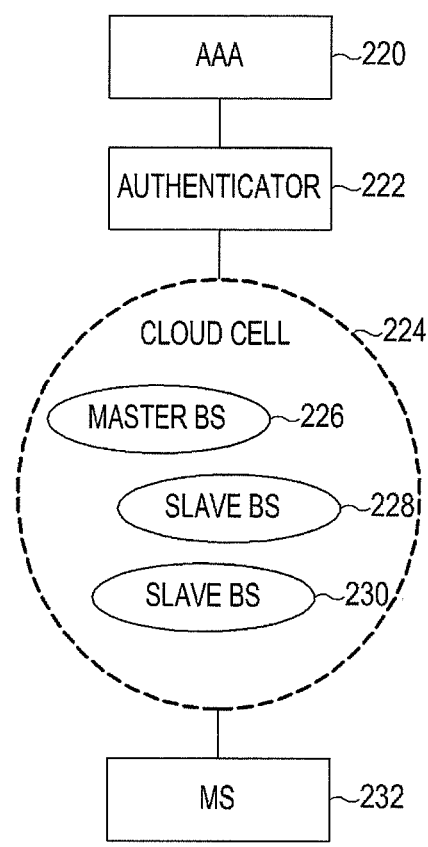
FIG. 2B illustrates an exemplary configuration of a wireless communication system for performing an authentication procedure such as authentication of an MS and data encryption in a cloud cell according to an embodiment of the present disclosure.

FIG. 2B shows exemplary configuration of a wireless communication system for performing an authentication procedure such as authentication of an MS and data encryption in a cloud cell according to an embodiment of the present disclosure.

Referring to FIG. 2B, the cloud cell-based wireless communication system includes an MS 232, a cloud cell 224, an authenticator 222, and an AAA 220. The authenticator 222 and the AAA 220 may be configured separately as shown in FIG. 2B, or may be configured in the form of a single block although not shown in the drawing.

The cloud cell 224 includes a master BS 226 for providing a wireless access point of an access service network to the MS 232, and slave BSs 228 and 230. The master BS 226 provides a data service to the MS 232 by controlling the slave BSs 228 and 230 belonging to the cloud cell 224. In the cloud cell 224, the slave BSs 228 and 230 perform data exchange with the MS 232 by assisting the master BS 226. The authenticator 222 performs an authentication procedure such as managing security keys for authentication and data encryption for the data of the MS 232. The authenticator 222 controls an operation of the access service network for the MS 232, and also serves as a paging control station for managing an idle mode operation of the MS 232. The AAA 220 provides an access network authentication service for the MS 232

Exemplary embodiments of the present disclosure will be described below in brief.

In a first embodiment of the present disclosure, a cloud seed is used as an input value for generation of an authentication key, and the authentication key is equally used during generation of a data encryption key needed for data exchange between the MS 232 and member BSs. The member BSs include the master BS 226 and the slave BSs 228 and 230 included in the cloud cell 224 to which the MS 232 belongs.

In this specification, a master BS and slave BSs included in a cloud cell will be referred to as 'member BSs'.

The cloud seed may be a value that is generated by the authenticator 222 or the AAA 220 and delivered to the MS 232, or may be a value that is selected by a rule that the MS 232 shares in advance with the authenticator 222 or the AAA 220. The cloud seed is changed when at least one of the member BSs in the cloud cell 224 is deleted. The deleted member BS may be the master BS 226 or one of the slave BSs 228 and 230 in the cloud cell 224.

In a second embodiment of the present disclosure, an identifier of the master BS 226 in the cloud cell 224 to which the MS 232 belongs is used as an input value for generation of an authentication key, and the authentication key is equally used during generation of a data encryption key needed for data exchange between the MS 232 and the member BSs. The encryption key is generated by the authenticator 222, the AAA 220 or the MS 232, and may also be generated by the master BS 226 or each of the slave BSs 228 and 230 depending on the circumstances. If the master BS 226 of the cloud cell 224 is changed to (or replaced by) a new master BS, a new authentication key is generated using an identifier of the new master BS. Based on the new authentication key, a new data encryption key is generated, which is needed for data exchange between the MS and the member BSs including the new master BS added to the cloud cell 224. If any slave BS among the member BSs of the cloud cell is added or deleted, i.e., if there is no change in the master BS, the currently used security keys, i.e., the authentication key and the data encryption key are maintained.

In a third embodiment of the present disclosure, an authentication key is generated individually for the master BS 226 and each of the slave BSs 228 and 230 among the member BSs of the cloud cell 224 to which the MS 232 belongs. In other words, an authentication key generated using an identifier of the master BS 226 is used during generation of a data encryption key between the MS and the master BS 226. An authentication key generated using an identifier of the slave BS 228 is used during generation of a data encryption key between the MS 232 and the slave BS 228 among the member BSs. Similarly, an authentication key generated using an identifier of the slave BS 230 is used during generation of a data encryption key between the MS 232 and the slave BS 230. If there is a deleted member BS among the member BSs of the cloud cell 224, the security keys (i.e., an authentication key and a data encryption key) generated by the deleted member BS are deleted. The deleted member BS may be the master BS or the slave BS.

In a fourth embodiment of the present disclosure, an identifier of the master BS 226 of the cloud cell 224 to which the MS 232 belongs is used as an input value for generation of an authentication key, and the authentication key is used during generation of a data encryption key needed for data exchange between the MS 232 and the member BSs. The member BSs include the master BS 226 and the slave BSs 228 and 230 included in the cloud cell 224 to which the MS 232 belongs. The encryption key is generated by the authenticator 222, the AAA 220 or the master BS 226. The authentication key and the data encryption key may be managed or not be used by the slave BSs 228 and 230. If the master BS 226 of the cloud cell 224 is changed to a new master BS, a new authentication key is generated using an identifier of the new master BS. Based on the new authentication key, a data encryption key needed for data exchange between the MS 232 and the member BSs is generated.

In a fifth embodiment of the present disclosure, the MS 232 generates a cloud seed as an input value for generation of an authentication key. The MS 232 delivers the cloud seed to its member BSs, i.e., the master BS 226 and the slave BSs 228 and 230 included in the cloud cell 224. If a member BS is added to the cloud cell 224, the MS 232 delivers the cloud seed to the added member BS. Each of the MS 232 and the member BSs having received the cloud seed from the MS 232 generates an authentication key by using the cloud seed as an input value. In addition, each of the MS 232 and the member BSs having received the cloud seed from the MS 232 generates a data encryption key using the authentication key. If any slave BS among the member BSs of the cloud cell 224 is deleted, the currently used cloud seed may be maintained, or the MS 232 may generate a new cloud seed and deliver the new cloud seed to the member BSs.

In a sixth embodiment of the present disclosure, the MS 232 generates a cloud seed as an input value for generation of an authentication key. The master BS 226 delivers the cloud seed it has received from the MS 232, to its member BSs, i.e., the slave BSs 228 and 230. If a member BS is added to the cloud cell 224, the master BS 226 delivers the cloud seed to the added member BS. Each of the MS 232 and the member BSs having received the cloud seed from the MS 232 generates an authentication key by using the cloud seed as an input value. In addition, each of the MS 232 and the member BSs having received the cloud seed from the MS 232 generates a data encryption key using the authentication key. If any slave BS among the member BSs of the cloud cell 224 is deleted, the currently used cloud seed may be maintained, or the MS 232 may generate a new cloud seed. In this case, the master BS 226 delivers the new cloud seed to the member BSs.

First Embodiment

Figure 3:
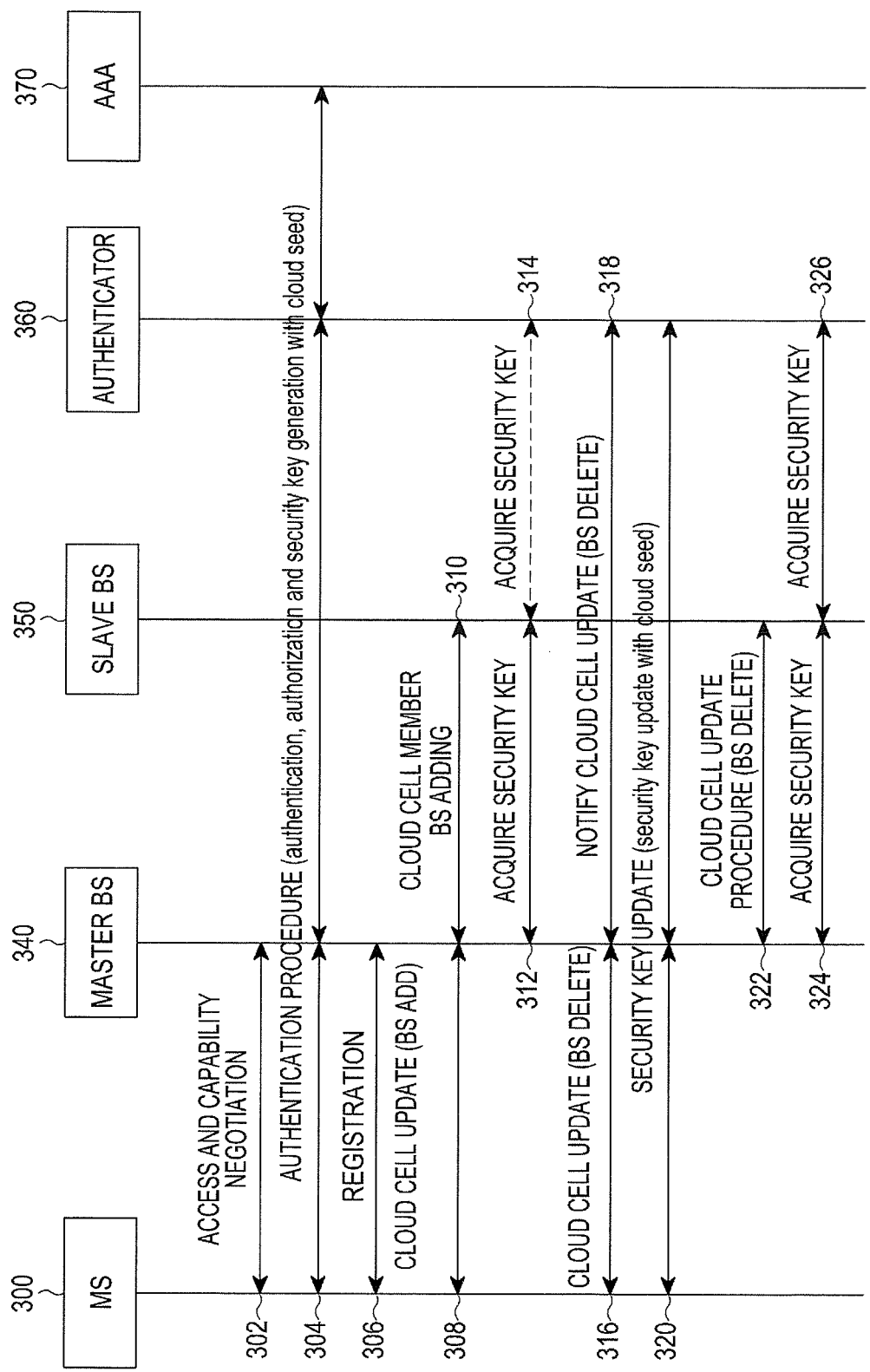
FIG. 3 illustrates a signal flow diagram for managing security keys for authentication and data encryption in a cloud cell-based wireless communication system according to a first embodiment of the present disclosure.

FIG. 3 illustrates a signal flow diagram for managing security keys for authentication and data encryption in a cloud cell-based wireless communication system according to a first embodiment of the present disclosure.

Referring to FIG. 3, in step 302, an MS 300 performs an access and capability negotiation (also known as 'ranging and capability negotiation') procedure with a master BS 340.

In step 304, an access network authentication and data encryption procedure for the MS 300 is performed between the MS 300 and the master BS 340, an access network authentication and data encryption procedure for the MS 300 is performed between the master BS 340 and an authenticator 360, and an access network authentication and data encryption procedure for the MS 300 is performed between the authenticator 360 and an AAA 370. The authentication process information needed between the MS 300 and the master BS 340, between the master BS 340 and the authenticator 360, and between the authenticator 360 and the AAA 370 is transmitted using an authentication negotiation message exchanged between the MS 300 and the master BS 340, an access network authentication negotiation message exchanged between the master BS 340 and the authenticator 360, and an authentication message exchanged between the authenticator 360 and the AAA 370.

During the authentication procedure in step 304, the MS 300 and the authenticator 360 generate an authentication context, i.e., an authentication key based on a master key provided from the AAA 370. In the first embodiment of the present disclosure, the authentication key or the authentication context is generated using Equation (1) below.

$$\text{Authentication Key} = \text{Dot16KDF}(\text{PMK}, \text{MSID}|\text{Cloud Seed}|\text{"AK"}, \text{AK\_length}) \quad (1)$$

where PMK denotes a Pairwise Master Key (PMK), which is an example of the master key, MSID (Mobile Station IDentifier) denotes an identifier of an MS, Cloud Seed denotes an authentication seed for a cloud cell to which the MS belongs, "AK" denotes a character string indicating an authentication key for data encryption, and Dot16KDF denotes an algorithm that generates an authentication key with a length of AK_length bits by using PMK, MSID, Cloud Seed and "AK" as its input values.

In the cloud cell to which the MS belongs, the cloud seed is used as an input value for generating the authentication key, and the same authentication key generated with the cloud seed is used in data encryption needed for data exchange between the MS and all BSs belonging to the cloud cell. The cloud seed may be a value that is generated by the authenticator 360 or the AAA 370 and delivered to the MS 300 by signaling, or may be a value that is selected by a rule that the MS 300 shares in advance with the authenticator 360 or the AAA 370.

The cloud seed may be changed when any member BS is deleted from a cloud cell member BS list for managing member BSs in the cloud cell. In this case, the changed cloud seed may be a value that is newly generated by the authenticator 360 or the AAA 370, or may be a value that is selected again by a rule that the MS 300 shares in advance with the authenticator 360 or the AAA 370. Furthermore, in step 304, the authenticator 360 delivers the authentication key generated using Equation (1) to the master BS 340. Then, the master BS 340 generates a data encryption key used for data exchange with the MS 300, using the authentication key. Otherwise, using the authentication key, the authenticator 360 directly generates a data encryption key to be used by the MS 300 and the master BS 340, and delivers the generated data encryption key to the master BS 340. Thereafter, in step 306, the MS 300 performs a registration procedure through the master BS 340, and performs data exchange with the master BS 340.

Thereafter, in step 308, the MS 300 and the master BS 340 perform a cloud cell update procedure for adding a slave BS 350 to the cloud cell member BS list. The cloud cell update procedure in this specification may include an operation in which a new BS is added to the cloud cell member BS list for managing member BSs of the cloud cell, an operation in which an existing, member BS(s) is deleted from the cloud cell member BS list, an operation in which the existing master BS is changed to a slave BS, and an operation in which an existing slave BS is changed to a master BS.

In step 310, the slave BS 350 performs a cloud cell member BS adding procedure with the master BS 340. If the slave BS 350 is added to the cloud cell member BS list of the MS 300, the slave BS 350 is provided with a security key that the slave BS 350 will use for its communication with the MS 300. Then, if the slave BS 350 is provided only with the authentication key from the master BS 340 in step 312, or is provided only with the authentication key for the MS 300 from the authenticator 360 in step 314, the slave BS 350 directly generates a data encryption key for the MS 300 using the authentication key.

Thereafter, in step 316, the MS 300 and the master BS 340 perform a cloud cell update procedure for deleting any member BS from the cloud cell member BS list. In step 318, the master BS 340 notifies the authenticator 360 of the fact that an arbitrary member BS is deleted from the cloud cell member BS list. Then, in step 320, a security key update procedure for re-generating an authentication key for the MS 300 is performed. In the security key update procedure of step 320, a cloud seed for reconfiguring an authentication key of the MS 300 is newly generated, and a new authentication key is generated using the generated new cloud seed and Equation (1). In step 320, the authenticator 360 delivers a new authentication key generated using the new cloud seed to the master BS 340, or delivers a data encryption key for the MS 300, which is generated based on the new authentication key, to the master BS 340. If the master BS 340 is provided only with the new authentication key, the master BS 340 directly generates a new data encryption key that master BS 340 will use during data exchange with the MS 300.

In step 322, the master BS 340 notifies even the slave BS 350 of the fact that the member BS is deleted from the cloud cell member BS list. Then, based on the notification, the slave BS 350 performs a cloud cell update procedure for deleting the member BS from the cloud cell member BS list.

In step 324, the master BS 340 delivers the new authentication key or the new data encryption key to the slave BS 350. Otherwise, in step 326, the authenticator 360 delivers the new authentication key or the new data encryption key to the slave BS 350. If the slave BS 350 receives only the new authentication key from the master BS 340 or the authenticator 360, the slave BS 350 generates a new data encryption key using, the new authentication key.

If the master BS 340 is deleted from the cloud cell member BS list by the cloud cell update procedure of step 316, a new master BS performs the procedures of steps 320 to 324.

Figure 4A:
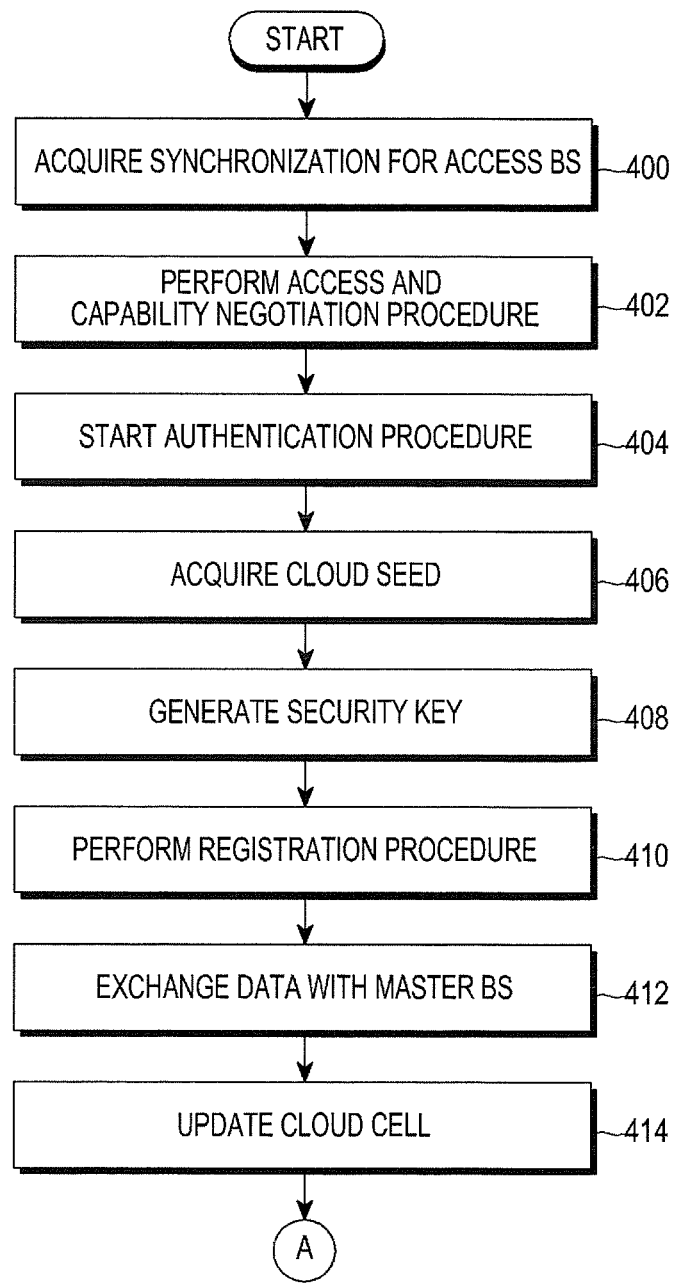
FIGS. 4A and 4B illustrate an operation of an MS in a cloud cell-based wireless communication system according to the first embodiment of the present disclosure.
Figure 4B:
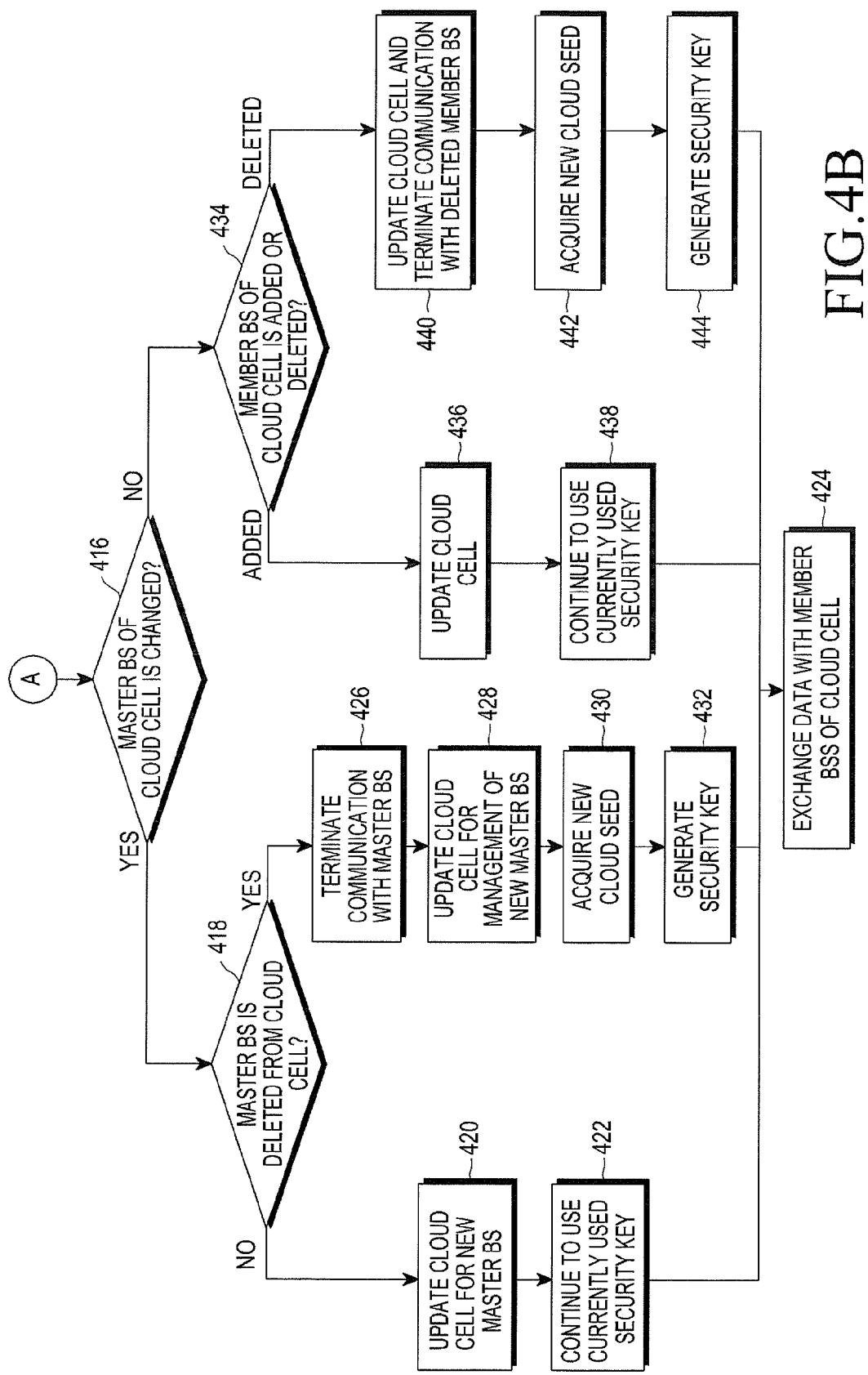

FIGS. 4A and 4B illustrate an operation of an MS in a cloud cell-based wireless communication system according to the first embodiment of the present disclosure.

Referring to FIG. 4A, the MS acquires synchronization for an access BS in step 400, and performs an access and capability negotiation procedure with the access BS in step 402.

In step 404, the MS starts an authentication procedure with an authenticator and an AAA through the access BS. In step 406, the MS acquires a cloud seed. The cloud seed is a value that is received from the authenticator or the AAA, or a value that is selected by a rule that the MS shares in advance with the authenticator or the AAA.

In step 408, the MS generates an authentication key to be used for its data exchange with the access BS using the cloud seed and Equation (1), and generates a data encryption key using the generated authentication key. In step 410, the MS performs a registration procedure with the access BS, to set the access BS as a master BS of the cloud cell. In step 412, the MS performs data exchange with the master BS using the data encryption key.

In step 414, the MS performs a cloud cell update procedure for adding the master BS to a cloud cell member BS list, and then proceeds to step 416 in FIG. 4B.

Referring to FIG. 4B, the MS determines in step 416 whether a master BS of the cloud cell is changed. If the master BS is changed, the MS determines in step 418 whether the master BS is deleted from the cloud cell member BS list. If the master BS is not deleted, the MS performs a cloud cell update procedure for adding a new master BS to the cloud cell member BS list in step 420. In step 422, the MS keeps the currently used authentication key and encryption key. In step 424, the MS exchanges data with the member BSs of the cloud cell using the currently used authentication key and data encryption key.

If it is determined in step 418 that the master BS is deleted, the MS terminates its communication with the master BS in step 426. In step 428, the MS performs a cloud cell update procedure for adding a new master BS to the cloud cell member BS list. In step 430, the MS acquires a new cloud seed. In step 432, the MS generates new security keys using the new cloud seed and Equation (1). The security keys include an authentication key and a data encryption key. Thereafter, the MS performs data exchange with the member BSs of the cloud cell in step 424, using the new data encryption key generated in step 432.

If it is determined in step 416 that the master BS of the cloud cell is not changed, the MS determines in step 434 whether there is an added new BS or a deleted member BS among the member BSs of the cloud cell. If there is an added new BS, the MS performs a cloud cell update procedure for adding the new BS to the cloud cell member BS list in step 436. In step 438, the MS continues to use the currently used authentication key. In step 424, the MS performs data exchange with the member BSs of the cloud cell that includes the added new BS.

If it is determined in step 434 that there is a deleted member BS among the member BSs of the cloud cell, the MS performs a cloud cell update procedure for deleting the deleted member BS from the cloud cell member BS list and terminates its communication with the deleted member BS in step 440. In step 422, the MS acquires a new cloud seed. In step 444, the MS generates a new authentication key using the acquired cloud seed and Equation (1), and generates a new data encryption key based on the new authentication key. Thereafter, in step 424, the MS performs data exchange with the remaining member BSs except for the deleted member BS using the new data encryption key.

Figure 5A:
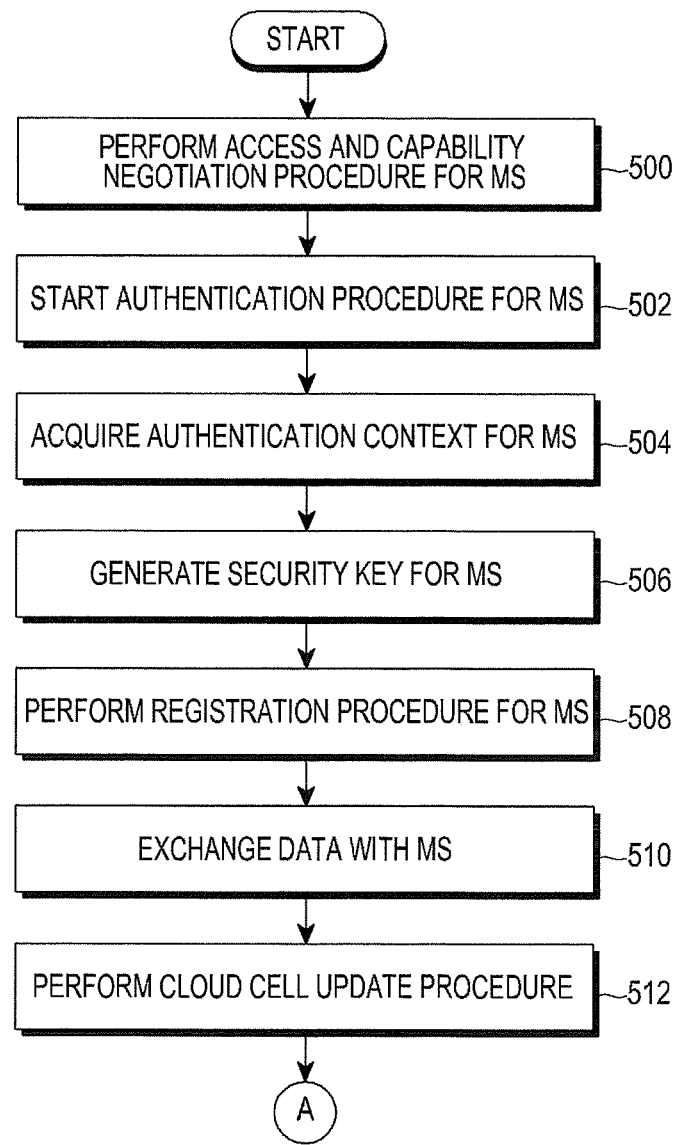
FIGS. 5A and 5B illustrate an operation of a master BS in a cloud cell-based wireless communication system according to the first embodiment of the present disclosure.
Figure 5B:
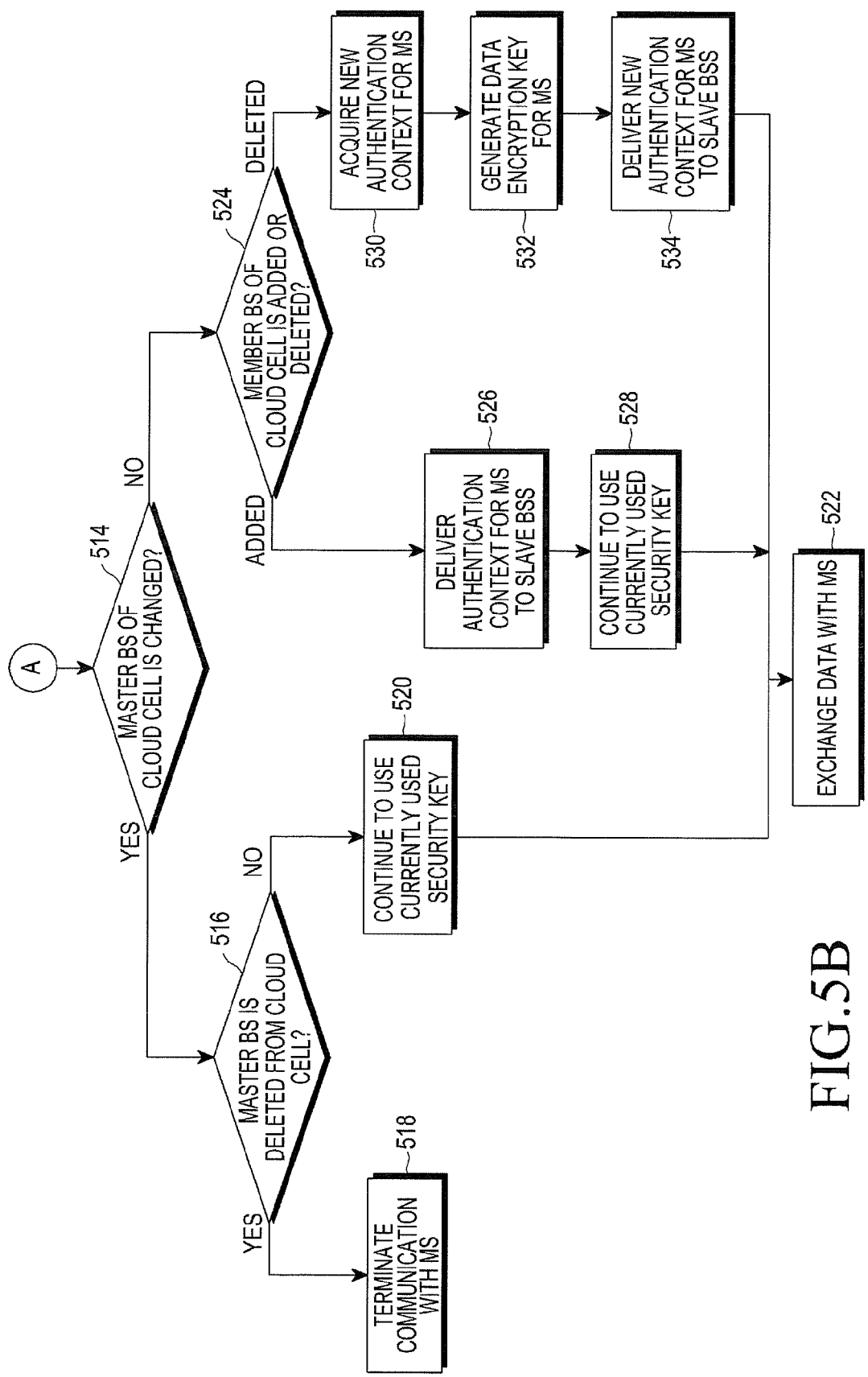

FIGS. 5A and 5B illustrate an operation of a master BS in a cloud cell-based wireless communication system according to the first embodiment of the present disclosure.

Referring to FIG. 5A, the master BS performs an access and capability negotiation procedure for an MS in step 500. In step 502, the master BS starts an authentication procedure for the MS. In step 504, the master BS receives an authentication context for the MS from an authenticator. The authentication context is an authentication key for the MS or a data encryption key for the MS. If the authentication context received in step 504 is an authentication key for the MS, the master BS generates a data encryption key for the MS using, the authentication key in step 506. In step 508, the master BS performs a registration procedure for the MS. In step 510, the master BS exchanges data with the MS using the data encryption key.

In step 512, the master BS performs a cloud cell update procedure for adding the master BS itself to a cloud cell member BS list, and then proceeds to step 514 in FIG. 5B.

Referring to FIG. 5B, the master BS determines in step 514 whether the master BS of the cloud cell is changed.

If the master BS is changed, the master BS determines in step 516 whether the master BS itself is deleted from the cloud cell member BS list. If the master BS is deleted from the cloud cell member BS list, the master BS terminates its communication with the MS in step 518.

If the master BS is not deleted from the cloud cell member BS list, the master BS continues to use the currently used authentication key and data encryption key for the MS in step 520, and performs data exchange with the MS in step 522.

If it is determined in step 514 that the master BS is not changed, the master BS determines in step 524 whether there is an added new BS or a deleted member BS among the member BSs of the cloud cell. If there is an added new BS, the master BS delivers the currently used authentication key or data encryption key to slave BSs as an authentication context for the MS in step 526. The master BS keeps the currently used data encryption key in step 528, and performs data exchange with the MS using the currently used data encryption key in step 522.

If it is determined in step 524 that there is a deleted member BS among the member BSs of the cloud cell, the master BS receives a new authentication context for the MS from the authenticator in step 530. The new authentication context is assumed to include only a new authentication key for the MS.

In step 532, the master BS generates a data encryption key for the MS using the new authentication key. If the new authentication context includes a new encryption key for the MS, step 532 is optional. In step 534, the master BS delivers the new authentication context for the MS, which is received in step 530, to the slave BSs. The new authentication context includes a new authentication key and a new encryption key. Thereafter, in step 522, the master BS performs data exchange with the MS using the new data encryption key.

Figure 6:
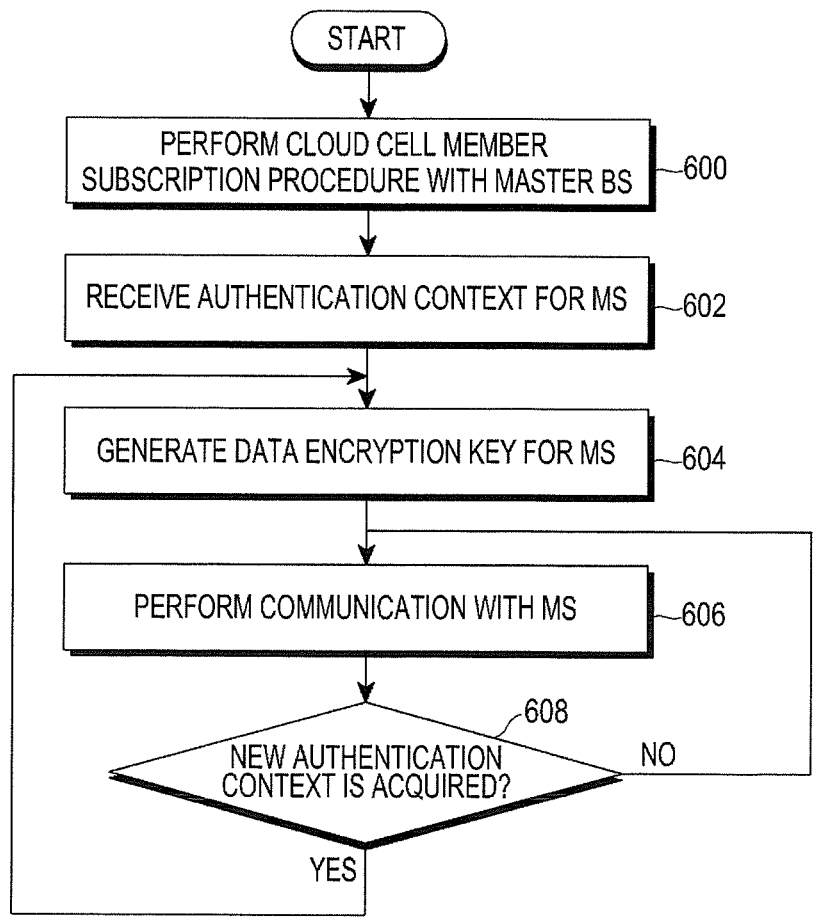
FIG. 6 illustrates an operation of a slave BS in a cloud cell-based wireless communication system according to the first embodiment of the present disclosure.

FIG. 6 illustrates an operation of a slave BS in a cloud cell-based wireless communication system according to the first embodiment of the present disclosure.

Referring, to FIG. 6, the slave BS performs a cloud cell member subscription procedure with a master BS in step 600. In step 602, the slave BS receives an authentication context for an MS from the master BS or an authenticator. The authentication context corresponds to an authentication key for the MS, or a data encryption key for the MS.

If the authentication context received in step 602 includes only the authentication key for the MS, the slave BS generates a data encryption key for the MS using the authentication key in step 604. In step 606, the slave BS performs data exchange with the MS using the data encryption key.

Thereafter, the slave BS determines in step 608 whether a new authentication context for the MS is received. If the new authentication context for the MS is not received, the slave BS returns to step 606.

If it is determined in step 608 that the new authentication context for the MS is received, and the received new authentication context includes only the new authentication key, the slave BS generates a new data encryption key for the MS using the new authentication key in step 604, and then proceeds to step 606.

If the received new authentication context includes a new data encryption key for the MS, the slave BS omits step 604, and performs data exchange with the MS using the data encryption key in step 606.

Figure 7:
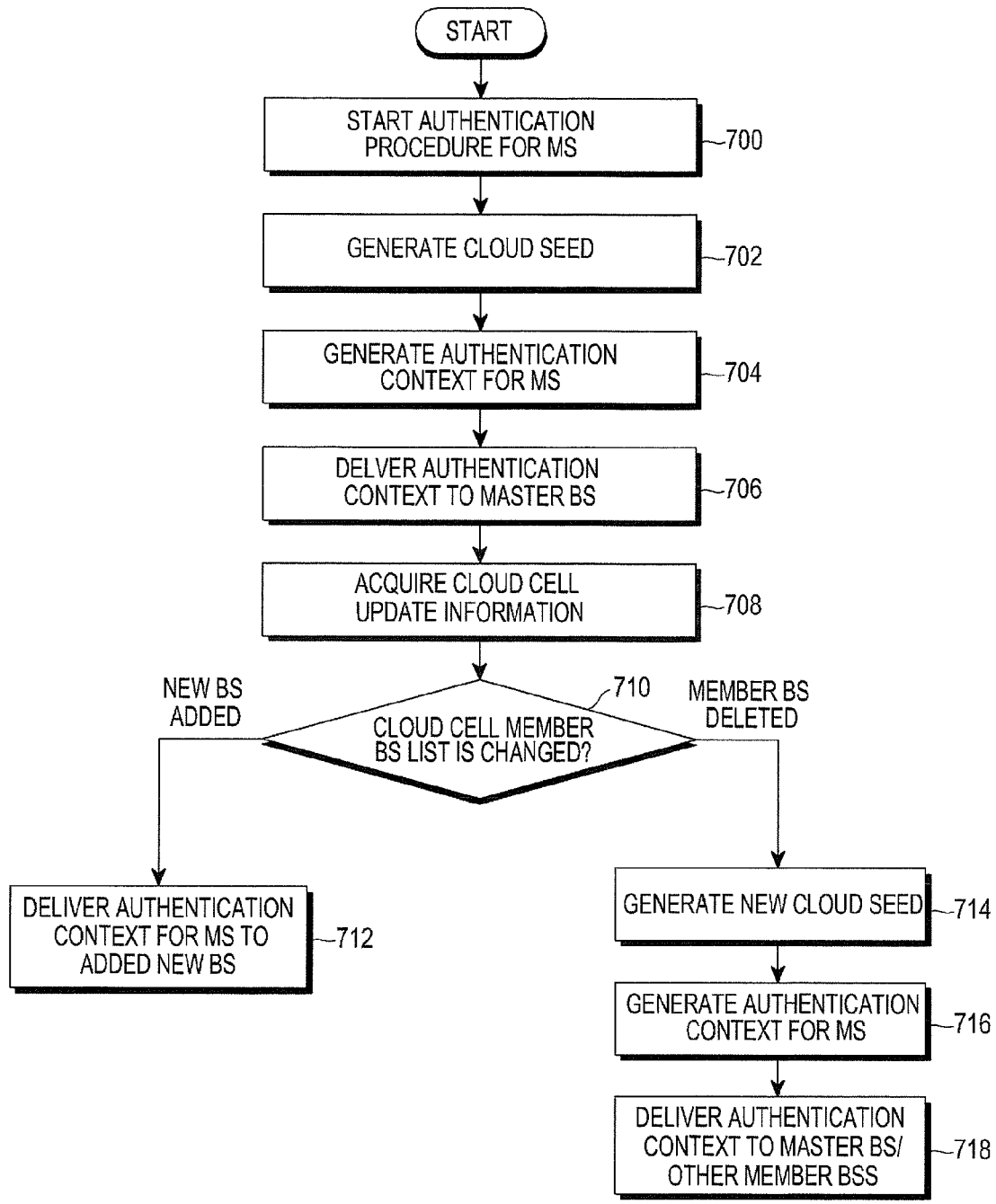
FIG. 7 illustrates an operation of an authenticator in a cloud cell-based wireless communication system according to the first embodiment of the present disclosure.

FIG. 7 illustrates an operation of an authenticator in a cloud cell-based wireless communication system according to the first embodiment of the present disclosure.

Referring to FIG. 7, the authenticator starts an authentication procedure for an MS in step 700. In step 702, the authenticator generates a cloud seed for generating an authentication key for the MS. The cloud seed is generated by and received from an AAA, or corresponds to information that the authenticator generates by itself. In other words, the cloud seed is a value that is selected by a common rule shared with the MS, or a value that is arbitrarily generated by the AAA or the authenticator.

In step 704, the authenticator generates an authentication context for the MS. The authentication context for the MS includes an authentication key for the MS, or a data encryption key for the MS.

Specifically, the authenticator generates an authentication key for the MS using the cloud seed and Equation (1). In step 706, the authenticator delivers the authentication key to a master BS of the MS as an authentication context. The authenticator may generate a data encryption key for the MS using the authentication key, and deliver it to the master BS as the authentication context.

In step 708, the authenticator acquires the cloud cell update information through the master BS. Based on the cloud cell update information, the authenticator determines in step 710 whether there is any change in the member BSs constituting the cloud cell member BS list. If the cloud cell update information indicates the existence of an added new BS in the cloud cell member BS list, the authenticator delivers the authentication key or data encryption key for the MS to the new BS as an authentication context for the MS in step 712. If the master BS serves to deliver the authentication key or data encryption key for the MS to the new BS, the authenticator may skip step 712.

If the cloud cell update information indicates the existence of a deleted member BS in the cloud cell member BS list, the authenticator newly acquires a cloud seed in step 714. In step 716, the authenticator generates only a new authentication key for the MS using Equation (1) based on the new cloud seed, or further generates a new data encryption key using the new authentication key. In step 718, the authenticator delivers a new authentication context including the new authentication key or the new data encryption key, to the master BS. If the master BS does not deliver the new authentication context to slave BSs, the authenticator may deliver the new authentication context to the slave BSs in step 718.

If the master BS is not deleted from the cloud cell member BS list even though the cloud cell update information acquired in step 708 indicates a change in the master BS, the authenticator simply performs a cloud cell update procedure for setting the new master BS as a master BS.

Second Embodiment

Figure 8:
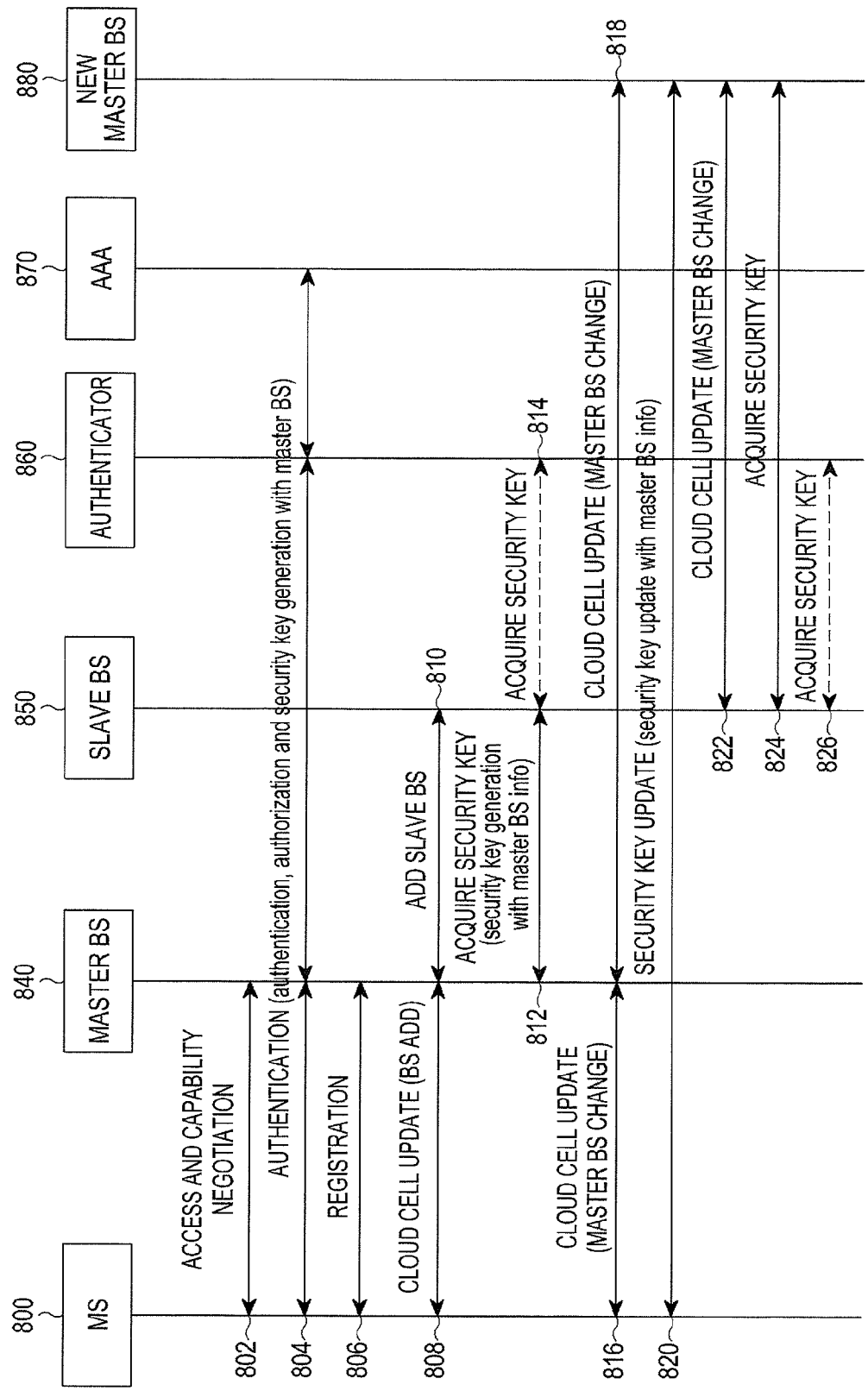
FIG. 8 illustrates a signal flow diagram for managing security keys for authentication and data encryption in a cloud cell-based wireless communication system according to a second embodiment of the present disclosure.

FIG. 8 illustrates a signal flow diagram for managing security keys for authentication and data encryption in a cloud cell-based wireless communication system according to a second embodiment of the present disclosure.

Referring to FIG. 8, an MS 800 performs an access and capability negotiation procedure with a master BS 840 in step 802.

In step 804, an access network authentication and data encryption procedure for the MS 800 is performed between the MS 800 and the master BS 840, an access network authentication and data encryption procedure for the MS 800 is performed between the master BS 840 and an authenticator 860, and an access network authentication and data encryption procedure for the MS 800 is performed between the authenticator 860 and an AAA 870. The authentication process information needed between the MS 800 and the master BS 840, between the master BS 840 and the authenticator 860, and between the authenticator 860 and the AAA 870 is transmitted using an authentication negotiation message exchanged between the MS 800 and the master BS 840, an access network authentication negotiation message exchanged between the master BS 840 and the authenticator 860, and an authentication message exchanged between the authenticator 860 and the AAA 870.

During the authentication procedure in step 804, the MS 800 and the authenticator 860 generate an authentication context, i.e., an authentication key based on a master key provided from the AAA 870. In the second embodiment of the present disclosure, the authentication key is generated using Equation (2) below.

$$\text{Authentication Key} = \text{Dot16KDF}(\text{PMK}, \text{MSID}|\text{Master BSID}|\text{"AK"}, \text{AK\_length}) \quad (2)$$

where PMK denotes a pairwise master key, MSID denotes an identifier of an MS, Master BSID denotes an identifier of a master BS of a cloud cell to which the MS belongs, "AK" denotes a character string indicating an authentication key for data encryption, and Dot16KDF denotes an algorithm that generates an authentication key with a length of AK_length bits by using PMK, MSID, Master BSID, and "AK" as its input values.

In step 804, the authenticator 860 delivers the authentication key generated using an identifier of the master BS 840 and Equation (2) to the master BS 840. The master BS 840 directly generates a data encryption key for data exchange with the MS 800 using the authentication key. Otherwise, using the authentication key, the authenticator 860 directly generates a data encryption key to be used by the MS 800 and the master BS 840, and delivers the generated data encryption key to the master BS 840.

Thereafter, in step 806, the MS 800 performs a registration procedure through the master BS 840, and performs data exchange with the master BS 840.

Thereafter, in step 808, the MS 800 and the master BS 840 perform a cloud cell update procedure for adding a slave BS 850 to a cloud cell member BS list.

In step 810, the slave BS 850 performs a cloud cell member BS adding procedure with the master BS 840. If the slave BS 850 is added to the cloud cell member BS list of the MS 800, the slave BS 850 is provided with a security key that the slave BS 850 will use for its communication with the MS 800. The security key corresponds to an authentication key or a data encryption key for the MS 800. If the slave BS 850 receives only the authentication key from the master BS 840 in step 812, or receives only the authentication key for the MS 800 from the authenticator 860 in step 814, the slave BS 850 directly generates a data encryption key using the authentication key.

Thereafter, in step 816, the MS 800 and the master BS 840 performs a procedure for changing or replacing a master BS of the cloud cell by performing a cloud cell update procedure. In other words, through the cloud cell update procedure, a new master BS 880 instead of the master BS 840 is changed to a master BS of the cloud cell. In step 818, the new master BS 880 notifies the authenticator 860 of the fact that the new master BS 880 itself is changed to a master BS of the cloud cell. Then, in step 820, the MS 800 and the authenticator 860 perform a security key update procedure for re-generating an authentication key using an identifier of the new master BS 880. In the security key update procedure of step 820, the new master BS 880 generates a new authentication key for the MS 800 using its own identifier and Equation (2). Thereafter, the authenticator 860 delivers the new authentication key to the new master BS 880, or delivers, to the new master BS 880, a data encryption key for the MS that the authenticator 860 has generated based on the new authentication key. If the new master BS 880 receives only the new authentication key for the MS 800, the new master BS 880 directly generates a new data encryption key for the MS using the new authentication key.

In step 822, the new master BS 880 notifies even the slave BS 850 in the cloud cell of the fact that the new master BS 880 itself is changed to a master BS of the cloud cell. Upon receiving the notification, the slave BS 850 performs a cloud cell update procedure for setting the new master BS 880 as (or instead of) the master BS 840.

In step 824, the new master BS 880 delivers the new authentication key for the MS 800 or the new data encryption key for the MS 800 to the slave BS 850. Otherwise, in step

826, the authenticator 860 delivers the new authentication key for the MS 800 or the new data encryption key for the MS 800 to the slave BS 850.

If the master BS 840 is maintained as a master BS of the cloud cell even though the slave BS 850 is deleted from the cloud cell member BS list in accordance with the cloud cell update procedure, the currently used security keys (i.e., the authentication key and the data encryption key) generated by the identifier of the master BS 840 are kept.

Figure 9A:
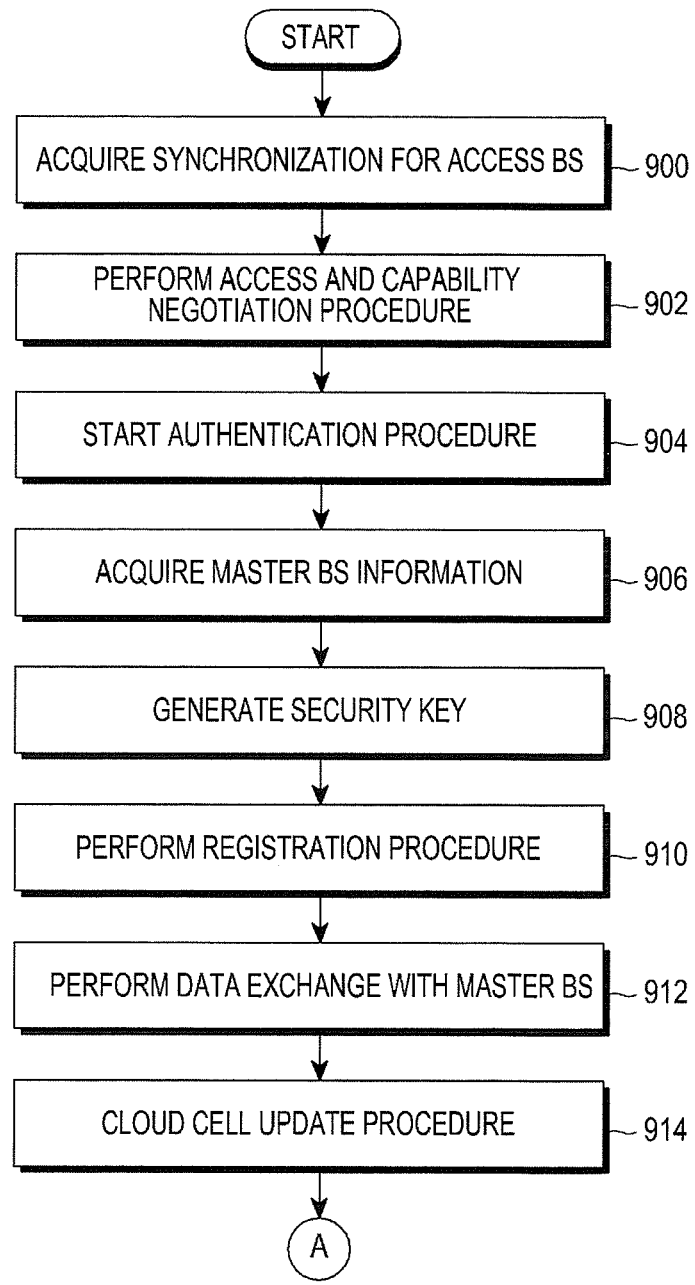
FIGS. 9A and 9B illustrate an operation of an MS in a cloud cell-based wireless communication system according to the second embodiment of the present disclosure.
Figure 9B:
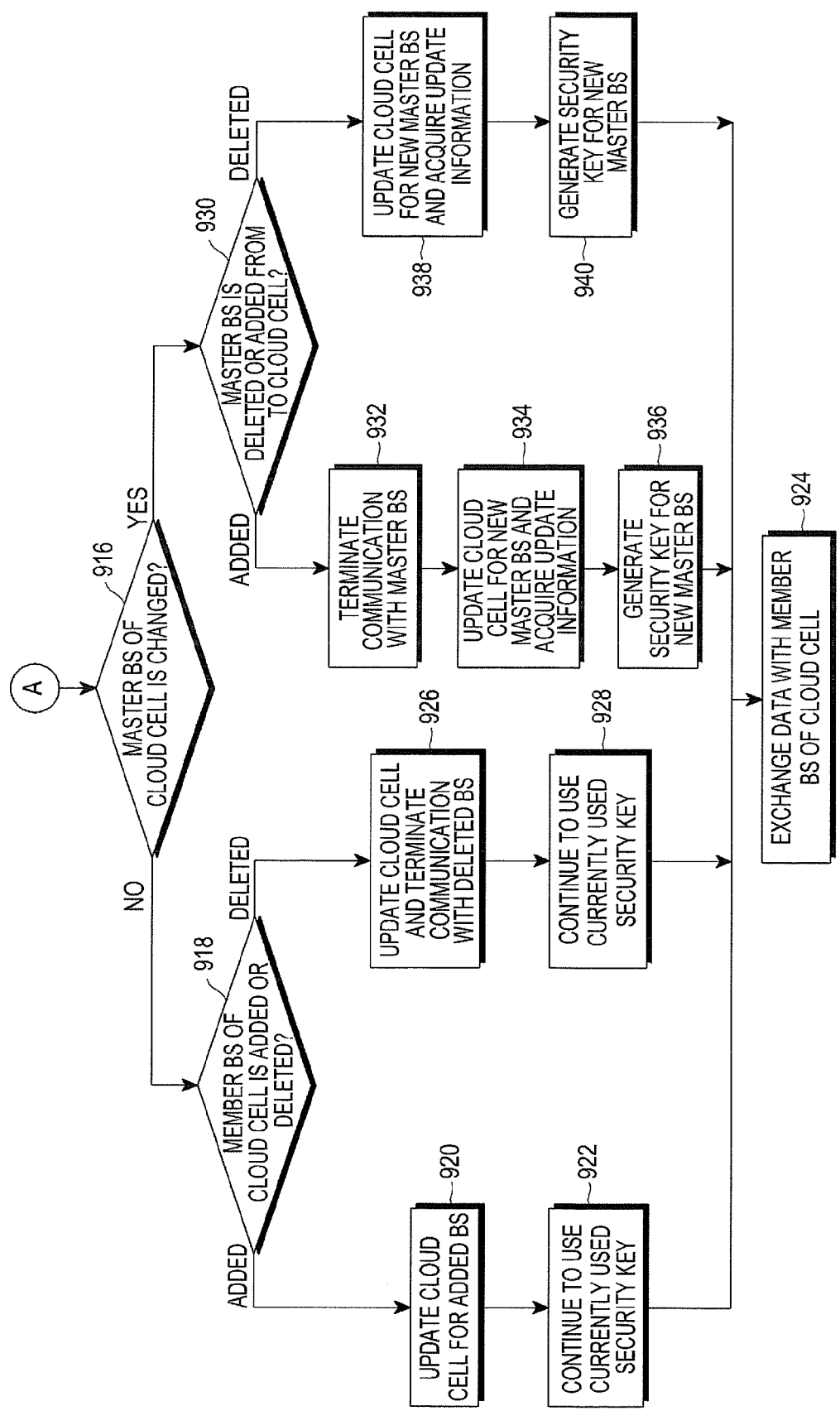

FIGS. 9A and 9B illustrate an operation of an MS in a cloud cell-based wireless communication system according to the second embodiment of the present disclosure.

Referring to FIG. 9A, the MS acquires synchronization for an access BS in step 900, and performs an access and capability negotiation procedure with the access BS in step 902.

In step 904, the MS starts an authentication procedure with an authenticator and an AAA through the access BS. In step 906, the MS acquires an identifier of the access BS as a master BSID. In step 908, the MS generates an authentication key and a data encryption key to be used for its data exchange with the access BS, using Equation (2). In step 910, the MS performs a registration procedure with the access BS, and then sets the access BS as a master BS of the cloud cell. In step 912, the MS performs data exchange with the master BS.

In step 914, the MS performs a cloud cell update procedure for adding the master BS to a cloud cell member BS list, and then proceeds to step 916 in FIG. 9B.

Referring to FIG. 9B, the MS determines in step 916 whether the master BS is changed. If the master BS is not changed, the MS determines in step 918 whether there is an added new BS or a deleted member BS among the member BSs of the cloud cell. If there is an added new BS, the MS performs a cloud cell update procedure for adding the new BS to the cloud cell member BS list in step 920. In step 922, the MS keeps the currently used security keys, i.e., the authentication key and the data encryption key. In step 924, the MS exchanges data with the member BSs including the new BS, using the currently used data encryption key.

If it is determined in step 918 that there is a deleted member BS among the member BSs of the cloud cell, the MS performs a cloud cell update procedure for deleting the deleted member BS from the cloud cell member BS list, and terminates its communication with the deleted member BS in step 926. The MS keeps the currently used security keys, i.e., the authentication key and the data encryption key in step 928, and performs data exchange with the remaining member BSs except for the deleted member BS using the currently used data encryption key in step 924.

If it is determined in step 916 that the master BS is changed, the MS determines in step 930 whether the master BS is deleted from the cloud cell member BS list. If the master BS is deleted, the MS terminates its communication with the master BS in step 932. In step 934, the MS performs a cloud cell update procedure for adding a new master BS to the cloud cell member BS list, and acquires an identifier of the new master BS through this procedure. In step 936, the MS generates new security keys for the new master BS. In other words, the MS generates a new authentication key using the identifier of the new master BS and Equation (2), and generates a new data encryption key using the new authentication key. Thereafter, in step 924, the MS performs data exchange with the member BSs of the cloud cell including the new master BS, using the new data encryption key.

If it is determined in step 930 that the master BS is not deleted from the cloud cell member BS list, the MS performs a cloud cell update procedure for adding the new master BS to the cloud cell member BS list, thereby acquiring an identifier of the new master BS, in step 938. In step 940, the MS generates new security keys for the new master BS. In other words, the MS generates a new authentication key using the identifier of the new master BS and Equation (2), and generates a new data encryption key using the new authentication key. In step 924, the MS performs data exchange with the member BSs of the cloud cell including the new master BS, using the new data encryption key.

Figure 10A:
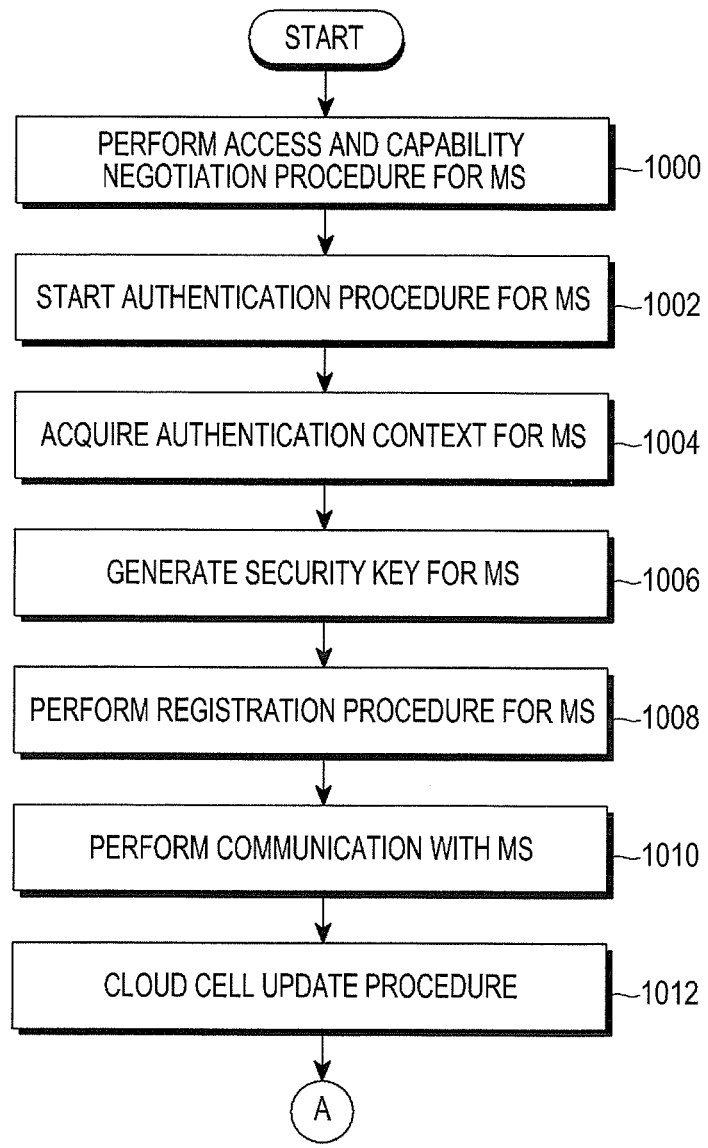
FIGS. 10A and 10B illustrate an operation of a master BS in a cloud cell-based wireless communication system according to the second embodiment of the present disclosure.
Figure 10B:
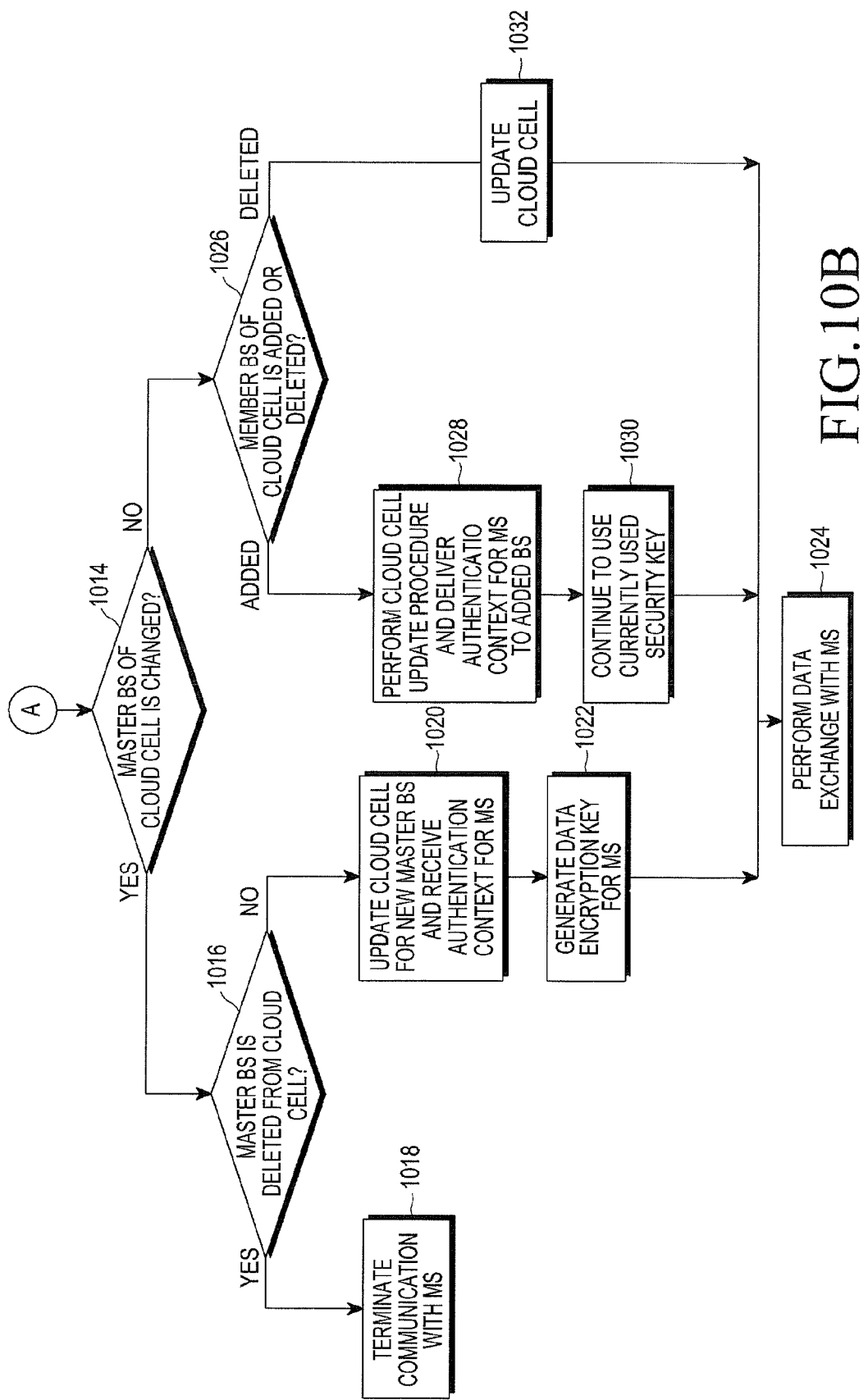

FIGS. 10A and 10B illustrates an operation of a master BS in a cloud cell-based wireless communication system according to the second embodiment of the present disclosure.

Referring to FIG. 10A, the master BS performs an access and capability negotiation procedure for an MS in step 1000. In step 1002, the master BS starts an authentication procedure for the MS. In step 1004, the master BS receives an authentication context for the MS from an authenticator. The authentication context is an authentication key for the MS, or a data encryption key to be used during, data exchange with the MS. If the authentication context received in step 1004 includes only the authentication key, the master BS generates a data encryption key for the MS using the authentication key in step 1006, and performs a registration procedure for the MS in step 1008. Thereafter, in step 1010, the master BS exchanges data with the MS using the data encryption key.

In step 1012, the master BS performs a cloud cell update procedure for adding the master BS itself to the cloud cell member BS list, and then proceeds to step 1014 in FIG. 10B.

Referring to FIG. 10B, the master BS determines in step 1014 whether the master BS of the cloud cell is changed. If the master BS is changed, the master BS proceeds to step 1016. If the master BS of the cloud cell is not changed, the master BS proceeds to step 1026.

In step 1016, the master BS determines whether the master BS itself is deleted from the cloud cell member BS list. If the master BS itself is deleted from the cloud cell member BS list, the master BS terminates its communication with the MS in step 1018.

If it is determined in step 1016 that the master BS is not deleted from the cloud cell member BS list, the master BS performs a cloud cell update procedure for adding a new master BS to the cloud cell member BS list and receives a new authentication context for the MS from the authenticator or the new master BS, in step 1020. A new authentication key included in the new authentication context is generated using an identifier of the new master BS and Equation (2). If the new authentication context received in step 1020 includes only the new authentication key, the master BS generates a new data encryption key for the MS using the new authentication key in step 1022. Thereafter, in step 1024, the master BS, as a slave BS for the MS, exchanges data with the MS using the new data encryption key.

In step 1026, the master BS determines whether there is an added new BS or a deleted member BS among the member BSs of the cloud cell. If there is an added new BS, the master BS performs a cloud cell update procedure for adding the added new BS to the cloud cell member BS list and delivers an authentication context for the MS to the added new BS, in step 1028. The authentication context corresponds to the currently used security keys (i.e., the authentication key and the data encryption key) for the MS. In step 1030, the master BS keeps the currently used security keys. In step 1024, the master BS performs data exchange with the MS using the currently used data encryption key.

If it is determined in step 1026 that there is a deleted member BS, the master BS performs a cloud cell update procedure for deleting the deleted member BS from the cloud cell member BS list in step 1032, and performs data exchange with the MS in step 1024.

Figure 11:
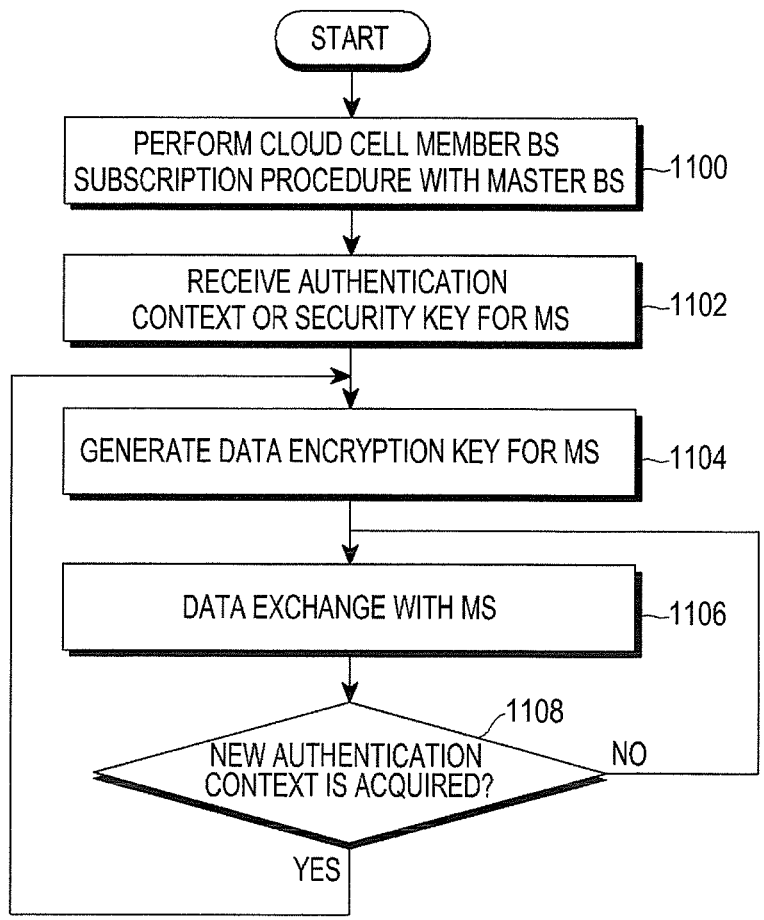
FIG. 11 illustrates an operation of a slave BS in a cloud cell-based wireless communication system according to the second embodiment of the present disclosure.

FIG. 11 illustrates an operation of a slave BS in a cloud cell-based wireless communication system according to the second embodiment of the present disclosure.

Referring to FIG. 11, the slave BS performs a cloud cell member BS subscription procedure with a master BS in step 1100. In step 1102, the slave BS receives an authentication context for an MS. The authentication context may be received from the master BS or an authenticator, and corresponds to an authentication key for the MS and a data encryption key for the MS.

If the authentication context received in step 1102 includes only the authentication key for the MS, the slave BS generates a data encryption key for the MS using the authentication key in step 1104. In step 1106, the slave BS performs data exchange with the MS using the data encryption key. Thereafter, the slave BS determines in step 1108 whether a new authentication context for the MS is received. If the new authentication context is received and the received new authentication context includes only a new authentication key for the MS, the slave BS generates a new data encryption key for the MS using the new authentication key in step 1104, and then proceeds to step 1106.

However, if the new authentication context for the MS includes a new data encryption key for the MS, the slave BS skips step 1104, and performs data exchange with the MS using the new data encryption key in step 1106.

Figure 12:
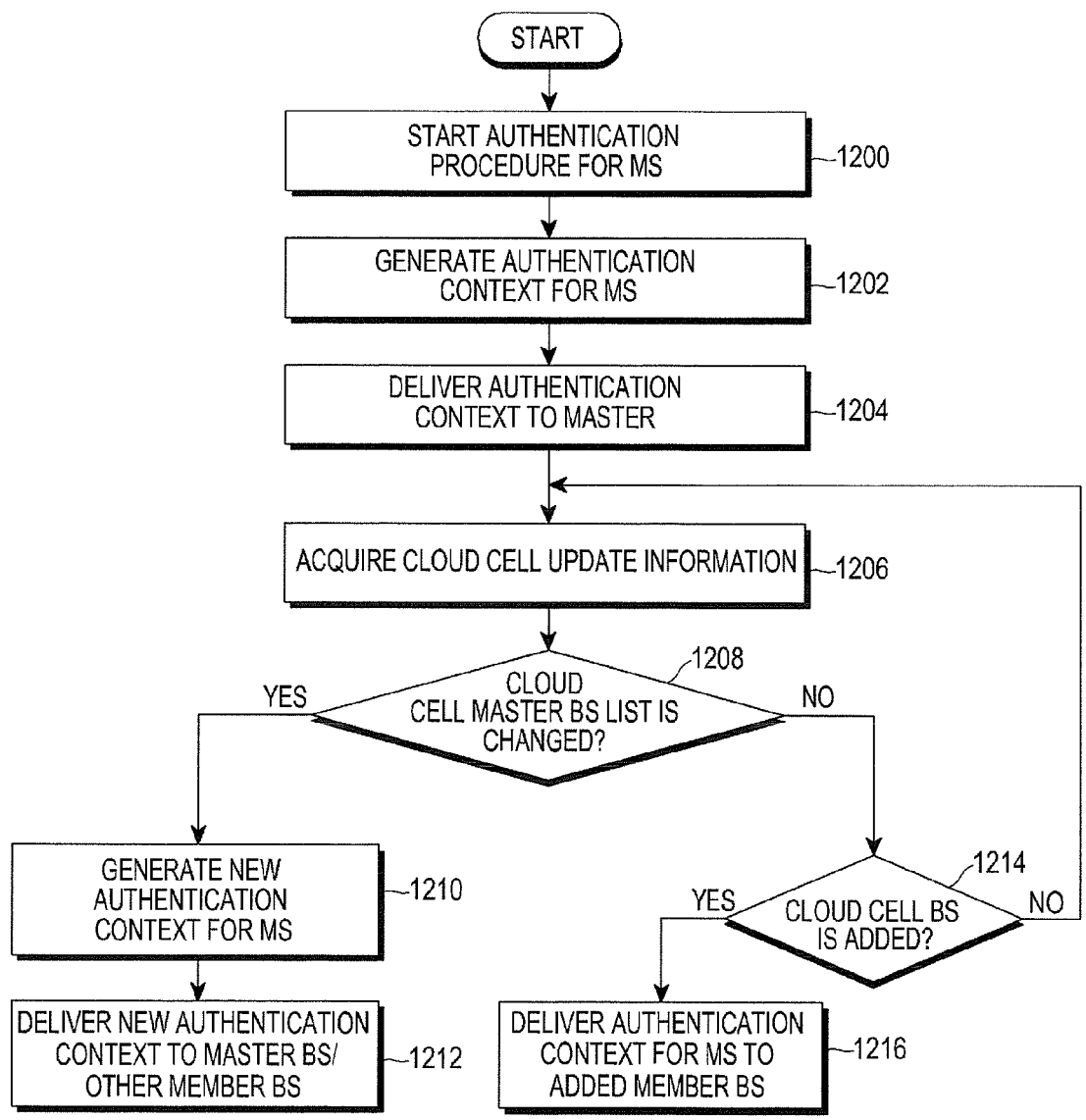
FIG. 12 illustrates an operation of an authenticator in a cloud cell-based wireless communication system according to the second embodiment of the present disclosure.

FIG. 12 illustrates an operation of an authenticator in a cloud cell-based wireless communication system according to the second embodiment of the present disclosure.

Referring to FIG. 12, the authenticator starts an authentication procedure for an MS in step 1200. In step 1202, the authenticator generates an authentication key for the MS using identification information of a master BS for the MS and Equation (2). In step 1204, the authenticator delivers the authentication key to the master BS for the MS. The authenticator may generate a data encryption key for the MS using the authentication key and deliver the data encryption key to the master BS.

In step 1206, the authenticator acquires the cloud cell update information through the master BS. Based on the cloud cell update information, the authenticator determines in step 1208 whether the master BS of the cloud cell is changed. If the master BS of the cloud cell is changed, the authenticator generates a new authentication key for the MS using the identification information of the new master BS and Equation (2), and generates a new data encryption key for the MS using the new authentication key, in step 1210. In step 1212, the authenticator delivers the new authentication key or the new data encryption key to the master BS as a new authentication context for the MS. If the master BS does not deliver the new authentication key or the new data encryption key to the slave BS, the authenticator delivers the new authentication key or the new data encryption key to the slave BS in step 1212.

If it is determined in step 1208 that the master BS is not changed, the authenticator determines in step 1214 whether there is any added new BS among the member BSs of the cloud cell. If there is no added new BS, the authenticator proceeds to step 1206. However, if there is an added new BS, the authenticator delivers, to the new BS, the authentication key or data encryption key which is generated by the identifier of the master BS and Equation (2), in step 1216. If the master BS delivers the authentication key or data encryption key for the MS to the new BS, the authenticator may skip step 1216.

Third Embodiment

Figure 13:
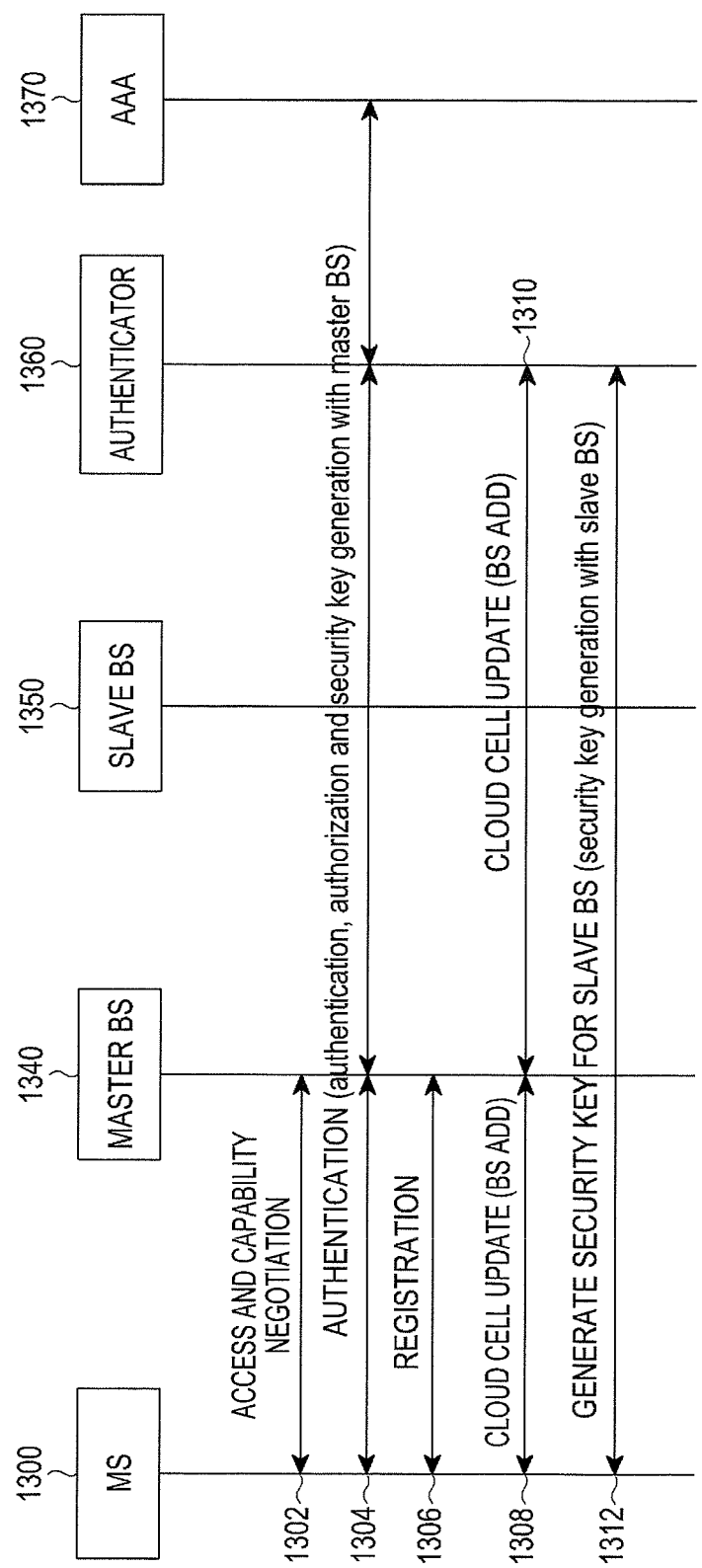
FIG. 13 illustrates a signal flow diagram for managing security keys for authentication and data encryption in a cloud cell-based wireless communication system according to a third embodiment of the present disclosure.

FIG. 13 illustrates a signal flow diagram for managing security keys for authentication and data encryption in a cloud cell-based wireless communication system according to a third embodiment of the present disclosure.

Referring to FIG. 13, an MS 1300 performs an access and capability negotiation procedure with a master BS 1340 in step 1302. In step 1304, an access network authentication and data encryption procedure for the MS 1300 is performed between the MS 1300 and the master BS 1340, an access network authentication and data encryption procedure for the MS 1300 is performed between the master BS 1340 and an authenticator 1360, and an access network authentication and data encryption procedure for the MS 1300 is performed between the authenticator 1360 and an AAA 1370. The authentication process information needed between the MS 1300 and the master BS 1340, between the master BS 1340 and the authenticator 1360, and between the authenticator 1360 and the AAA 1370 is transmitted using an authentication negotiation message exchanged between the MS 1300 and the master BS 1340, an access network authentication negotiation message exchanged between the master BS 1340 and the authenticator 1360, and an authentication message exchanged between the authenticator 1360 and the AAA 1370.

During the authentication procedure in step 1304, the MS 1300 and the authenticator 1360 generate an authentication key as an authentication context based on a master key provided from the AAA 1370. In the third embodiment of the present disclosure, the authentication key is generated using Equation (3) below.

$$\text{Authentication Key} = \text{Dot16KDF}(PMK, MSID|\text{Member BSID}|\text{"AK"}, AK\_length) \quad (3)$$

where PMK denotes a pairwise master key, MSID denotes an identifier of an MS, and Member BSID denotes an identifier of a member BS included in a cloud cell member BS list. In the third embodiment of the present disclosure, Member BSID indicates an identifier of the master BS 1340 during generation of an authentication key to be used between the MS 1300 and the master BS 1340. Also, Member BSID indicates an identifier of a slave BS 1350 during generation of an authentication key to be used between the MS 1300 and the slave BS 1350. In addition, "AK" denotes a character string, indicating an authentication key for data encryption, and Dot16KDF denotes an algorithm that generates an authentication key with a length of AK_length bits by using PMK, MSID, Member BSID, and "AK" as its input values.

Also, in step 1304, the authenticator 1360 delivers, to the master BS 1340, an authentication key that the authenticator 1360 generated using an identifier of the master BS 1340 and Equation (3). Then, the master BS 1340 generates a data encryption key for the MS 1300 using the received authentication key. Otherwise, using the authentication key, the authenticator 1360 directly generates a data encryption key to be used by the MS 1300 and the master BS 1340, and delivers the generated data encryption key to the master BS 1340.

Thereafter, in step 1306, the MS 1300 performs a registration procedure through the master BS 1340 and performs data exchange with the master BS 1340.

Thereafter, in step 1308, the MS 1300 and the master BS 1340 perform a cloud cell update procedure for adding the slave BS 1350 to a cloud cell member BS list.

In step 1310, the slave BS 1350 performs a cloud cell member BS adding procedure with the master BS 1340. The master BS 1340 delivers an identifier of the slave BS 1350 to the authenticator 1360 as cloud cell update information, together with information indicating the fact that the slave BS 1350 is added to the cloud cell member BS list. Otherwise, the slave BS 1350, together with the authenticator 1360, directly performs a procedure for informing that slave BS 1350 itself is added as a cloud cell member BS. Using this procedure, the authenticator 1360 acquires an identifier of the slave BS 1350. If the cloud cell update procedure is completed in which the slave BS 1350 is added to the cloud cell member BS list for the MS 1300, a security key generation procedure between the slave BS 1350 and the MS 1300 is performed in step 1312. Specifically, the security key generation procedure includes a case in which the authenticator 1360 generates an authentication key between the MS 1300 and the slave BS 1350 using the identifier of the slave BS 1350 and Equation (3), and generates a data encryption key between the MS 1300 and the slave BS 1350 using the authentication key. In this case, the generated security key or data encryption key is delivered to the slave BS 1350 through the authenticator 1360 or the master BS 1340. If the security key that is delivered to the slave BS 1350 through the authenticator 1360 or the master BS 1340 includes only the authentication key, the slave BS 1350 directly generates a data encryption key for the MS 1300 using the authentication key.

If the master BS 1340 or the slave BS 1350 is deleted from the cloud cell member BS list in accordance with the cloud cell update procedure, the data encryption key and the authentication key, which were generated using the identifier of the deleted master BS or slave BS, are deleted.

Figure 14A:
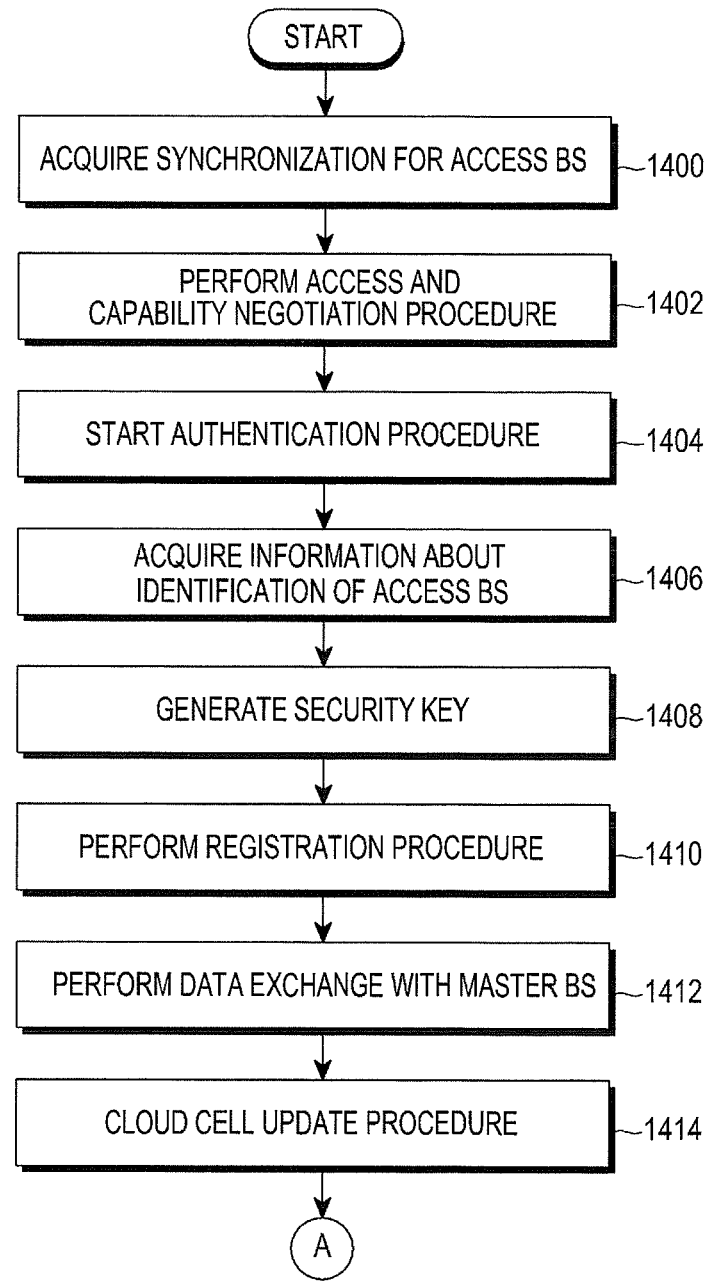
FIGS. 14A and 14B illustrate an operation of an MS in a cloud cell-based wireless communication system according to the third embodiment of the present disclosure.
Figure 14B:
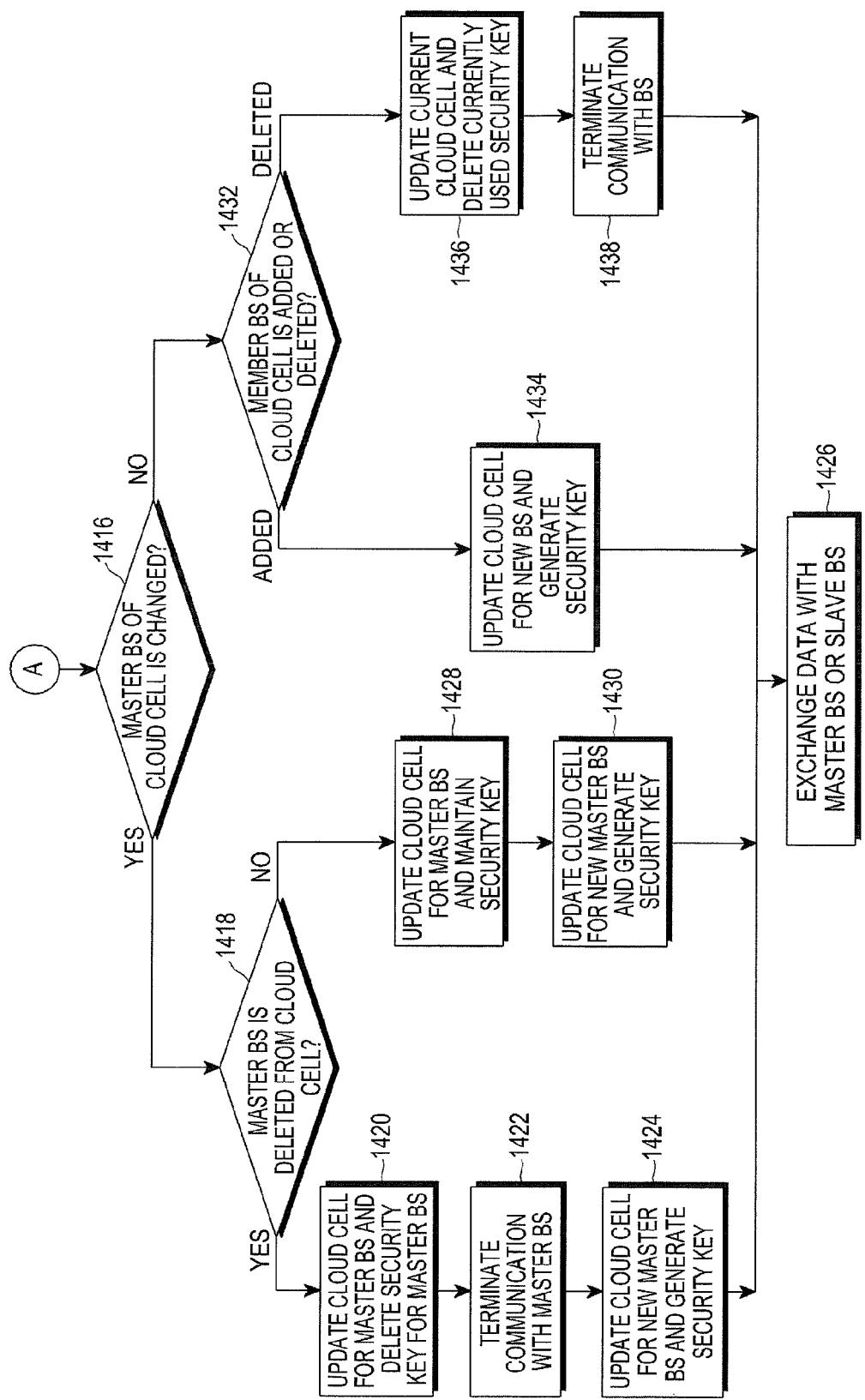

FIGS. 14A and 14B illustrate an operation of an MS in a cloud cell-based wireless communication system according to the third embodiment of the present disclosure.

Referring to FIG. 14A, the MS acquires synchronization for an access BS in step 1400, and performs an access and capability negotiation procedure with the access BS in step 1402. In step 1404, the MS starts an authentication procedure with an authenticator and an AAA through the access BS. In step 1406, the MS acquires information about an identifier of the access BS. In step 1408, the MS generates, as security keys, an authentication key and a data encryption key to be used for its data exchange with the access BS, using the information about the identifier of the access BS and Equation (3). In step 1410, the MS performs a registration procedure with the access BS to set the access BS as a master BS of the cloud cell. In step 1412, the MS performs data exchange with the set master BS. In step 1414, the MS performs a cloud cell update procedure for adding the master BS to a cloud cell member BS list, and then proceeds to step 1416 in FIG. 14B.

Referring, to FIG. 14B, the MS determines in step 1416 whether the master BS of the cloud cell is changed. If the master BS is changed, the MS proceeds to step 1418, and if the master BS is not changed, the MS proceeds to step 1432. In step 1418, the MS determines whether the master BS is deleted from the member BSs of the cloud cell. If the master BS is deleted, the MS performs a cloud cell update procedure for deleting the master BS from the cloud cell member BS list and deletes the security keys including the authentication key and the data encryption key used for its data exchange with the master BS, in step 1420. In step 1422, the MS terminates communication with the master BS. Thereafter, in step 1424, the MS performs a cloud cell update procedure for adding a new master BS to the cloud cell member BS list, generates a new authentication key using an identifier of the new master BS and Equation (3), and generates a data encryption key using the new authentication key. If the new master BS is one of the slave BSs included in the cloud cell member BS list for the MS, the MS does not need to additionally perform the procedure for generating a new authentication key and a data encryption key for the new master BS as in step 1424, because the MS is already using the authentication key and the data encryption key which were made using the identifier of the new master BS and Equation (3). In step 1426, the MS performs data exchange with the member BSs of the cloud cell including the new master BS.

If it is determined in step 1418 that the master BS is not deleted from the cloud cell member BS list, the MS performs a cloud cell update procedure for setting the master BS as a slave BS, maintains the security keys currently used for its communication with the master BS, and continues to perform data exchange with the master BS using the data encryption key currently used for its communication with the master BS, in step 1428. In step 1430, the MS performs a cloud cell update procedure for setting the new master BS as a master BS, and generates security keys to be used for its communication with the new master BS. In other words, the MS generates a new authentication key to be used for its communication with the new master BS, using an identifier of the new master BS and Equation (3), and generates a new encryption key using the new authentication key. In step 1426, the MS performs data exchange with the member BSs including the new master BS, using the new encryption key.

If the MS determines in steps 1424 and 1430 that the new master BS is a slave BS which was included in the cloud cell member BS list, the MS uses the currently used encryption key for its communication with the master BS, for data exchange with the new master BS, since the authentication key and the data encryption key, which were made using the identifier of the new master BS, are already being used.

If it is determined in step 1416 that the master BS of the cloud cell is not changed, the MS determines in step 1432 whether there is an added new BS or a deleted member BS among the member BSs of the cloud cell. If there is an added new BS, the MS performs a cloud cell update procedure for adding the new BS to the cloud cell member BS list and generates security keys to be used for its communication with the new BS, in step 1434. In other words, the MS generates an authentication key for the new BS using the identifier of the new BS and Equation (3), and generates a data encryption key to be used for its data exchange with the new BS, using the authentication key. Thereafter, in step 1426, the MS performs data exchange with the added new BS using the generated data encryption key.

If it is determined in step 1432 that there is a deleted member BS among the member BSs of the cloud cell, the MS deletes the deleted member BS from the cloud cell member BS list and deletes the security keys for the deleted member BS, in step 1436. The MS terminates its communication with the deleted member BS in step 1438, and performs data exchange with the remaining member BSs except for the deleted member BS in step 1426.

Figure 15A:
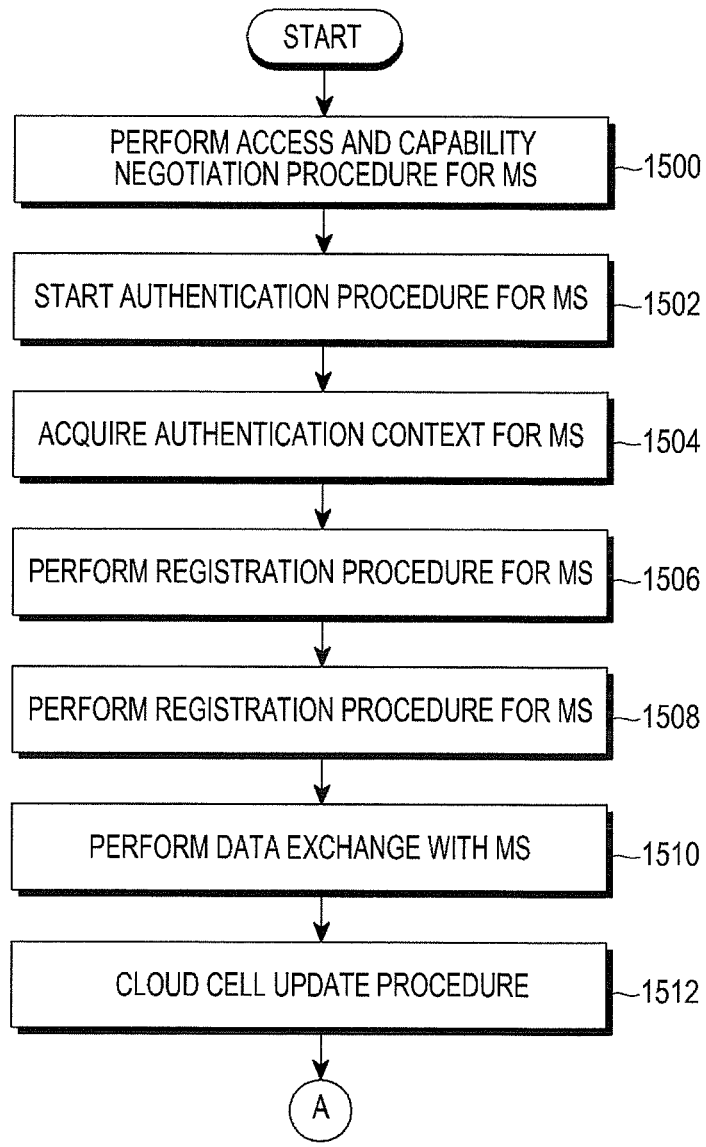
FIGS. 15A and 15B illustrate an operation of a master BS in a cloud cell-based wireless communication system according to the third embodiment of the present disclosure.
Figure 15B:
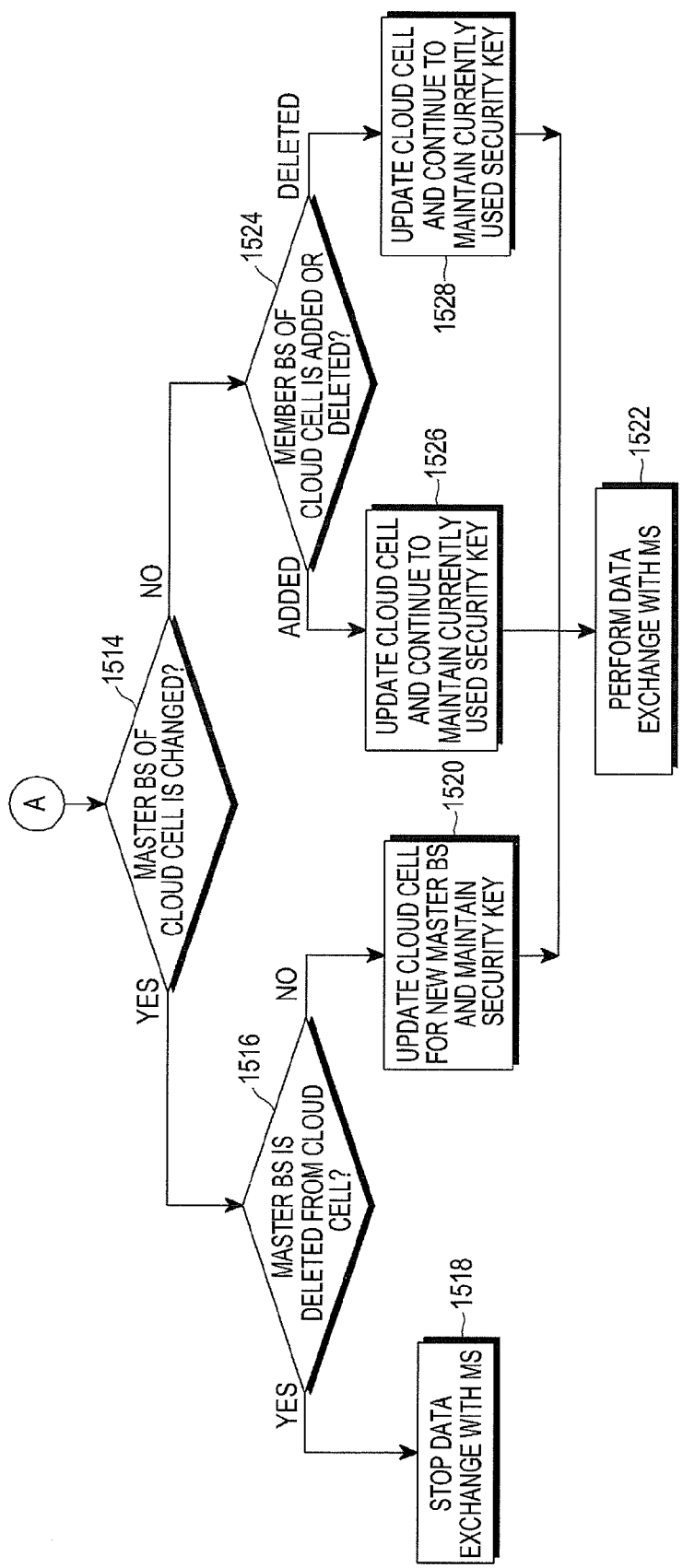

FIGS. 15A and 15B illustrate an operation of a master BS in a cloud cell-based wireless communication system according to the third embodiment of the present disclosure.

Referring to FIG. 15A, the master BS performs an access and capability negotiation procedure for an MS in step 1500. In step 1502, the master BS starts an authentication procedure for the MS. In step 1504, the master BS receives an authentication context for the MS from an authenticator. The authentication context may be an authentication key for the MS or a data encryption key for the MS. If the received authentication context includes only the authentication key, the master BS generates, as a security key, a data encryption key for the MS using the authentication key in step 1506. The master BS performs a registration procedure for the MS in step 1508 and exchanges data with the MS in step 1510.

Thereafter, in step 1512, the master BS performs a cloud cell update procedure for the MS to add the master BS itself to the cloud cell member BS list, and then proceeds to step 1514 in FIG. 15B.

Referring to FIG. 15B, the master BS determines in step 1514 whether the master BS of the cloud cell is changed. If the master BS is changed, the master BS proceeds to step 1516, and if the master BS of the cloud cell is not changed, the master BS proceeds to step 1524.

In step 1516, the master BS determines whether the master BS itself is detected from the cloud cell member BS list. If the master BS is deleted from the cloud cell member BS list, the master BS terminates communication with the MS in step 1518.

If the master BS is not deleted from the cloud cell member BS list, the master BS performs a cloud cell update procedure for adding a new master BS to the cloud cell member BS list and keeps the currently used security keys (i.e., the authentication key and data encryption key for the MS) in step 1520. In step 1522, the master BS performs data exchange with the MS using the currently used authentication key and data encryption key for the MS.

In step 1524, the master BS determines whether there is an added new BS or a deleted member BS among the member BSs of the cloud cell. If there is an added new BS, the master BS performs a cloud cell update procedure for adding the new BS to the cloud cell member BS list and keeps the currently used security keys (i.e., the authentication key and data encryption key for the MS) in step 1526. In step 1522, the master BS performs data exchange with the MS using the current used data encryption key for the MS.

If it is determined in step 1524 that there is a deleted member BS, the master BS performs a cloud cell update procedure for deleting the deleted member BS from the cloud cell member BS list, and keeps the currently used security keys (i.e., the authentication key and data encryption key for the MS) in step 1528. In step 1522, the master BS performs data exchange with the MS using the data encryption key for the MS.

Figure 16:
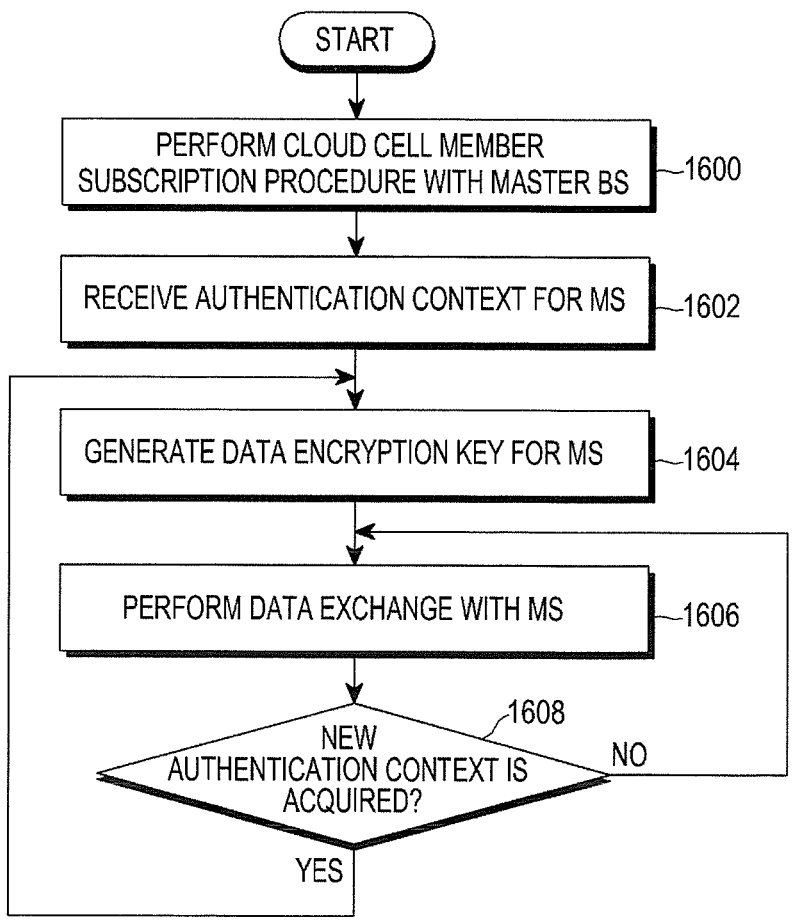
FIG. 16 illustrates an operation of a slave BS in a cloud cell-based wireless communication system according to the third embodiment of the present disclosure.

FIG. 16 illustrates an operation of a slave BS in a cloud cell-based wireless communication system according to the third embodiment of the present disclosure.

Referring to FIG. 16, the slave BS performs a cloud cell member subscription procedure with a master BS in step 1600. In step 1602, the slave BS receives an authentication context for an MS from the master BS or an authenticator. The authentication context corresponds to an authentication key for the MS or a data encryption key for the MS. If the authentication context received in step 1602 includes only the authentication key for the MS, the slave BS generates a data encryption key for the MS as a security key, using its own identifier and Equation (3), in step 1064. In step 1606, the slave BS performs data exchange with the MS using the data encryption key.

Thereafter, the slave BS determines in step 1608 whether a new authentication context for the MS is received. If the new authentication context for the MS is not received, the slave BS performs data exchange with the MS using the currently used data encryption key in step 1606.

However, if a new authentication context for the MS is received, and the new authentication context corresponds to a new encryption key for the MS, the slave BS generates a new data encryption key for the MS using the new authentication key in step 1604. On the other hand, if the new authentication context for the MS includes a new data encryption key for the MS, the slave BS skips step 1604, and performs data exchange with the MS using the received new data encryption key in step 1606.

Figure 17:
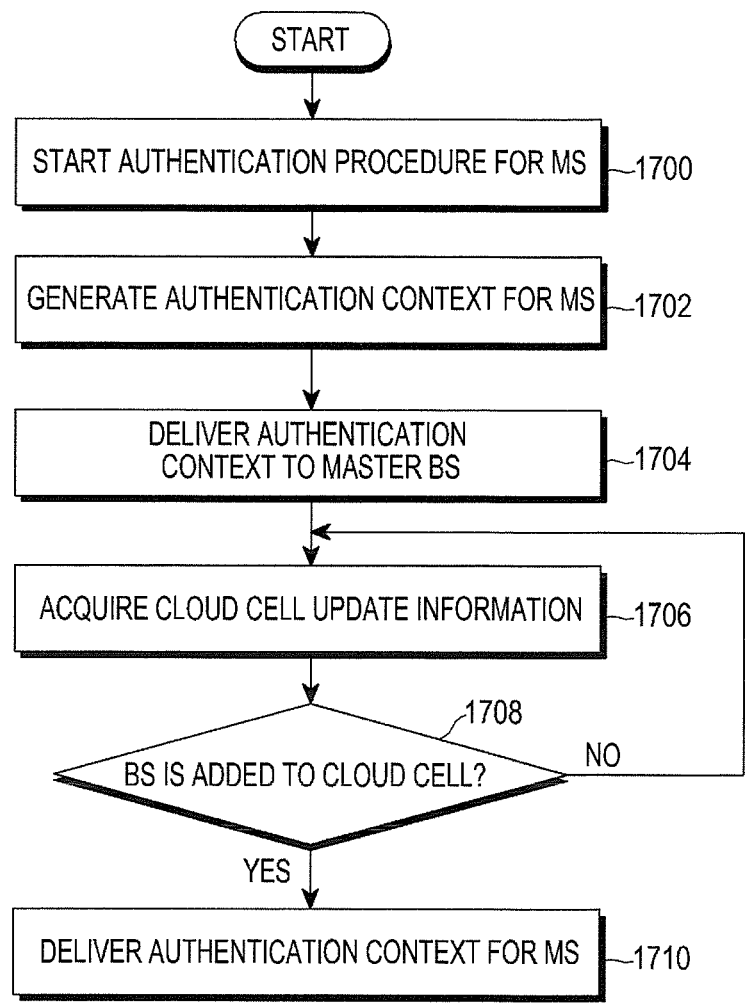
FIG. 17 illustrates an operation of an authenticator in a cloud cell-based wireless communication system according to the third embodiment of the present disclosure.

FIG. 17 illustrates an operation of an authenticator in a cloud cell-based wireless communication system according to the third embodiment of the present disclosure.

Referring to FIG. 17, the authenticator starts an authentication procedure for an MS in step 1700. In step 1702, the authenticator generates an authentication key for the MS using identification information of a master BS of the cloud cell to which the MS belongs, and Equation (3).

In step 1704, the authenticator delivers the authentication key to the master BS of the MS as an authentication context for the MS. The authenticator may generate a data encryption key for the MS using the authentication key and deliver it to the master BS. In step 1706, the authenticator acquires the cloud cell update information through the master BS.

Based on the cloud cell update information, the authenticator determines in step 1708 whether a new BS is added to a cloud cell member BS list. If a new BS is added, the authenticator delivers to the new BS, a new authentication key generated using an identifier of the new BS and Equation (3) or a new data encryption key generated using the new authentication key, in step 1710. The new authentication key or the new data encryption key to be used by the new BS and the MS may be delivered to the new BS through the master BS.

Fourth Embodiment

Figure 18:
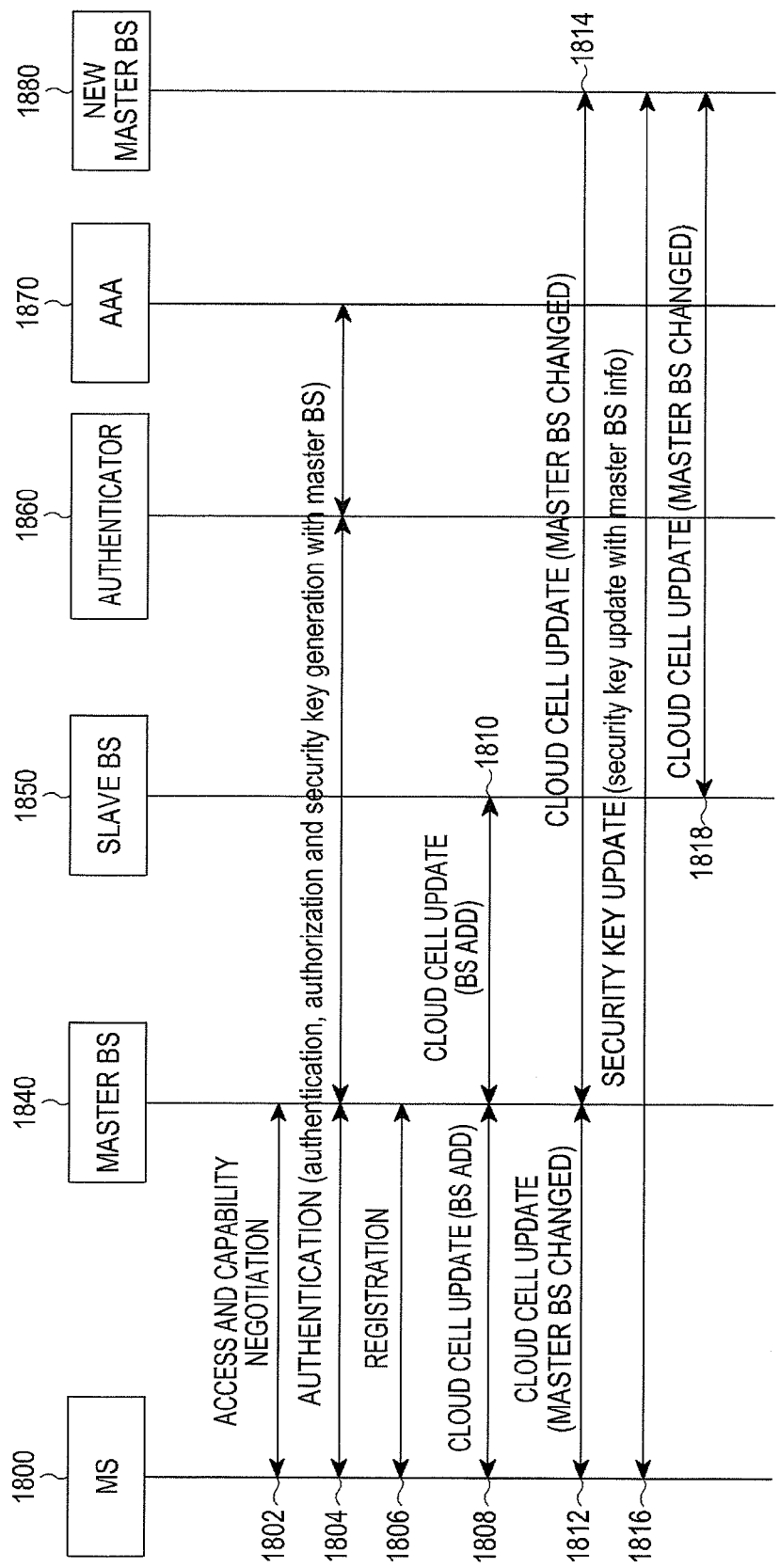
FIG. 18 illustrates a signal flow diagram for managing security keys for authentication and data encryption in a cloud cell-based wireless communication system according to a fourth embodiment of the present disclosure.

FIG. 18 illustrates a signal flow diagram for managing security keys for authentication and data encryption in a cloud cell-based wireless communication system according to a fourth embodiment of the present disclosure.

Referring to FIG. 18, an MS 1800 performs an access and capability negotiation procedure with a master BS 1840 in step 1802. In step 1804, an access network authentication and data encryption procedure for the MS 1800 is performed between the MS 1800 and the master BS 1840, an access network authentication and data encryption procedure for the MS 1800 is performed between the master BS 1840 and an authenticator 1860, and an access network authentication and data encryption procedure for the MS 1800 is performed between the authenticator 1860 and an AAA 1870. The authentication process information needed between the MS 1800 and the master BS 1840, between the master BS 1840 and the authenticator 1860, and between the authenticator 1860 and the AAA 1870 is transmitted using an authentication negotiation message exchanged between the MS 1800 and the master BS 1840, an access network authentication negotiation message exchanged between the master BS 1840 and the authenticator 1860, and an authentication message exchanged between the authenticator 1860 and the AAA 1870.

During the authentication procedure in step 1804, the MS 1800 and the authenticator 1860 generate an authentication context or an authentication key based on a master key provided from the AAA 1870. In the fourth embodiment of the present disclosure, the authentication key is generated using Equation (2) above.

Further, in step 1804, the authenticator 1860 delivers the authentication key generated using Equation (2), to the master BS 1840. Using the received authentication key, the master BS 1840 generates a data encryption key used for its data encryption with the MS 1800. Otherwise, the authenticator 1860 directly generates a data encryption key to be used by the MS 1800 and the master BS 1840 using the authentication key, and delivers the data encryption key to the master BS 1840. Thereafter, in step 1806, the MS performs a registration procedure through the master BS 1840, and performs data exchange with the master BS 1840.

Thereafter, in step 1808, the MS 1800 and the master BS 1840 perform a cloud cell update procedure for adding a slave BS 1850 to a cloud cell member BS list. Further, in step 1810, the slave BS 1850 performs a cloud cell member BS adding procedure with the master BS 1840.

Thereafter, in step 1812, the MS 1800 and the master BS 1840 perform a cloud cell update procedure for changing the master BS of the cloud cell. It is assumed that a new master BS 1880 instead of the master BS 1840 is set as a master BS of the cloud cell. Then, in step 1814, the new master BS 1880 provides the authenticator 1860 with information indicating the change in the master BS of the cloud cell.

Thereafter, in step 1816, the MS 1800 and the authenticator 1860 perform a security key update procedure for the MS 1800 using an identifier of the new master BS 1880. In other words, the MS 1800 and the authenticator 1860 generate a new authentication key for the MS 1800 using the identifier of the new master BS 1880 and Equation (2). Further, in step 1816, the authenticator 1860 delivers, as a new authentication context for the MS 1800, the generated new authentication key or a new data encryption key for the MS 1800, which is generated based on the authentication key, to the new master BS 1880. If the new master BS 1880 receives only the new authentication key, the new master BS 1880 directly generates a new data encryption key for the MS 1800 using the new authentication key.

In step 1818, the new master BS 1800 notifies even the slave BS 1850 in the cloud cell that the master BS of the cloud cell is changed to the new master BS 1880, thereby updating the cloud cell member BS list by which the slave BS 1850 may set the new master BS 1880 as a master BS of the cloud cell.

In FIG. 18, in a case where a member BS included in the cloud cell member BS list is deleted or added, if the master BS is not changed, the currently used security keys for the MS 1880 are maintained unchanged.

Figure 19A:
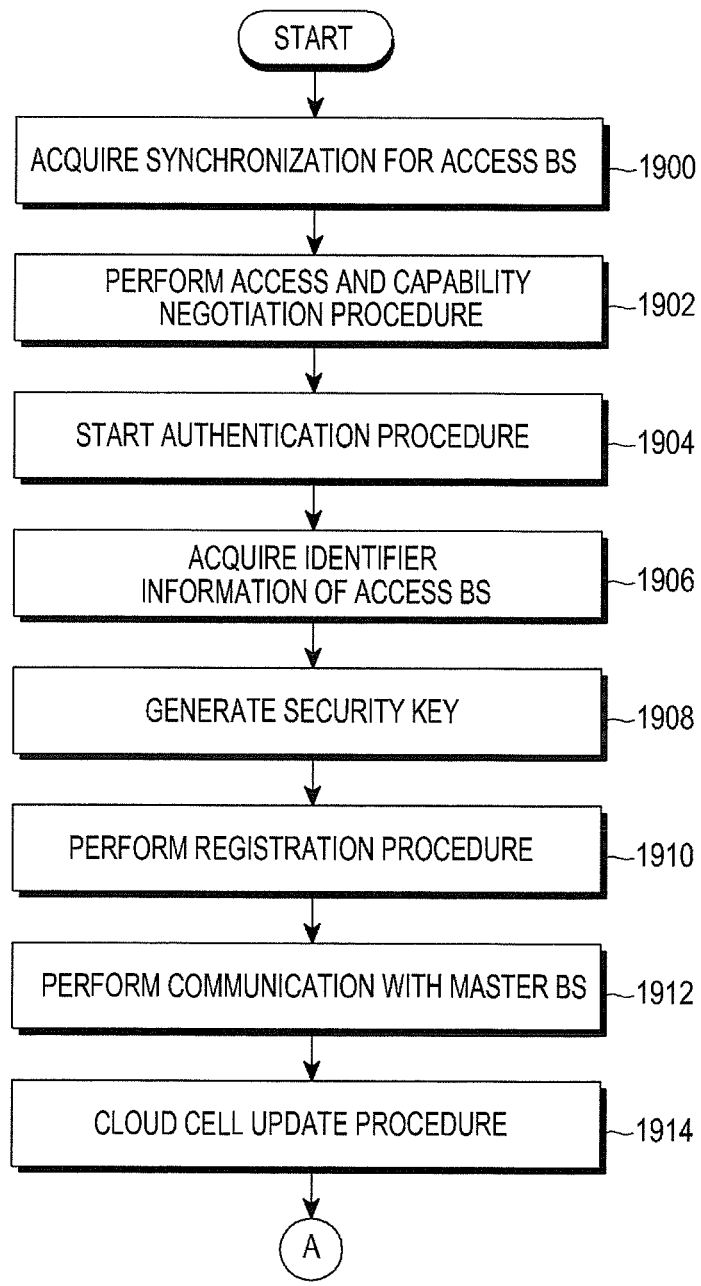
FIGS. 19A and 19B illustrate an operation of an MS in a cloud cell-based wireless communication system according to the fourth embodiment of the present disclosure.
Figure 19B:
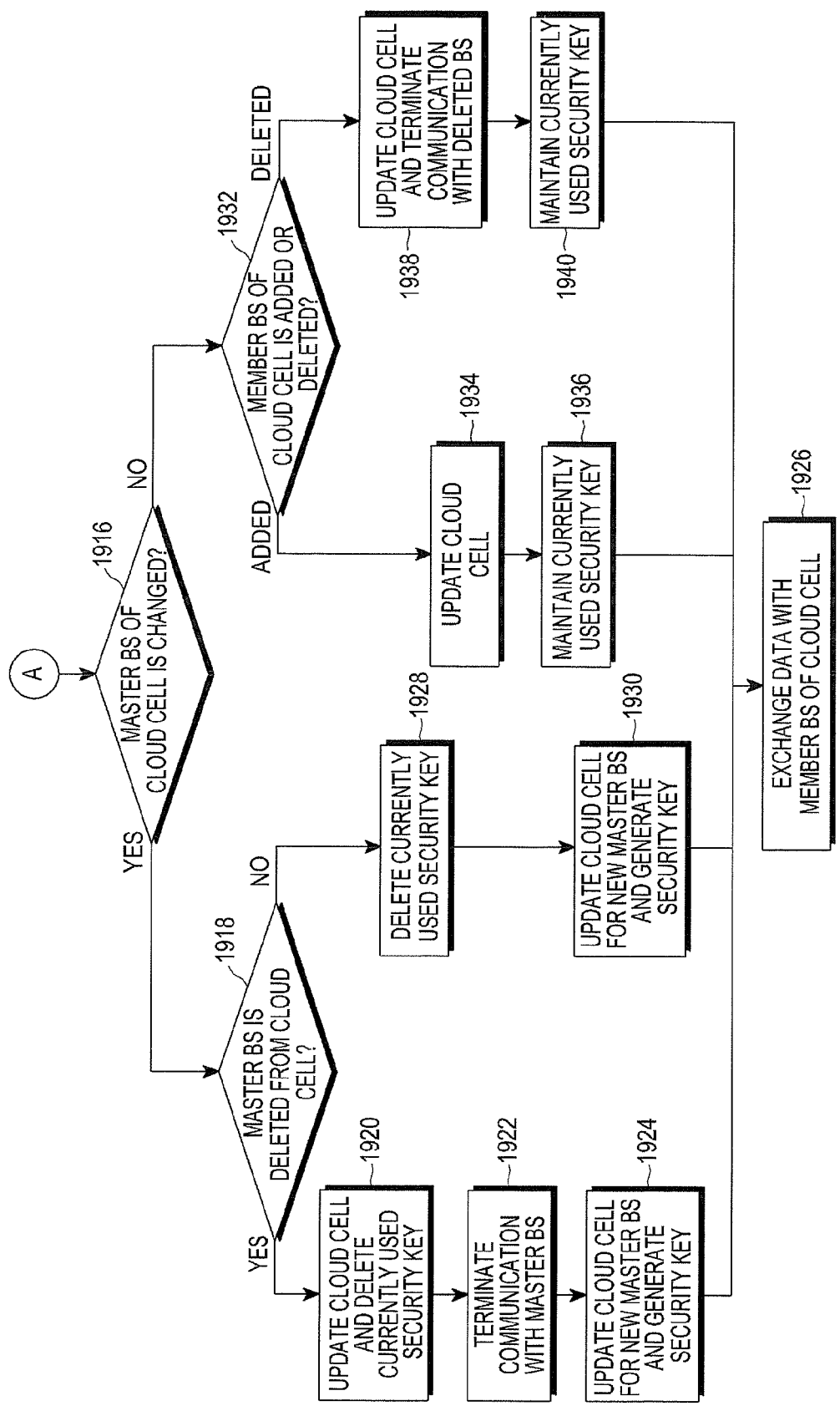

FIGS. 19A and 19B illustrate an operation of an MS in a cloud cell-based wireless communication system according to the fourth embodiment of the present disclosure.

Referring to FIG. 19A, the MS acquires synchronization for an access BS in step 1900, and performs an access and capability negotiation procedure with the access BS in step 1902. In step 1904, the MS starts an authentication procedure with an authenticator and an AAA through the access BS. In step 1906, the MS acquires information about an identifier of the access BS. In step 1908, the MS generates an authentication key to be used for its data exchange with the access BS using the acquired identifier of the access BS and Equation (2), and generates a data encryption key using the authentication key. The authentication key and the data encryption key may be referred to as 'security keys'. Thereafter, in step 1910, the MS performs a registration procedure with the access BS, to set the access BS as a master BS of the cloud cell.

Thereafter, in step 1912, the MS performs data exchange with the master BS. In step 1914, the MS performs a cloud cell update procedure for adding the master BS to the cloud cell member BS list, and then proceeds to step 1916 in FIG. 19B.

In step 1916, the MS determines whether a master BS of the cloud cell is changed.

If the master BS is changed, the MS proceeds to step 1918, and if the master BS is not changed, the MS proceeds to step 1932.

In step 1918, the MS determines whether the master BS among the member BSs of the cloud cell is detected. If the master BS is deleted, the MS deletes the master BS from the cloud cell member BS list and deletes the currently used security keys used for its communication with the master BS, in step 1920. In step 1922, the MS terminates its communication with the master BS. In step 1924, the MS performs a cloud cell update procedure for adding a new master BS to the cloud cell member BS list, and generates security keys to be used for its communication with the new master BS. In other words, the MS generates a new authentication key using an identifier of the new master BS and Equation (2), and generates a new data encryption key using the new authentication key. Thereafter, in step 1926, the MS performs data exchange with the member BSs including the new master BS, using the new data encryption key.

Even if the master BS is not deleted in step 1918, the MS deletes the currently used security keys used for its communication with the master BS in step 1928, because the master BS is changed to the new master BS. In step 1930, the MS performs a cloud cell update procedure for adding the new master BS to the cloud cell member BS list, and generates security keys to be used for its communication with the new master BS. In other words, the MS generates a new authentication key using an identifier of the new master BS and Equation (2), and generates a new data encryption key using the new authentication key. In step 1926, the MS performs data exchange with the member BSs of the cloud cell including the new master BS, using the new data encryption key.

If it is determined in step 1916 that the master BS of the cloud cell is not changed, the MS determines in step 1932 whether there is an added new BS or a deleted member BS among the member BSs of the cloud cell. If there is an added new BS, the MS performs a cloud cell update procedure for adding the new BS to the cloud cell member BS list in step 1934. In step 1936, the MS keeps the currently used security keys. In other words, in step 1926, the MS performs data exchange with the member BSs of the cloud cell including the new BS, using the data encryption key currently used for its communication with the master BS.

If it is determined in step 1932 that there is a deleted member BS, the MS performs a cloud cell update procedure for deleting the deleted member BS from the cloud cell member BS list and terminates its communication with the deleted member BS, in step 1938. In step 1940, the MS keeps the security keys currently used for its communication with the master BS. In other words, in step 1926, the MS performs data exchange with the remaining member BSs except for the deleted member BS, using the data encryption key currently used for its communication with the master BS.

Figure 20A:
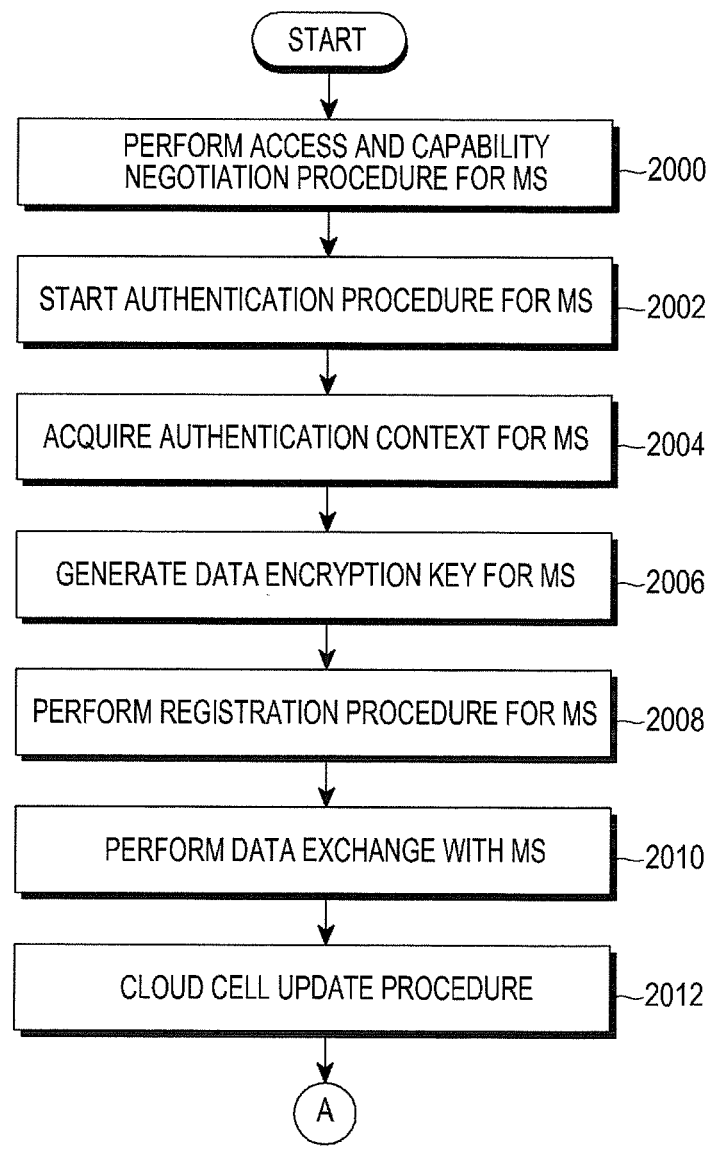
FIGS. 20A and 20B illustrate an operation of a master BS in a cloud cell-based wireless communication system according to the fourth embodiment of the present disclosure.
Figure 20B:
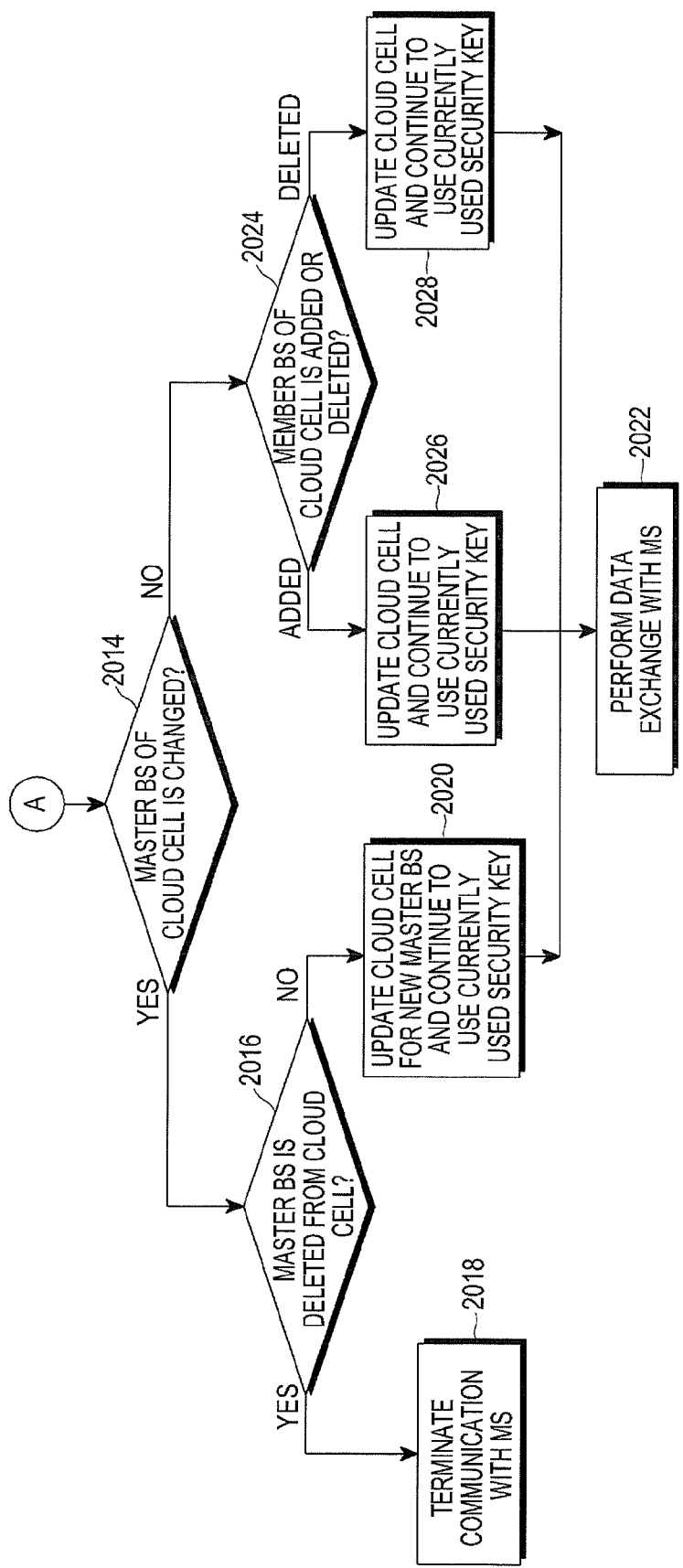

FIGS. 20A and 20B illustrate an operation of a master BS in a cloud cell-based wireless communication system according to the fourth embodiment of the present disclosure.

Referring to FIG. 20A, the master BS performs an access and capability negotiation procedure for an MS in step 2000, and starts an authentication procedure for the MS in step 2002. In step 2004, the master BS receives an authentication context for the MS from an authenticator. The authentication context is an authentication key for the MS or a data encryption key for the MS. If the authentication context received in step 2004 is the authentication key, the master BS generates a data encryption key for the MS using the authentication key in step 2006. The authentication key and the data encryption key may be referred to as 'security keys'. Thereafter, the master BS performs a registration procedure for the MS in step 2008, and performs data exchange with the MS using the generated data encryption key in step 2010.

Thereafter, in step 2012, the master BS performs a cloud cell update procedure for adding the master BS itself to a cloud cell member BS list, and then proceeds to step 2014 in FIG. 20B.

Referring, to FIG. 20B, the master BS determines in step 2014 whether the master BS of the cloud cell is changed. If the master BS is changed, the master BS proceeds to step 2016, and if the master BS is not changed, the master BS proceeds to step 2024.

In step 2016, the master BS determines whether the master BS itself is deleted from the cloud cell member BS list. If the master BS is deleted from the cloud cell member BS list, the master BS terminates its communication with the MS in step 2018.

If it is determined in step 2016 that the master BS is not deleted from the cloud cell member BS list, the master BS performs a cloud cell update procedure for adding the new master BS to the cloud cell member BS list and deletes its currently used security keys (i.e., the authentication key and data encryption key for the MS), in step 2020, and then proceeds to step 2022.

In step 2024, the master BS determines whether there is an added new BS or a deleted member BS among the member BSs of the cloud cell, the master BS. If there is an added new BS, the master BS performs a cloud cell update procedure for adding the new BS to the cloud cell member BS list and keeps the security keys (i.e., the authentication key and data encryption key for the MS) currently used for its communication with the MS, in step 2026. In step 2022, the master BS performs data communication with the MS using the currently used data encryption key for the MS.

If it is determined in step 2024 that there is a deleted member BS, the master BS performs a cloud cell update procedure for deleting the deleted member BS from the cloud cell member BS list and keeps the security keys (i.e., the authentication key and data encryption key for the MS) currently used for its communication with the MS, in step 2028. Thereafter, in step 2022, the master BS performs data communication with the MS using the currently used data encryption key for the MS.

Figure 21:
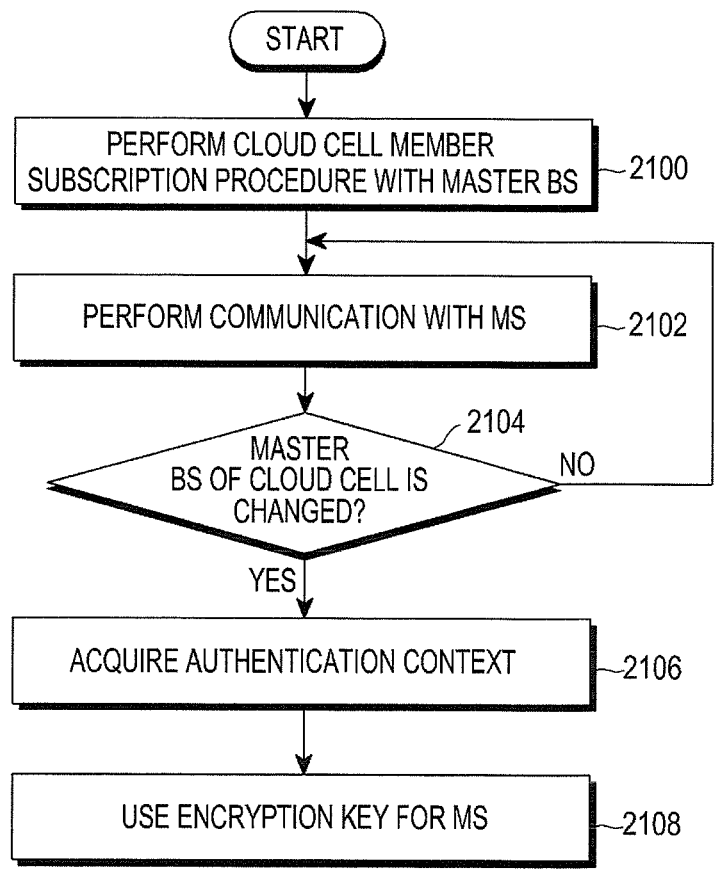
FIG. 21 illustrates an operation of a slave BS in a cloud cell-based wireless communication system according to the fourth embodiment of the present disclosure.

FIG. 21 illustrates an operation of a slave BS in a cloud cell-based wireless communication system according to the fourth embodiment of the present disclosure.

Referring to FIG. 21, the slave BS performs a cloud cell member subscription procedure with a master BS in step 2100, and performs data exchange with an MS in step 2102.

In step 2104, the slave BS determines whether the slave BS itself is changed to the master BS of the cloud cell. If the slave BS is changed to the master BS, the slave BS operates as the changed master BS in step 2016. In other words, the slave BS receives an authentication context for the MS. The authentication context may be received from an authenticator, and corresponds to an authentication key or data encryption key for the MS, which is generated by an identifier of the slave BS and Equation (2). If the authentication context includes only the authentication key, the slave BS or the changed master BS generates a data encryption key for the MS using the received authentication key, in step 2018. From this time on, the slave BS serves as a master BS for the MS in the cloud cell.

Figure 22:
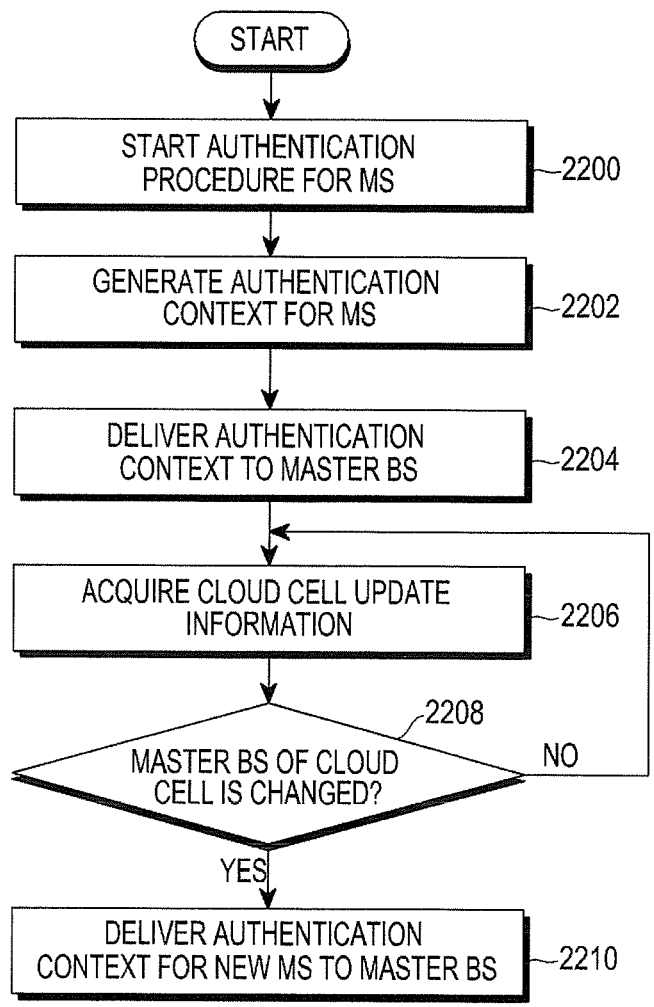
FIG. 22 illustrates an operation of an authenticator in a cloud cell-based wireless communication system according to the fourth embodiment of the present disclosure.

FIG. 22 illustrates an operation of an authenticator in a cloud cell-based wireless communication system according to the fourth embodiment of the present disclosure.

Referring to FIG. 22, the authenticator starts an authentication procedure for an MS in step 2200, and generates an authentication key for the MS using identification information of a master BS of the cloud cell to which the MS belongs, and Equation (2), in step 2202.

In step 2204, the authenticator delivers the authentication key to the master BS for the MS. The authenticator may generate a data encryption key for the MS using the authentication key and deliver the data encryption key to the master BS.

Thereafter, in step 2206, the authenticator acquires the cloud cell update information through the master BS. Based on the cloud cell update information, the authenticator determines in step 2208 whether the master BS of the cloud cell is changed. If the master BS of the cloud cell is changed to a new master BS, the authenticator generates a new authentication key for the MS using Equation (2) and the identification information of the new master BS, which is acquired from the cloud cell update information, and generates a new data encryption key based on the new authentication key, in step 2210. The authenticator delivers the new authentication key or the new data encryption key to the new master BS as a new authentication context for the MS.

Fifth Embodiment

Figure 23:
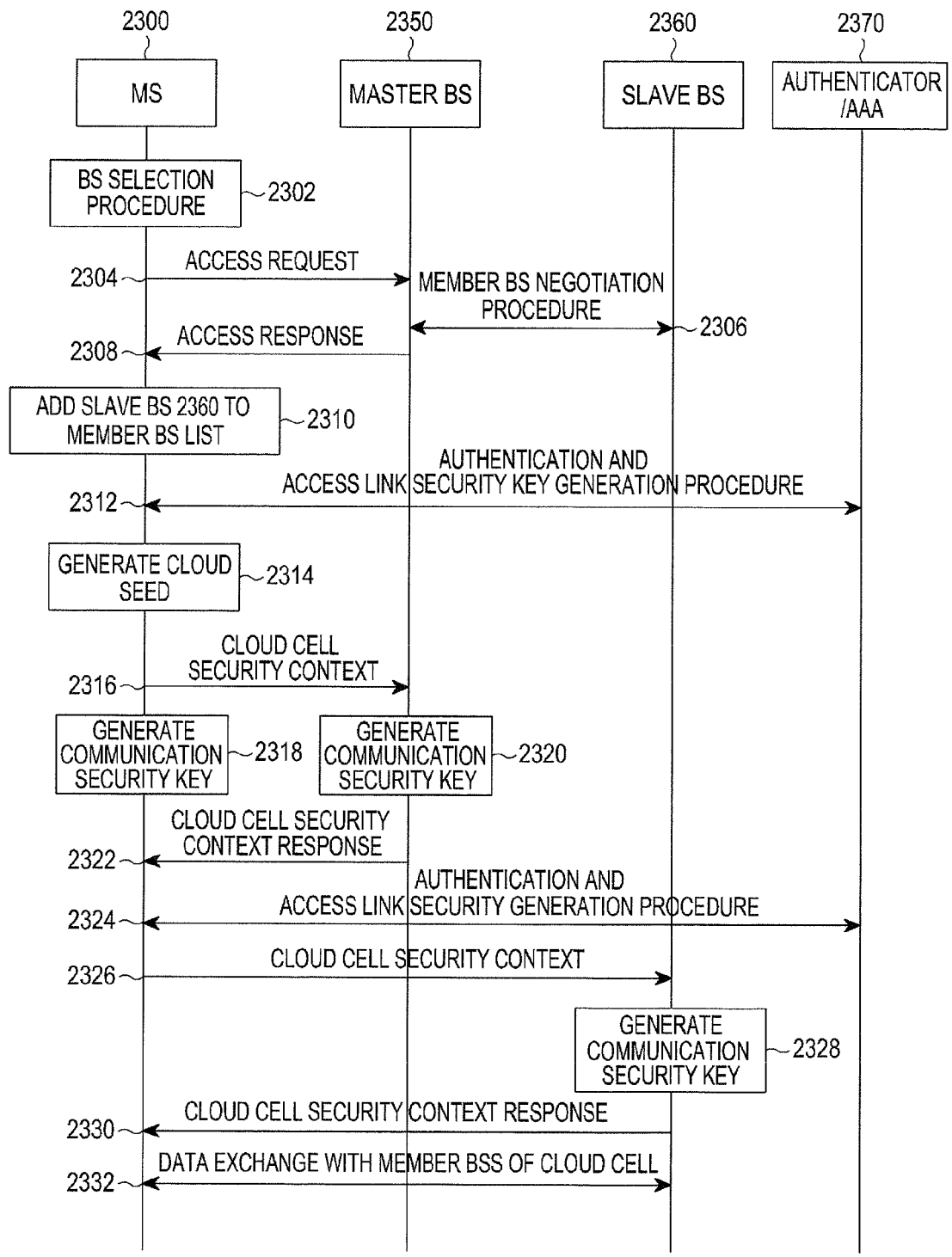
FIG. 23 illustrates a signal flow diagram for managing security keys for an MS in a process of configuring a cloud cell in a cloud cell-based wireless communication system according to a fifth embodiment of the present disclosure.

FIG. 23 illustrates a signal flow diagram for managing security keys for an MS in a process of configuring a cloud cell in a cloud cell-based wireless communication system according to a fifth embodiment of the present disclosure.

Referring to FIG. 23, in step 2302, an MS 2300 performs a procedure for selecting a BS that provides a communication service. In the BS selection process, the MS 2300 selects a candidate BS for a slave BS constituting a cloud cell centered on the MS 2300. In step 2304, the MS 2300 sends an access request message to a master BS 2350 which was selected in step 2302. If information about the candidate BS is included in the access request message, the master BS 2350 performs a cloud cell member BS negotiation procedure for negotiating the slave BS corresponding to the candidate BS, as a member BS constituting the cloud cell, in step 2306. For example, a slave BS 2360 is assumed to be selected as the candidate BS by the MS 2300. The master BS 2350 adds the slave BS 2360 to a cloud cell member BS list through the cloud cell member BS negotiation procedure performed in step 2306. Thereafter, in step 2308, the master BS 2350 sends an access response message to the MS 2300 in response to the access request message from the MS 2300. The access response message includes information indicating that the slave BS 2360 is added to the cloud cell member BS list for the MS. Upon receiving the access response message, the MS 2300 adds the slave BS 2360 to the cloud cell member BS list for the MS 2300 in step 2310.

Thereafter, in step 2312, the MS 2300 performs an access network authentication and security key generation procedure with the master BS 2350 and an authenticator/AAA 2370. Specifically, the authenticator/AAA 2370 performs authentication for the MS 2300, and generates a security key for an access link, which is used to authenticate and encrypt the access link between the MS 2300 and the master BS 2350 under the involvement of the authenticator/AAA 2370.

In step 2314, the MS 2300 generates a cloud seed, which is an input value for generating a communication security key to be used for data exchange with member BSs in the cloud cell. In step 2316, the MS 2300 sends a cloud cell security context message including the cloud seed to the master BS 2350. The cloud cell security context message is encrypted using the security key for an access link between the master BS 2350 and the MS 2300, which is generated in step 2312.

Thereafter, in step 2318, the MS 2300 generates a communication security key to be used for data exchange with the member BSs in the cloud cell, by using the cloud seed as an input value. In other words, the MS 2300 generates a communication authentication key to be used for data exchange with the member BSs in the cloud cell, in accordance with Equation (1) by using the cloud seed as an input value, and generates a communication data encryption key using the generated communication authentication key. Similarly, in step 2320, the master BS 2350 generates a communication authentication key to be used for data exchange in the cloud cell in accordance with Equation (1) by using the cloud seed as an input value, and generates a communication data encryption key using the generated communication authentication key.

In step 2322, the master BS 2350 sends a cloud cell security context response message to the MS 2300. The cloud cell security context response message is encrypted using the communication security key generated in step 2320.

In step 2324, the MS 2300 performs an access network authentication and security key generation procedure with the authenticator/AAA 2370 and the slave BS 2360. Specifically, in step 2324, a security key for an access link is generated, which is used to authenticate and encrypt the access link between the MS 2300 and the slave BS 2360. In step 2326, the MS 2300 sends a cloud cell security context message to the slave BS 2360. The cloud cell security context message includes the cloud seed that the MS 2300 generated in step 2318, and is encrypted using the security key for an access link, which was generated in step 2324. In step 2328, the slave BS 2360 generates a communication security key to be used for its data exchange with the member BSs in the cloud cell, by using the cloud seed as an input value. In other words, the slave BS 2360 generates a communication authentication key to be used for its data exchange in the cloud cell in accordance with Equation (1) by using the cloud seed as an input value, and generates a communication data encryption key using the generated communication authentication key. In step 2330, the slave BS 2360 sends a cloud cell security context response message to the MS 2300. The cloud cell security context response message is encrypted using the communication security key that is generated in step 2328.

Thereafter, in step 2332, the MS 2300 performs data exchange with the member BSs in the cloud cell. The member BSs of the cloud cell, which handle the data exchanged with the MS 2300 by using the communication security key, may correspond to the master BS 2350, or to both the master BS 2350 and the slave BS 2360.

Figure 24:
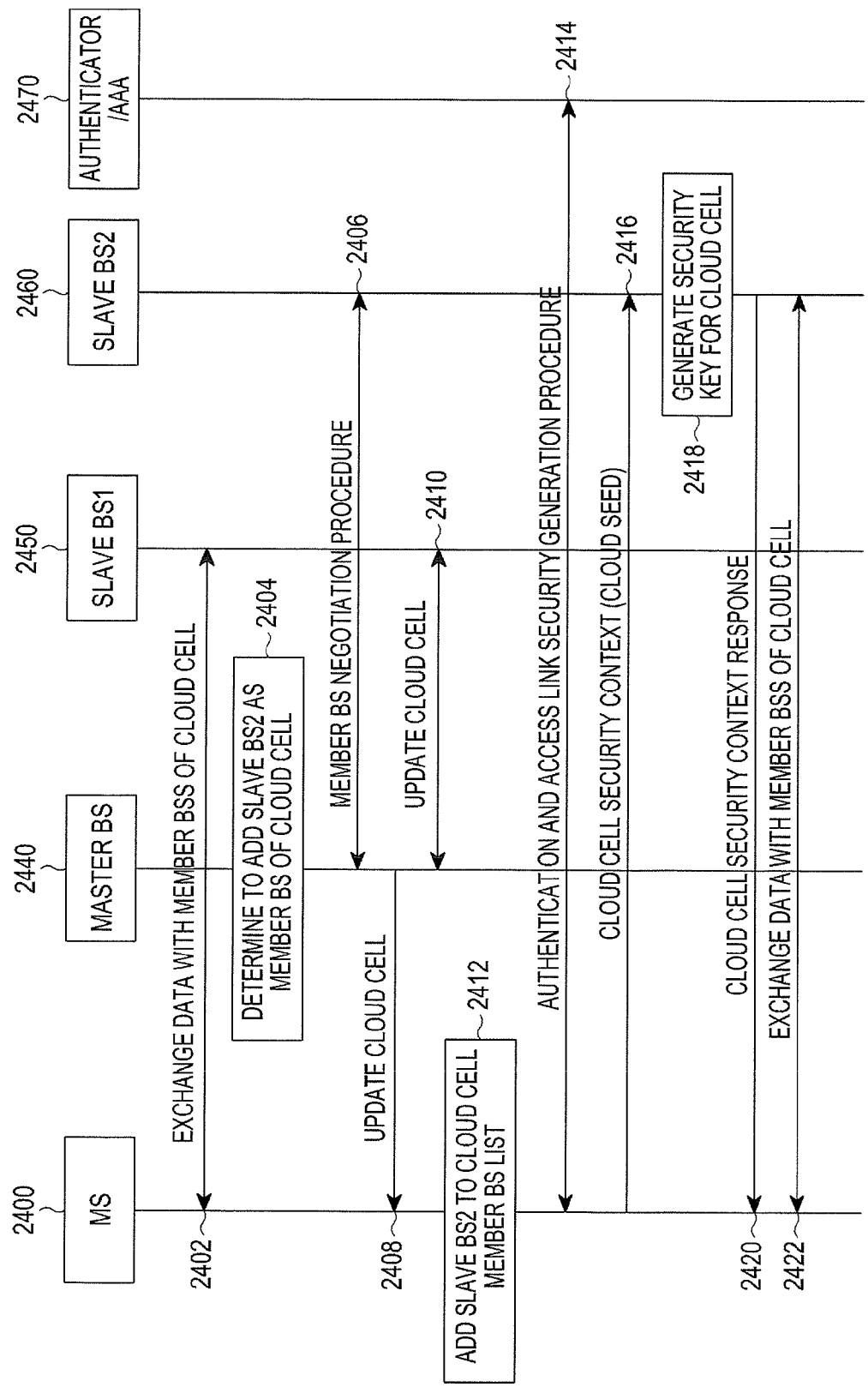
FIG. 24 illustrates a signal flow diagram for managing security keys for an MS when a slave BS is added to a cloud cell, in a cloud cell-based wireless communication system according to the fifth embodiment of the present disclosure.

FIG. 24 illustrates a signal flow diagram for managing security keys for an MS when a slave BS is added to a cloud cell, in a cloud cell-based wireless communication system according to the fifth embodiment of the present disclosure.

Referring to FIG. 24, an MS 2400 performs data exchange with member BSs (i.e., a master BS 2440 and a first slave BS 2450) of the cloud cell in step 2402. In step 2404, the master BS 2440 is assumed to determine to add another adjacent BS, e.g., a second slave BS 2460, as a slave BS of the cloud cell. The criteria for determining to add a slave BS of the cloud cell corresponds to the signal strength measurement results for the MS 2400, and the cell loads for the master BS 2440 and the first slave BS 2450. These are out of the scope of the present disclosure, so a detailed description thereof will be omitted. In step 2406, the master BS 2440 performs a cloud cell member BS negotiation procedure with the second slave BS 2460. Specifically, if the second slave BS 2460 is determined as a slave BS of the cloud cell for the MS 2400, the master BS 2440 sends a cloud cell update message to the MS 2400 in step 2408. In other words, the cloud cell update message includes information indicating that the second slave BS 2460 is added to the cloud cell member BS list for the MS 2400.

In step 2410, the master BS 2440 sends a cloud cell update message including information indicating that the second slave BS 2460 is added to the cloud cell member BS list for the MS 2400, to the first slave BS 2450 or a member BS of the cloud cell for the MS 2400. Then, in step 2412, the MS 2400 adds the second slave BS 2460 to its own cloud cell member BS list.

Thereafter, in step 2414, the MS 2400 performs an access network authentication and security key generation procedure with an authenticator/AAA 2470 and the second slave BS 2460. Specifically, in step 2414, a security key for an access link is generated, which is used to authenticate and encrypt the access link between the MS 2400 and the second slave BS 2460. In step 2416, the MS 2400 sends a cloud cell security context message including a cloud seed used in the cloud cell, to the second slave BS 2460. As an example, the cloud seed delivered to the second slave BS 2460 is assumed to be the previously generated cloud seed. However, as another example, if there is a deleted member BS among the member BSs of the cloud cell for the MS 2400, the MS 2400 generates a new cloud seed and delivers the new cloud seed to the member BSs.

The cloud cell security context message is encrypted using the security key for an access link, which is generated in step 2414.

In step 2418, the second slave BS 2460 generates a communication security key to be used for its data exchange in the cloud cell. In other words, the second slave BS 2460 generates a communication authentication key to be used for its data exchange in the cloud cell in accordance with Equation (1) by using the cloud seed as an input value, and generates a communication data encryption key using the generated communication authentication key. In step 2420, the second slave BS 2460 sends a cloud cell security context response message to the MS 2400. The cloud cell security context response message is encrypted using the communication security key generated in step 2418.

Thereafter, in step 2422, the MS 2400 exchanges data with the member BSs of the cloud cell. The member BSs of the cloud cell, which handle the data exchanged with the MS 2400 by using the communication security key, may correspond to the master BS 2440, or to all of the master BS 2440, the first slave BS 2450, and the second slave BS 2460.

Sixth Embodiment

Figure 25A:
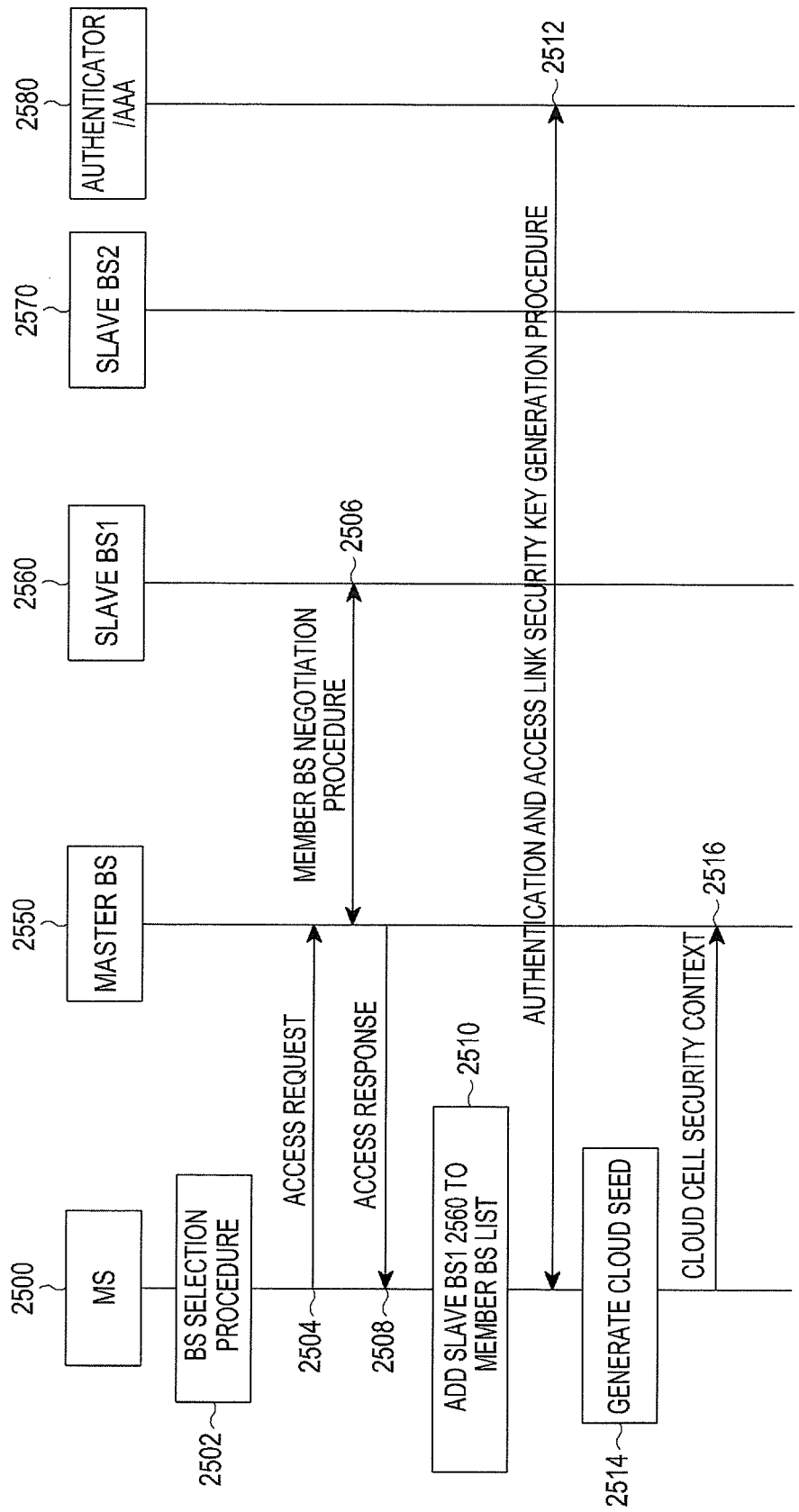
FIGS. 25A and 25B illustrate signal flow diagrams for managing security keys for an MS in a cloud cell-based wireless communication system according to a sixth embodiment of the present disclosure.
Figure 25B:
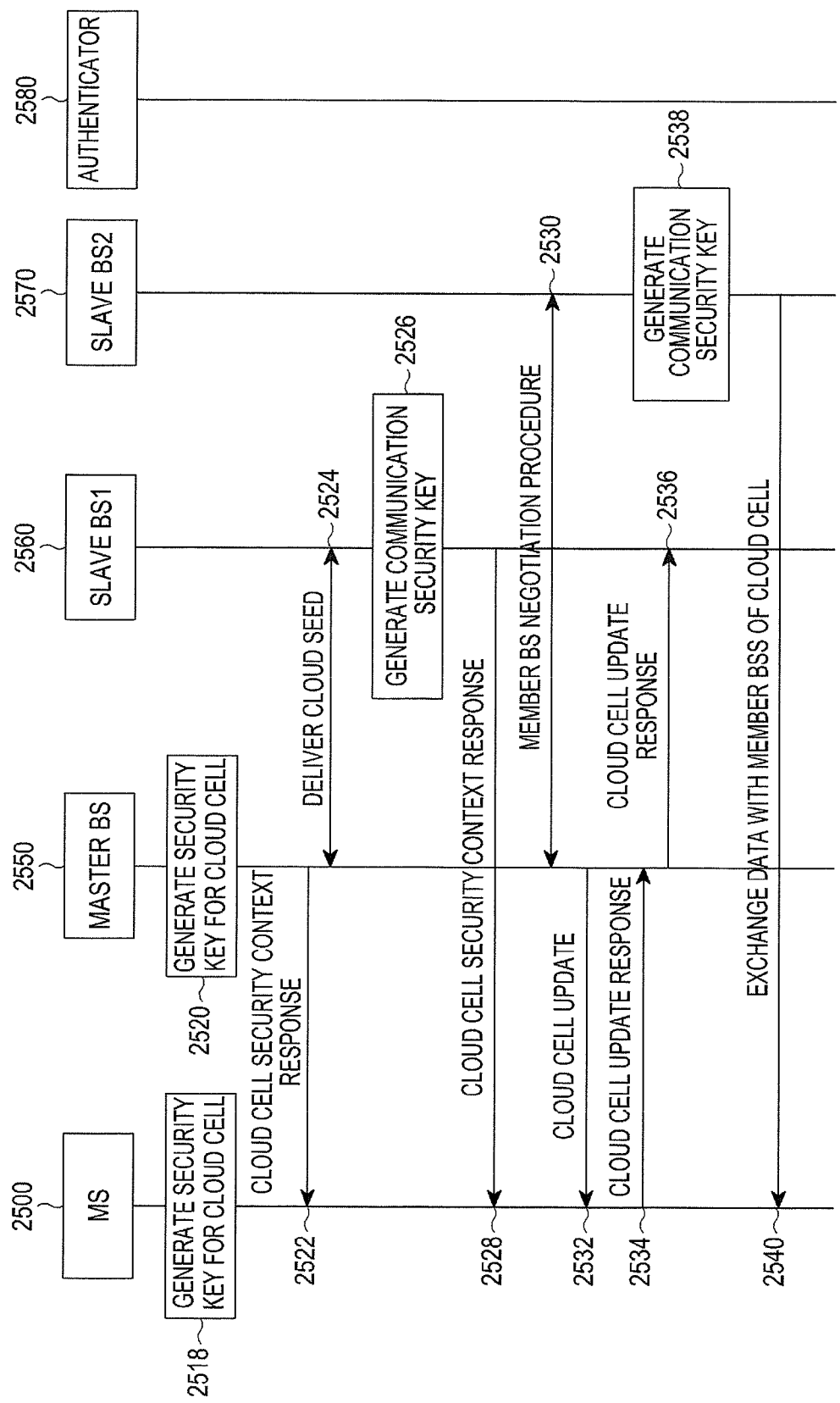

FIGS. 25A and 25B illustrate signal flow diagrams for managing security keys for an MS in a cloud cell-based wireless communication system according to a sixth embodiment of the present disclosure.

Referring to FIGS. 25A and 25B, in step 2502, an MS 2500 performs a procedure for selecting a BS that provides a communication service. In the BS selection process, the MS 2500 selects a candidate BS for a slave BS constituting a cloud cell centered on the MS 2500. In step 2504, the MS 2500 sends an access request message to a master BS 2550 which was selected in step 2502. If information about the candidate BS is included in the access request message, the master BS 2550 performs a cloud cell member BS negotiation procedure for negotiating the slave BS corresponding to the candidate BS, as a member BS constituting the cloud cell, in step 2506. For example, a first slave BS 2560 is assumed to be selected as the candidate BS by the MS 2500. The master BS 2550 adds the first slave BS 2560 to a cloud cell member BS list through the cloud cell member BS negotiation procedure performed in step 2506. Thereafter, in step 2508, the master BS 2550 sends an access response message to the MS 2500 in response to the access request message from the MS 2500. The access response message includes information indicating that the first slave BS 2560 is added to the cloud cell member BS list for the MS. Upon receiving the access response message, the MS 2500 adds the first slave BS 2560 to the cloud cell member BS list for the MS 2500 in step 2510.

Thereafter, in step 2512, the MS 2500 performs an access network authentication and security key generation procedure with the master BS 2550 and an authenticator/AAA 2580. Specifically, the authenticator/AAA 2580 performs authentication for the MS 2500, and generates a security key for an access link, which is used to authenticate and encrypt the access link between the MS 2500 and the master BS 2550 under the involvement of the authenticator/AAA 2580.

In step 2514, the MS 2500 generates a cloud seed, which is an input value for generating a communication security key to be used for data exchange with member BSs in the cloud cell. In step 2516, the MS 2500 sends a cloud cell security context message including the cloud seed to the master BS 2550. The cloud cell security context message is encrypted using the security key for an access link between the master BS 2550 and the MS 2500, which is generated in step 2512.

Thereafter, in step 2518, the MS 2500 generates a communication security key to be used for data exchange with the member BSs in the cloud cell, by using the cloud seed as an input value. In other words, the MS 2500 generates a communication authentication key to be used for data exchange with the member BSs in the cloud cell, in accordance with Equation (1) by using the cloud seed as an input value, and generates a communication data encryption key using the generated communication authentication key. Similarly, in step 2520, the master BS 2550 generates a communication authentication key to be used for data exchange in the cloud cell in accordance with Equation (1) by using the cloud seed as an input value, and generates a communication data encryption key using the generated communication authentication key.

In step 2522, the master BS 2550 sends a cloud cell security context response message to the MS 2500. The cloud cell security context response message is encrypted using the communication security key generated in step 2520.

In step 2524, the master BS 2550 delivers the cloud seed received in step 2516 to the first slave BS 2560. The cloud seed is encrypted using the security key for an access link between the master BS 2550 and the first slave BS 2560. Then, in step 2526, the first slave BS 2560 generates a communication security key for data exchange in the cloud cell, by using the cloud seed as an input value. In other words, the first slave BS 2560 generates a communication authentication key to be used for its data exchange in the cloud cell in accordance with Equation (1) by using the cloud seed as an input value, and generates a communication data encryption key using the generated communication authentication key.

In step 2528, the first slave BS 2560 sends a cloud cell security context response message to the MS 2500. The cloud cell security context response message is encrypted using the communication security key that is generated in step 2526.

It is assumed that thereafter, during data transmission of the MS 2500, the master BS 2550 and the first slave BS 2560, the master BS 2550 determines to add another adjacent BS (i.e., a second slave BS 2570) as a slave BS of the cloud cell for the MS 2500. The criteria for determining to add a slave BS of the cloud cell corresponds to the signal strength measurement results for the MS 2500, and the cell loads for the master BS 2550 and the first slave BS 2560. These are out of the scope of the present disclosure, so a detailed description thereof will be omitted. In step 2530, the master BS 2550 performs a cloud cell member BS negotiation procedure with the second slave BS 2570. While performing step 2530, the master BS 2550 delivers the cloud seed received in step 2516 to the second slave BS 2570. In step 2532, the master BS 2550 sends a cloud cell update message to the MS 2500. In other words, the cloud cell update message includes information indicating that the second slave BS 2570 is added to the cloud cell member BS list for the MS.

In step 2534, the MS 2500 adds the second slave BS 2570 to its own cloud cell member BS list, and sends a cloud cell update response message to the master BS 2550. Then, in step 2536, the master BS 2550 sends a cloud cell update message including information indicating that the second slave BS 2570 is added to the cloud cell member BS list for the MS, to the first slave BS 2560 which is now a member BS of the cloud cell of the MS 2500.

Thereafter, in step 2538, the second slave BS 2570 generates a communication security key to be used for data exchange in the cloud cell. In other words, the second slave BS 2570 generates a communication authentication key to be used for its data exchange in the cloud cell in accordance with Equation (1) by using the cloud seed as an input value, and generates a communication data encryption key using the generated communication authentication key. In step 2540, the second slave BS 2570 sends a cloud cell security context response message to the MS 2500. The cloud cell security context response message is encrypted using the communication security key generated in step 2538.

The member BSs of the cloud cell, which handle the data exchanged with the MS 2500 by using the communication security key, may correspond to the master BS 2550, or to all of the master BS 2550, the first slave BS 2560, and the second slave BS 2570.

In the fifth and six embodiments of the present disclosure, if a member BS constituting the cloud cell of an MS is deleted, the MS generates a new cloud seed, and may re-generate a communication security key to be used for its communication with the remaining cloud cell member BSs.

Specifically, any member BS is assumed to be deleted. Then, a master BS sends a member BS deletion message to a MS, and the MS generates a new cloud seed. The MS transmits the new cloud seed to the master BS. The cloud seed is encrypted using a security key for an access link between the MS and the master BS. Upon receiving the new cloud seed, the master BS also re-generates a communication security key using the new cloud seed. Also, while performing a member BS update procedure with a slave BS, the master BS delivers the new cloud seed to the slave BS. The slave BS also re-generates a communication security used for its communication with the MS, using the new cloud seed.

Figure 26:
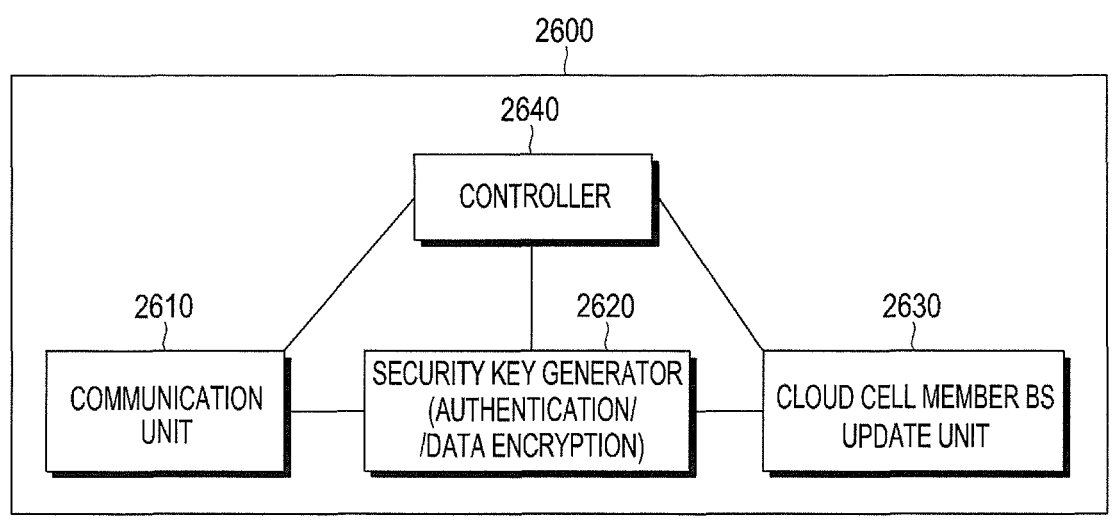
FIG. 26 illustrates an apparatus for managing security keys for authentication and data encryption in a cloud cell-based wireless communication system according to embodiments of the present disclosure.

FIG. 26 illustrates a structure of an apparatus for managing security keys for authentication and data encryption in a cloud cell-based wireless communication system according to embodiments of the present disclosure.

Referring to FIG. 26, a security key management apparatus 2600 for authentication and data encryption may include a communication unit 2610, a security key generator 2620, a cloud cell member BS update unit 2630, and a controller 2640.

The security key management apparatus 2600 is included in at least one of an MS, a master BS, a slave BS and an authenticator provided by the first to sixth embodiments of the present disclosure, and performs the above-described authentication procedure.

An operation of the security key management apparatus 2600 according to embodiments of the present disclosure will be described below.

First, the security key management apparatus 2600 is assumed to operate as an MS based on the first to sixth embodiments of the present disclosure.

If the security key management apparatus 2600 operates in accordance with the first embodiment of the present disclosure, the communication unit 2610 receives a cloud seed from an authenticator or an AAA. The cloud seed is a value that is selected by a rule shared between the MS and the authenticator or the AAA. If the controller 2640 detects the reception of the cloud seed, the security key generator 2620 generates an authentication key using the cloud seed and Equation (1) under control of the controller 2640.

The cloud cell member BS update unit 2630 manages a cloud cell member BS list that includes member BSs in the cloud cell to which the MS belongs. If a member BS in the cloud cell is deleted or added, a procedure for updating the cloud cell member BS list is performed. Also, if a master BS in the cloud cell is changed, information about the master BS in the cloud cell member BS list is updated.

If there is a member BS deleted from the cloud cell member BS list, the controller 2640 controls the communication unit 2610 to receive a new cloud seed. The controller 2640 controls the security key generator 2620 to generate an authentication key using the new cloud seed and Equation (1).

If the security key management apparatus 2600 operates in accordance with the second or fourth embodiment of the present disclosure, the security key generator 2620 generates an authentication key using an identifier of the master BS and Equation (2). The communication unit 2610 exchanges data with (i.e., transmits and receives data to/from) the master BS and slave BSs using a data encryption key that is generated based on the authentication key.

If the master BS is changed or replaced, the communication unit 2610 receives an identifier of the changed or replaced master BS. Upon detecting the change, the controller 2640 controls the security key generator 2620 to generate a new authentication key using the identifier of the changed master BS and Equation (2). Further, the controller 2640 controls the communication unit 2610 to exchange data with the member BSs including the new master BS, using a new data encryption key generated based on the new authentication key.

The cloud cell member BS update unit 2630 operates as it does in the first embodiment.

If the security key management apparatus 2600 operates in accordance with the third embodiment of the present disclosure, the controller 2640 controls the security key generator 2620 to generate an authentication key individually for each of the master BS and the slave BSs of the current cloud cell. In other words, under control of the controller 2640, the security key generator 2620 generates an authentication key to be used for communication with the master BS, using an identifier of the master BS and Equation (3). Further, the security key generator 2620 generates an authentication key to be used for communication with a pertinent slave BS, using an identifier of each of slave BSs and Equation (3).

Thereafter, during communication with the master BS under control of the controller 2640, the communication unit 2610 exchanges data with the master BS using an encryption key that is generated based on the authentication key which is generated using an identifier of the master BS. Further, during communication with a slave BS, the communication unit 2610 exchanges data with the slave BS using an encryption key that is generated based on the authentication key which is generated using an identifier of the slave BS.

If a master BS or a slave BS, an identifier of which was used for generation of an encryption key, is deleted, the controller 2640 deletes the encryption key.

The cloud cell member BS update unit 2630 operates as it does in the first embodiment.

If the security key management apparatus 2600 operates in accordance with the fifth or sixth embodiment of the present disclosure, the security key generator 2620 generates a cloud seed. Further, the security key generator 2620 generates a communication security key using the cloud seed. In the fifth embodiment of the present disclosure, the communication unit 2610 delivers the cloud seed to member BSs. If a particular member BS is deleted from the current member BSs, the security key generator 2620 generates a new cloud seed. Then, the security key generator 2620 re-generates a communication security key using the new cloud seed.

Second, the security key management apparatus 2600 is assumed to operate as a master BS based on the first to sixth embodiments of the present disclosure.

If the security key management apparatus 2600 operates in accordance with the first embodiment of the present disclosure, and the master BS is changed, then the controller 2640 determines whether the master BS itself is deleted from the cloud cell member BS list. If the master BS is deleted from the cloud cell member BS list, the controller 2640 terminates its communication with an MS, and the remaining operations are the same as those of the controller of the MS. The cloud cell member BS update unit 2630 and the communication unit 2610 are the same in operation as those of the MS, except that the communication unit 2610 communicates with the MS.

If the security key management apparatus 2600 operates in accordance with the second to fourth embodiments of the present disclosure, the security key management apparatus 2600 operates the same as that of the MS, except that the communication unit 2610 communicates with the MS.

If the security key management apparatus 2600 operates in accordance with the fifth embodiment of the present disclosure, the communication unit 2610 receives a cloud seed that is generated by and provided from an MS. Then, the security key generator 2620 generates a communication security key using the cloud seed.

If the security key management apparatus 2600 operates in accordance with the sixth embodiment of the present disclosure, the communication unit 2610 receives a cloud seed that is generated by and provided from an MS, and delivers the cloud seed to other member BSs. Then, the security key generator 2620 generates a communication security key using the cloud seed.

Third, the security key management apparatus 2600 is assumed to operate as a slave BS based on the first to sixth embodiments of the present disclosure.

If the security key management apparatus 2600 operates in accordance with the first to sixth embodiments of the present disclosure, the cloud cell member BS update unit 2630 further performs a subscription procedure to the current master BS and cloud cell member BSs, and its operation of managing a could cell member BS list including the member BSs in the cloud cell is the same as that of the MS and the master BS.

The controller 2640 also operates the same as that of the MS and the master BS. However, in the case of the third embodiment, if the controller 2640 recognizes that the slave BS itself is set as a master BS, the controller 2640 controls the security key generator 2620 to generate a security key, using a new authentication context received through the communication unit 2610.

If the security key management apparatus 2600 operates in accordance with the fifth and embodiments of the present disclosure, the controller 2640 controls the security key generator 2620 to generate a communication security key using a cloud seed received from an MS.

Fourth, if the security key management apparatus 2600 operates as an authenticator based on the first to fourth embodiments of the present disclosure, the security key management apparatus 2600 is the same in operation as that of the MS and the master BS based on the first to fourth embodiments of the present disclosure, except that the communication unit 2610 delivers an authentication key or a data encryption key generated in accordance with the pertinent embodiment, to the master BS.

If the security key management apparatus 2600 operates in accordance with the fifth and sixth embodiment of the present disclosure, the security key management apparatus 2600 involves only in generation of a security key for an access link between an MS and a member BS, without involving in generation of a communication security key like in other embodiments.

As is apparent from the foregoing description, the present disclosure provides a method for managing security keys for authentication and data encryption in a cloud cell-based wireless communication system supporting data transmission and reception between an MS and multiple BSs serving, the MS, thereby ensuring reliable and seamless communication between the MS and the BSs.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for managing a security key by a mobile station (MS) in a communication system, the method comprising:
    receiving, by the MS, information for a security key material of at least one member base station (BS) from a master BS;
    deriving a second security key of the at least one member BS based on the security key material, wherein the security key material is generated based on information related to the master BS;
    communicating with the at least one member BS based on the second security key of the at least one member BS;
    communicating with the master BS based on a first security key of the master BS;
    if the at least one member BS is changed, receiving information for a new security key material from the master BS, wherein a new security key of the at least one member BS is derived based on the information for the new security key material,
    wherein the second security key is different from the first security key, and
    wherein the MS has connections with the master BS and the at least one member BS.

2. The method of claim 1, further comprising:
    obtaining the second security key of the at least one member BS by generating the authentication key based on a seed;
    wherein the seed is a value that is selected by a rule predefined between the MS and an authentication, authorization and accounting server (AAA), selected by a rule predefined between the MS and an authenticator for managing an authentication procedure, or received from the AAA or the authenticator,
    if there is a deleted BS among the at least one member BS, selecting a new seed by a rule predefined between the MS and the AAA or the authenticator, or receiving the new seed from the AAA or the authenticator;
    generating a new authentication key based on the new seed; and
    generating a new encryption key based on the new authentication key.

3. The method of claim 1, further comprising:
    if the master BS is changed to a new BS, generating a new authentication key based on an identifier of the new BS.

4. The method of claim 1, further comprising:
    if the master BS is changed to a new BS, generating a new authentication key based on an identifier of the new BS; and
    if the master BS is not changed and a new BS is added to the at least one member BS, generating a new authentication key based on an identifier of the added new BS.

5. The method of claim 1, further comprising:
    if the master BS is changed to a new BS, deleting the authentication key regardless of whether the master BS is deleted from the at least one member BS, and generating a new authentication key based on an identifier of the new BS; and
    if the master BS is not changed, regardless of whether there is an added new BS or a deleted BS among the at least one member BS, communicating with remaining member BSs except for the new BS and the deleted BS based on the second security key.

6. The method of claim 1, wherein acquiring deriving the second security key comprises:
    generating a seed for generating the authentication key;
    delivering the seed to the master BS;
    generating the authentication key based on the seed; and
    generating a new seed, if there is a deleted BS among the at least one member BS.

7. A method for managing a security key by a master base station (BS) in a communication system, the method comprising:
    identifying at least one member BS added to connections of a mobile station (MS);
    transmitting, to the at least one member BS, information for a security key material of the at least one member BS; and
    communicating with the MS based on a first security key of the master BS,
    if at least one member BS is changed, transmitting information for a new security key material to each of the at least one member BS and MS,
    wherein a second security key of the at least one member BS is derived based on the security key material that is generated based on information related to the master BS,
    wherein the second security key is different from the first security key,
    wherein the MS has the connections with the master BS and the at least one member BS, and
    wherein if the at least one member BS is changed, a new security key of the at least one member BS is derived based on the information for the new security key material.

8. The method of claim 7, further comprising:
    if an authentication context for the MS obtained by performing an authentication procedure includes an authentication key, generating an encryption key based on the authentication key,
    wherein the authentication key is generated based on a seed by the MS and an authentication, authorization and accounting server (AAA) or an authenticator for managing the authentication procedure, and the seed is a value that is selected by a rule predefined between the MS and the AAA, selected by a rule predefined between the MS and the authenticator, or a value that is received from the MS, if there is a deleted BS among the at least one member BS, receiving a new authentication key from the authenticator; and generating a new encryption key based on the new authentication key, and delivering the new encryption key to remaining member BSs except for the deleted BS, wherein the new authentication key is generated based on a new seed by the MS and the AAA or the authenticator, and the new seed is a value that is selected to be different from the seed by a rule predefined between the MS and the AAA or the authenticator, or is a value that is newly generated by and received from the MS.

9. The method of claim 7, further comprising;

if the master BS is changed to a new BS, receiving a new authentication context for the MS from the authenticator or the new BS; and if the new authentication context includes a new authentication key, generating a new encryption key based on the new authentication key and communicating with the MS based on the new encryption key, wherein the authentication key is generated based on the identifier of the master BS by the MS and the AAA or the authenticator for managing the authentication procedure, and the new authentication key is generated based on an identifier of the new BS by the MS and the AAA or the authenticator for managing the authentication procedure.

10. The method of claim 7, further comprising:

if the master BS is changed to a new BS, determining whether the master BS is deleted from a list for managing the at least one member BS, terminating communication with the MS if the master BS is deleted, if the master BS is included in the list, communicating with the MS based on the encryption key; and if the master BS is not changed to the new BS or there is a new BS added in the list, acquiring a new authentication key generated based on the identifier of the added new BS, and communicating with the MS based on a new encryption key generated based on the new authentication key, wherein the authentication key is generated based on the identifier of the master BS by the MS and the AAA or the authenticator for managing the authentication procedure, and the new authentication key is generated based on a new identifier by the AAA or the authenticator.

11. The method of claim 7, further comprising:

if the master BS is changed to a new BS, terminating communication with the MS; and if the master BS is deleted from a list for managing the at least one member BS, and deleting the authentication key and the encryption key if the master BS is included in the list, wherein the authentication key is generated based on the identifier of the master BS by the MS and the AAA or the authenticator for managing the authentication procedure.

12. A method for managing a security key by a member base station (BS) in a communication system, the method comprising:

receiving, from a master BS, a request adding to connections of a mobile station (MS);

communicating with the MS based on a second security key of the member BS, the second security key of the member BS derived based on a security key material received from the master BS, wherein the security key material is generated based on information related to the master BS; and if the at least one member BS is changed, receiving information for a new security key material from the master BS, wherein the second security key is different from a first security key of the master BS, wherein the MS has the connections with the master BS and the at least one member BS, and wherein if the at least one member BS is changed, a new security key of the member BS is derived based on the information for the new security key material.

13. The method of claim 12, wherein the authentication key included in the second security key is generated based on the identifier of the master BS by the MS and an authentication, authorization and accounting server (AAA), generated based on an identifier of the serving BS by the MS and an authenticator for managing the authentication procedure, or generated based on a seed selected by a rule predefined between the MS and the AAA, selected by a rule predefined between the MS and the authenticator for managing the authentication procedure, or is a value that is generated based on an identifier of a cooperative BS among the at least one member BS, further comprising:

receiving a new authentication context for the MS;

if the new authentication context includes a new authentication key, generating a new encryption key based on the new authentication key; and communicating with the MS based on the new encryption key, wherein the new authentication key is generated based on an identifier of the master BS, generated based on a seed selected by a rule predefined between the MS and the AAA, generated based on a seed selected by a rule predefined between the MS and the authenticator for managing the authentication procedure, or is a value that is generated based on an identifier of the member BS.

14. The method of claim 12, further comprising:

after receiving a notification indicating that the member BS is changed to a new BS, receiving a new authentication context from the authenticator;

if the new authentication context includes a new authentication key, generating a new encryption key based on the new authentication key; and communication with the MS based on the new encryption key, wherein the new authentication key is generated based on an identifier of the member BS by the MS and the AAA or the authenticator for managing the authentication procedure.

15. The method of claim 12, further comprising:

if the authentication context includes a seed generated by the MS, generating an authentication key based on the seed, wherein the seed is received directly from the MS or received from the master BS and wherein if there is a deleted BS among member BSs, a new seed value is generated by and received from the MS.

16. A mobile station (MS) configured to manage a security key in a communication system, the MS comprising:

a controller configured to derive a second security key of at least one member base station (BS) based on a security key material wherein the security key material is generated based on information related to the master BS; and
a transceiver configured to receive information for the security key material of at least one member BS from a master BS, the MS having connections with the master BS and the at least one member BS, communicate with the at least one member BS based on the second security key of the at least one member BS, communicate with the master BS based on a security key of the master BS, and if the at least one member BS is changed, the transceiver is configured to receive information for a new security key material from the master BS,
wherein the second security key is different from the first security key,
wherein the MS has connections with the master BS and the at least one member BS, and
if the at least one member BS is changed, a new security key of the at least one member BS is derived based on the information for the new security key.

17. The MS of claim 16, further comprising:
a security key generator configured to generate the authentication key included in the second security key of the at least one member BS based on a seed,
wherein the seed is a value that is selected by a rule predefined between the MS and an authentication, authorization and accounting server (AAA), selected by a rule predefined between the MS and an authenticator for managing an authentication procedure, or received from the AAA or the authenticator,
if there is a deleted BS among the at least one member BS, select a new seed by a rule predefined between the MS and the AAA or the authenticator, or controlling the transceiver to receive the new seed from the AAA or the authenticator; and
update a list for managing the at least one member BS depending on the determination results of the controller,
wherein under control of the controller, the security key generator is configured to generate a new authentication key based on the new seed, and generate a new encryption key based on the new authentication key.

18. The MS of claim 17, wherein:
the security key generator configured to, if the master BS is changed to a new BS, generate a new authentication key based on an identifier of the new BS, and generate a new encryption key based on the new encryption key; and
the controller is configured to:
determine whether the master BS is changed to a new BS, control the communication unit depending on the determination results; and
update a list for managing the at least one member BS depending on the determination results,
if the master BS is changed, the transceiver is configured to communicate with BSs including the new BS based on the new encryption key under control of the controller, and if the master BS is not changed, the transceiver is configured to communicate with the at least one member BS and the master BS based on the authentication key under control of the controller.

19. The MS of claim 17, wherein the controller is configured to:
determine whether the master BS is changed to a new BS, and
update a list for managing the at least one member BS depending on the determination results; and
the security key generator configured to, if the master BS is changed to a new BS, generate a new authentication key based on an identifier of the new BS, generate a new encryption key based on the new authentication key, and if the master BS is not changed and there is the new BS added to the at least one member BS, generate the new authentication key based on an identifier of the new BS, and generate the new encryption key based on the new authentication key,
wherein if the master BS is changed, the transceiver is configured to communicate with the new BS based on the new encryption key under control of the controller, and
wherein if the master BS is not changed and there is the added new BS, the transceiver is configured to communicate with the new BS based on the new encryption key under control of the controller.

20. The MS of claim 17, wherein the controller is configured to:
determine whether the master BS is changed to a new BS, and
update a list for managing the at least one member BS depending to the determination results;
if the master BS is changed, delete the authentication key under control of the controller regardless of whether the master BS is deleted from the at least one member BS, and generate a new authentication key based on an identifier of the new BS, and
wherein under control of the controller, the transceiver is configured to communicate with member BSs including the new BS based on the new encryption key, and if the master BS is not changed, regardless of whether there is an added new BS or a deleted BS among the at least one member BS, the transceiver is configured to communicate with remaining member BSs except for the added new BS and the deleted BSs based on the encryption key.

21. The MS of claim 16, further comprising:
a seed generator configured to generate a seed used to generate the authentication key included in the second security key, and generate a new seed if there is a deleted BS among the at least one member BS; and
a security key generator configured to generate the authentication key based on the seed,
wherein the transceiver is configured to deliver the seed or the new seed to the master BS or deliver the seed or the new seed to the at least one member BS.

22. A master base station (BS) managing a security key in a communication system, the BS comprising:
a controller configured to identify at least one member BS added to connections of a mobile station (MS); and
a transceiver configured to transmit, to the at least one member BS, information for a security key material of the at least one member BS; and communicate with the MS based on a security key of the master BS,
if the at least one member BS is changed, transmitting information for a new security key material to each of the at least one member BS and MS,
wherein a second security key of the at least one member BS is derived based on the security key material generated based on information related to the master BS,
wherein the second security key is different from a first security key of the master BS,
wherein the MS has the connections with the master BS and the at least one member BS, and
wherein if the at least one member BS is changed, a new security key of the at least one member BS is derived based on the information for the new security key material.

23. The master BS of claim 22, further comprising:
a security key generator configured to, if an authentication context for the MS obtained by performing an authentication procedure includes the authentication key, generate an encryption key based on the authentication key and a seed,
wherein the authentication key is generated based on the seed by the MS and an authentication, authorization and accounting server (AAA) or an authenticator for managing the authentication procedure, and the seed is a value that is selected by a rule predefined between the MS and the AAA, selected by a rule predefined between the MS and the authenticator, or is a value that is received from the MS,
wherein the controller is configured to determine whether there is a deleted BS among the at least one member BS,
if there is the deleted BS, the transceiver is configured to receive a new authentication key from an authenticator under control of the controller, the security key generator generates a new encryption key based on the new authentication key, and the transceiver is configured to deliver the new encryption key to remaining member BSs except for the deleted BS among the at least one member BS, and
wherein the new authentication key is generated based on a new seed by the MS and an AAA or an authenticator, and the new seed is a value that is selected to be different from the seed by a rule predefined between the MS and the AAA or the authenticator, or is a value that is newly generated by and received from the MS.

24. The master BS of claim 22, wherein:
the controller is configured to determine whether the master BS is changed to a new BS, and if the master BS is changed to the new BS, control the transceiver to receive a new authentication context for the MS from the authenticator or the new BS; and
a security key generator configured to, if a new authentication context includes a new authentication key, generate a new encryption key based on the new authentication key,
wherein under control of the controller, the transceiver is configured to communicate with the MS based on the new encryption key if the master BS is changed to a new BS, and communicate with the MS based on the encryption key if the BS is not changed to the new BS, and
wherein the authentication key is generated based on the identifier of the master BS by the MS and an AAA or an authenticator for managing the authentication procedure, and the new authentication key is generated based on an identifier of the new BS by the MS and the AAA or the authenticator for managing the authentication procedure.

25. The master BS of claim 22, wherein:
the controller is configured to, upon recognizing that the master BS is changed to a new BS, determine whether the master BS is deleted from a list for managing the at least one member BS; and
the master BS further comprises a security key generator configured to, if the master BS is not changed to the new BS and a new BS is added to the list, acquire a new authentication key generated based on an identifier of the new BS under control of the controller, and generate a new encryption key generated based on the new authentication key,
wherein under control of the controller, the transceiver is configured to terminate communication with the MS if the master BS is deleted, communicate with the MS based on the encryption key if the master BS is included in the list, and communicate with the MS based on the new encryption key if the master BS is not changed to the new BS and there is the new BS added to the list, and
wherein the authentication key is generated based on an identifier of the master BS by the MS and an AAA or an authenticator for managing the authentication procedure.

26. The master BS of claim 22, wherein:
the controller is configured to, if the master BS is changed to a new BS, control the transceiver to terminate communication with the MS if the master BS is deleted from a list for managing the at least one member BS, and delete the authentication key and the encryption key if the master BS is included in the list,
wherein if the master BS is not changed, the transceiver is configured to communicate with the MS based on the encryption key under control of the controller, and
wherein the authentication key is generated based on an identifier of the master BS by the MS and an AAA or an authenticator for managing the authentication procedure.

27. A member base station (BS) configured to manage a security key in a communication system, the member BS comprising:
a communication unit configured to receive, from a master BS, a request adding to connections of a mobile station (MS), and communicate with the MS based on a second security key of the member BS, the second security key derived based on a security key material received from the master BS, wherein the security key material is generated based on information related to the master BS, and
wherein the second security key is different from a first security key of the master BS,
wherein the MS having the connections with the master BS and the at least one member BS, and
if the at least one member BS in the connections is changed, a new security key of the member BS is derived based on the information for a new security key material received from the master BS.

28. The member BS of claim 27, wherein the authentication key included in the second security key is a value that is generated based on an identifier of the master BS by the MS and an authentication, authorization and accounting server (AAA), generated based on an identifier of the master BS by the MS and an authenticator for managing the authentication procedure, or generated based on a seed selected by a rule predefined between the MS and the AAA, selected by a rule predefined between the MS and the authenticator for managing the authentication procedure, or generated based on an identifier of the member BS among the at least one member BS,
wherein if a new authentication context for the MS that the communication unit has received includes a new authentication key, the controller is configured to generate a new encryption key based on the new authentication key, and control the communication unit to communicate with the MS based on the new encryption key,
wherein the new authentication key is a value that is generated based on an identifier of the master BS, generated based on a seed selected by a rule predefined between the MS and the AAA, generated based on a seed selected by a rule predefined between the MS and the authenticator for managing the authentication procedure, or generated based on an identifier of the member BS.

29. The member BS of claim 27, wherein after receiving a notification indicating that the member BS is changed to a master BS, the communication unit is configured to receive a new authentication context from the authenticator, and if the new authentication context includes a new authentication key, the controller is configured to generate a new encryption key based on the new authentication key, and control the communication unit to communicate with the MS based on the new encryption key, wherein the new authentication key is generated based on an identifier of the member BS by the MS and the AAA or the authenticator for managing the authentication procedure.

30. The member BS of claim 27, further comprising:

a security key generator configured to, if an authentication context includes a seed generated by the MS, generate the authentication key based on the seed, wherein the seed may be directly received from the MS, or may be received from the master BS, or if there is a deleted BS among the at least one member BS, a new seed generated by the MS may be received.

\* \* \* \* \*